US008991859B2

(12) United States Patent
Yamamoto

(10) Patent No.: US 8,991,859 B2
(45) Date of Patent: Mar. 31, 2015

(54) SIDE AIRBAG DEVICE AND METHOD OF SEWING SIDE AIRBAG

(71) Applicant: Kazuhito Yamamoto, Toyota (JP)

(72) Inventor: Kazuhito Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/187,769

(22) Filed: Feb. 24, 2014

(65) Prior Publication Data

US 2014/0167395 A1    Jun. 19, 2014

Related U.S. Application Data

(62) Division of application No. 13/502,665, filed as application No. PCT/JP2009/071254 on Dec. 21, 2009, now Pat. No. 8,696,021.

(51) Int. Cl.
*B60R 21/231* (2011.01)
*B60R 21/233* (2006.01)
*B60R 21/2342* (2011.01)
(Continued)

(52) U.S. Cl.
CPC ......... *B60R 21/23138* (2013.01); *B60R 21/233* (2013.01); *B60R 21/2342* (2013.01); *B60R 21/2346* (2013.01); *B60R 21/235* (2013.01); *B60R 2021/23146* (2013.01); *B60R 2021/23316* (2013.01); *B60R 2021/23538* (2013.01); *B60R 2021/23576* (2013.01); *B60R 2021/23324* (2013.01)
USPC .................................................... 280/730.2

(58) Field of Classification Search
USPC .................................................... 280/730.2
See application file for complete search history.

(56) References Cited

U.S. PATENT DOCUMENTS

| 5,141,247 A | 8/1992 | Barth |
| 5,423,568 A | 6/1995 | Zushi et al. |
| 5,427,406 A | 6/1995 | Zushi et al. |

(Continued)

FOREIGN PATENT DOCUMENTS

| CN | 1511738 | 7/2004 |
| CN | 1655968 | 8/2005 |

(Continued)

OTHER PUBLICATIONS

Nov. 25, 2013 Notice of Allowance issued in related U.S. Appl. No. 13/502,665.

(Continued)

*Primary Examiner* — Nicole Verley
(74) *Attorney, Agent, or Firm* — Oliff PLC

(57) ABSTRACT

A side airbag device has: a side airbag that inflates and expands at a time of a side collision, and that has a lower chamber (high pressure chamber), and an upper chamber (low pressure chamber), the high pressure chamber and the low pressure chamber being formed by base cloths (a lower base cloth, an upper base cloth) that are respectively separate bodies; an inflator; a partitioning wall that is formed by a portion of the lower base cloth, and that divides the lower chamber and the upper chamber; and a check valve that is provided at a partial region of the partitioning wall, and that is provided convexly toward the lower chamber side when the side airbag is not inflated, and that permits flowing of the gas for inflation from the upper chamber side to the lower chamber side, and restricts flowing of gas in a direction opposite thereto.

8 Claims, 35 Drawing Sheets

(51) Int. Cl.
*B60R 21/2346* (2011.01)
*B60R 21/235* (2006.01)

(56) References Cited

U.S. PATENT DOCUMENTS

| | | | |
|---|---|---|---|
| 5,586,782 A | 12/1996 | Zimmerman, II et al. | |
| 5,687,988 A | 11/1997 | Storey et al. | |
| 5,803,486 A | 9/1998 | Spencer et al. | |
| 5,906,391 A | 5/1999 | Weir et al. | |
| 6,062,594 A | 5/2000 | Asano et al. | |
| 6,302,431 B1 * | 10/2001 | Sasaki et al. | 280/728.2 |
| 6,364,348 B1 | 4/2002 | Jang et al. | |
| 6,402,190 B1 | 6/2002 | Heudorfer et al. | |
| 6,478,329 B1 | 11/2002 | Yokoyama et al. | |
| 6,802,529 B2 | 10/2004 | Takedomi et al. | |
| 6,827,368 B2 | 12/2004 | Jang et al. | |
| 7,021,652 B2 | 4/2006 | Kumagai et al. | |
| 7,063,350 B2 | 6/2006 | Steimke et al. | |
| 7,168,733 B2 | 1/2007 | Kumagai et al. | |
| 7,347,444 B2 | 3/2008 | Wheelwright | |
| 7,364,194 B2 | 4/2008 | Mabuchi et al. | |
| 7,384,062 B2 | 6/2008 | Yokoyama et al. | |
| 7,431,329 B2 * | 10/2008 | Taguchi et al. | 280/729 |
| 7,503,582 B2 | 3/2009 | Sendelbach et al. | |
| 7,581,752 B2 | 9/2009 | Kai et al. | |
| 7,637,530 B2 | 12/2009 | Yamaji et al. | |
| 7,661,699 B2 | 2/2010 | Bührlen et al. | |
| 7,819,424 B2 | 10/2010 | Toda et al. | |
| 7,900,957 B2 | 3/2011 | Honda | |
| 7,926,838 B2 | 4/2011 | Honda et al. | |
| 7,938,436 B2 | 5/2011 | Lunt et al. | |
| 7,946,621 B2 * | 5/2011 | Honda et al. | 280/743.2 |
| 7,963,556 B2 | 6/2011 | Loos et al. | |
| 8,226,114 B2 | 7/2012 | Shimono | |
| 8,398,116 B2 * | 3/2013 | Onda et al. | 280/743.1 |
| 2003/0168836 A1 | 9/2003 | Sato et al. | |
| 2004/0130127 A1 | 7/2004 | Kurimoto et al. | |
| 2005/0104342 A1 | 5/2005 | Jackson et al. | |
| 2005/0161927 A1 | 7/2005 | Yokoyama et al. | |
| 2005/0189742 A1 | 9/2005 | Kumagai et al. | |
| 2006/0001244 A1 | 1/2006 | Taguchi et al. | |
| 2006/0071458 A1 | 4/2006 | Sendelbach et al. | |
| 2006/0175809 A1 | 8/2006 | Yamaji et al. | |
| 2007/0164546 A1 | 7/2007 | Kai et al. | |
| 2007/0170707 A1 | 7/2007 | Sato et al. | |
| 2007/0284859 A1 | 12/2007 | Kashiwagi et al. | |
| 2008/0174093 A1 | 7/2008 | Inoue | |
| 2009/0020987 A1 | 1/2009 | Wipasuramonton et al. | |
| 2009/0026743 A1 | 1/2009 | Arez | |
| 2009/0322062 A1 | 12/2009 | Bauer et al. | |
| 2010/0181749 A1 | 7/2010 | Sugimoto | |
| 2011/0285119 A1 | 11/2011 | Yamamoto et al. | |
| 2012/0025499 A1 | 2/2012 | Shibayama et al. | |
| 2012/0043741 A1 | 2/2012 | Yamamoto | |
| 2012/0056410 A1 | 3/2012 | Yamamoto | |
| 2013/0099470 A1 | 4/2013 | Wipasuramonton et al. | |

FOREIGN PATENT DOCUMENTS

| | | |
|---|---|---|
| CN | 1715106 A | 1/2006 |
| DE | 19517764 | 11/1996 |
| JP | 10-100827 A | 4/1998 |
| JP | 11-70849 A | 3/1999 |
| JP | 11-157407 A | 6/1999 |
| JP | 2000-177527 A | 6/2000 |
| JP | 2001/063502 A | 3/2001 |
| JP | 2003-501303 A | 1/2003 |
| JP | 2003-335208 A | 11/2003 |
| JP | 2003-335209 A | 11/2003 |
| JP | 2004-122881 A | 4/2004 |
| JP | 2004-210047 A | 7/2004 |
| JP | 2004-256017 A | 9/2004 |
| JP | 2004-262261 A | 9/2004 |
| JP | 2004-268682 A | 9/2004 |
| JP | 2004-338698 A | 12/2004 |
| JP | 2005-186891 A | 7/2005 |
| JP | 2005-225351 A | 8/2005 |
| JP | 2005-531451 A | 10/2005 |
| JP | 2006-8015 A | 1/2006 |
| JP | 2006-8016 A | 1/2006 |
| JP | 2006-262261 A | 9/2006 |
| JP | 2007-186133 A | 7/2007 |
| JP | 2007-308122 A | 11/2007 |
| JP | 2008-18925 A | 1/2008 |
| JP | 2008-247373 A | 10/2008 |
| JP | 2009-23640 A | 2/2009 |
| JP | 2010-163142 A | 7/2010 |
| JP | 2010-184595 A | 8/2010 |
| WO | WO 2007/110167 A1 | 10/2007 |
| WO | WO 2010/131326 A1 | 11/2010 |
| WO | WO 2011/077510 A1 | 6/2011 |

OTHER PUBLICATIONS

Notice of Allowance issued in U.S. Appl. No. 13/201,397 mailed Aug. 7, 2013.
Jun. 3, 2013 Office Action issued in U.S. Appl. No. 13/318,432.
Jan. 18, 2013 Office Action issued in U.S. Appl. No. 13/318,432.
Apr. 15, 2013 Office Action issued in U.S. Appl. No. 13/201,397.
U.S. Appl. No. 13/318,432 in the name of Yamamoto, filed Nov. 1, 2011.
U.S. Appl. No. 13/201,397 in the name of Yamamoto, filed Aug. 12, 2011.
Aug. 18, 2009 International Search Report issued in International Application No. PCT/JP2009/058779 (with translation).
Apr. 27, 2010 International Search Report issued in International Application No. PCT/JP2010/054578 (with translation).
International Search Report mailed Feb. 16, 2010 issued in International Patent Application No. PCT/JP2009/071254 (with translation).

* cited by examiner

SIDE AIRBAG DEVICE AND METHOD OF SEWING SIDE AIRBAG

This is a divisional of U.S. application Ser. No. 13/502,665 filed Apr. 18, 2012, which is a National Phase Application of PCT/JP2009/071254 filed Dec. 21, 2009. The disclosure of the prior applications is hereby incorporated by reference herein in its entirety.

TECHNICAL FIELD

The present invention relates to a side airbag device and a method of sewing a side airbag.

BACKGROUND ART

There is disclosed an airbag cutting for an airbag having plural portions of a passenger protecting device for an automobile, the airbag cutting having at least two mutually-overlapping airbag portions that can be connected along the outer edge portions in order to form the airbag, and can be connected together at an overlapping region, and, in a state in which the airbag is inflated, the overlapping region forms a border surface between two chambers of the airbag (see Patent Document 1).

PRIOR ART DOCUMENTS

Patent Documents

[Patent Document 1] Japanese Patent Application National Publication No. 2005-531451

SUMMARY OF INVENTION

Technical Problem

However, in the above-described conventional example, the sewn length is long, and there is room for improvement in terms of mass-productivity and cost.

In view of the above-described circumstances, an object of the present invention is to reduce costs required for sewing a side airbag, and to devise smaller size and lighter weight of a package that is formed by a side airbag being folded-up.

Solution to Problem

A first aspect of the present invention has: a side airbag that inflates and expands at a time of a side collision, and that has a high pressure chamber that becomes a high pressure side at a time of inflation and expansion, and a low pressure chamber that becomes a lower pressure than the high pressure chamber, the high pressure chamber and the low pressure chamber being formed by base cloths that are respectively separate bodies; an inflator that supplies gas for inflation into the side airbag; a partitioning wall that is formed by a portion of a base cloth that forms the high pressure chamber, and that divides the high pressure chamber and the low pressure chamber; and a check valve that is provided at a partial region of the partitioning wall, and that is provided convexly toward the high pressure chamber side when the side airbag is not inflated, and that permits flowing of the gas for inflation from the low pressure chamber side to the high pressure chamber side, and restricts flowing of gas in a direction opposite thereto.

In the side airbag device relating to the first aspect, the side airbag has a high pressure chamber that becomes a high pressure side at a time of inflation and expansion, and a low pressure chamber that becomes a lower pressure than the high pressure chamber, and the high pressure chamber and the low pressure chamber are divided by the partitioning wall. The high pressure chamber and the low pressure chamber are formed by base cloths that are respectively separate bodies, and the partitioning wall is formed by a portion of the base cloth that forms the high pressure chamber. Therefore, as compared with a structure in which the base cloth and the partitioning wall are made to be separate bodies, costs required for sewing the side airbag can be reduced.

Further, although the internal pressure of the high pressure chamber is maintained by the check valve, this check valve is provided at a partial region of the partitioning wall. Therefore, as compared with a structure in which the check valve is provided separately, costs required for sewing the side airbag is reduced, and smaller size and lighter weight of the package formed by folding-up the side airbag can be devised.

Moreover, at the time of a side collision, the inflator operates, and the gas for inflation that is jetted-out from the inflator is supplied to the high pressure chamber and the low pressure chamber. At this time, the check valve that is provided at a partitioning wall is provided convexly toward the high pressure chamber side when the side airbag is not inflated. Therefore, flowing of the gas for inflation from the low pressure chamber side to the high pressure chamber side is permitted, and flowing of gas in the direction opposite thereto is restricted. Namely, when jetting-out of the gas from the inflator ends, gas attempts to flow backward from the high pressure chamber to the low pressure chamber, but because the check valve restricts this flow of gas, the internal pressure of the high pressure chamber can be maintained in a high pressure state over a longer time.

In a second aspect of the present invention, in the side airbag device relating to the first aspect, the base cloth that forms the high pressure chamber is folded in two convexly toward the high pressure chamber side at a region that becomes a central portion of the partitioning wall, and is further folded-over respectively toward a bag outer side and the high pressure chamber side at both end portions in a bag thickness direction of a region that becomes the partitioning wall, and end edges that are positioned at a peripheral edge portion of the high pressure chamber are sewn together.

In the side airbag device relating to the second aspect, the base cloth that forms the high pressure chamber is folded in two convexly toward the high pressure chamber side at a region that becomes a central portion of the partitioning wall, and therefore, it is easy to make a partial region of the partitioning wall be the check valve. Further, the base cloth that forms the high pressure chamber is folded-over respectively toward a bag outer side and the high pressure chamber side at both end portions in a bag thickness direction of a region that becomes the partitioning wall, and end edges are sewn together at a peripheral edge portion of the high pressure chamber. Therefore, sewing of the side airbag can be lessened. Thus, the mass-productivity of the side airbag can be improved.

In a third aspect of the present invention, in the side airbag device relating to the first aspect, the base cloth that forms the high pressure chamber is folded in two at a bottom portion of the high pressure chamber, and is folded-over respectively toward a bag inner side and the high pressure chamber side at both end portions in a bag thickness direction of a region that becomes the partitioning wall, and end edges that are positioned at a central portion of the partitioning wall are sewn together, and end edges that are positioned at a peripheral edge portion of the high pressure chamber are sewn together.

In the side airbag device relating to the third aspect, the base cloth that forms the high pressure chamber is folded in two at a bottom portion of the high pressure chamber, and is folded-over respectively toward a bag inner side and the high pressure chamber side at both end portions in a bag thickness direction of a region that becomes the partitioning wall, and end edges are sewn together at a region that becomes a central portion of the partitioning wall. Therefore, it is easy to make a partial region of the partitioning wall be the check valve. Further, because the high pressure chamber is formed by sewing together end edges of the base cloth, that are positioned at the peripheral edge portion of the high pressure chamber, at the base cloth that forms the high pressure chamber, sewing of the side airbag can be lessened. Therefore, the mass-productivity of the side airbag can be improved.

In a fourth aspect of the present invention, in the side airbag device relating to the second or third aspect, at the side airbag in an inflated and expanded state, the high pressure chamber is a lower chamber that corresponds to a waist portion of a passenger seated in a vehicle seat, and the low pressure chamber is an upper chamber that corresponds to at least one of a chest portion or a shoulder portion of the passenger.

In the side airbag relating to the fourth aspect, at the side airbag in an inflated and expanded state, the high pressure chamber is a lower chamber that corresponds to a waist portion of a passenger seated in a vehicle seat, and the low pressure chamber is an upper chamber that corresponds to at least one of a chest portion or a shoulder portion of the passenger. Therefore, when the side airbag inflates and expands, the lower chamber becomes higher pressure than the upper chamber. Accordingly, the waist portion of the passenger seated in the vehicle seat can be restrained by the lower chamber that is relatively high pressure, and further, at least one of the chest portion and the shoulder portion of the passenger can be restrained by the upper chamber that is relatively low pressure. Moreover, because the internal pressure of the lower chamber can be maintained over a longer time by the check valve, the passenger restraining performance at the time of a side collision can be improved more.

In a fifth aspect of the present invention, in the side airbag device relating to the second aspect or the third aspect, at the side airbag in an inflated and expanded state, the high pressure chamber is a lower chamber that corresponds to a waist portion of a passenger seated in a vehicle seat and an upper chamber that corresponds to a shoulder portion of the passenger, and the low pressure chamber is an intermediate chamber that is positioned between the upper chamber and the lower chamber and corresponds to a chest portion of the passenger.

In the side airbag device relating to the fifth aspect, at the side airbag in an inflated and expanded state, the high pressure chamber is a lower chamber that corresponds to a waist portion of a passenger seated in a vehicle seat and an upper chamber that corresponds to a shoulder portion of the passenger, and the low pressure chamber is an intermediate chamber that is positioned between the upper chamber and the lower chamber and corresponds to a chest portion of the passenger. Therefore, when the side airbag inflates and expands, the lower chamber and the upper chamber become higher pressure than the intermediate chamber. Accordingly, the waist portion of the passenger seated in the vehicle seat can be restrained by the lower chamber that is relatively high pressure, and the shoulder portion of the passenger can be restrained by the upper chamber that similarly is relatively high pressure, and further, the chest portion of the passenger can be restrained by the intermediate chamber that is relatively low pressure. Moreover, because the internal pressures of the lower chamber and the upper chamber can be maintained over a longer time by the check valve, the passenger restraining performance at the time of a side collision can be improved more.

A sixth aspect of the present invention has, in the side airbag device relating to the fourth aspect, a diffuser that guides the gas for inflation mainly to the lower chamber side, and also guides the gas for inflation to the upper chamber side, wherein the diffuser has a main opening portion that opens to the lower chamber side, and an auxiliary opening portion that opens to the upper chamber side.

In the side airbag device relating to the sixth aspect, when the side airbag inflates and expands, the gas for inflation that is supplied from the inflator is guided mainly to the lower chamber side through the main opening portion of the diffuser, and is guided and distributed also to the upper chamber side through the auxiliary opening portion. Due to the simple structure of adding such a diffuser, the lower chamber can be inflated and expanded rapidly and stably, and the upper chamber can be inflated and expanded stably.

A seventh aspect of the present invention has, in the side airbag device relating to the fifth aspect, a diffuser that guides the gas for inflation mainly to the lower chamber side and the upper chamber side, and also guides the gas for inflation to the intermediate chamber side, wherein the diffuser has main opening portions that open to the lower chamber side and the upper chamber side, respectively, and an auxiliary opening portion that opens to the intermediate chamber side.

In the side airbag device relating to the seventh aspect, when the side airbag inflates and expands, the gas for inflation that is supplied from the inflator is guided mainly to the lower chamber side and the upper chamber side through the main opening portions of the diffuser, and is guided and distributed to the intermediate chamber side through the auxiliary opening portion. Due to the simple structure of adding such a diffuser, the lower chamber and the upper chamber can respectively be inflated and expanded rapidly and stably, and the intermediate chamber can be inflated and expanded stably.

In an eighth aspect of the present invention, in the side airbag device relating to the seventh aspect, the main opening portions of the diffuser are disposed so as to pass through at least one of the check valve of the lower chamber side and the check valve of the upper chamber side.

In the side airbag device relating to the eighth aspect, because the main opening portions of the diffuser are disposed so as to pass through at least one of the check valve of the lower chamber side and the check valve of the upper chamber side, the gas for inflation that is supplied from the inflator can be guided more directly to both of or one of the lower chamber and the upper chamber. Therefore, both of or one of the lower chamber and the upper chamber be inflated and expanded more rapidly and stably.

In a ninth aspect of the present invention, in the side airbag device relating to any one aspect of the fifth, seventh or eighth aspects, a bag thickness of the lower chamber is set to be thicker than a bag thickness of the upper chamber, in an inflated and expanded state of the side airbag.

In the side airbag device relating to the ninth aspect, because the bag thickness of the lower chamber that corresponds to the waist portion of the passenger is set to be thicker than the bag thickness of the upper chamber that corresponds to the shoulder portion of the passenger, the restraining force with respect to the waist portion can be generated at an earlier timing than the shoulder portion, at the time when the passenger is restrained by the side airbag. Due thereto, the respective portions of the upper body of the passenger can respectively be restrained at appropriate timings and appropriate restraining forces.

In a tenth aspect of the present invention, in the side airbag device relating to any one aspect of the sixth through ninth aspects, a base cloth that forms the diffuser is sewn together with a base cloth that forms the low pressure chamber at at least a peripheral edge portion of the low pressure chamber, and is formed in a form of a tube.

In the side airbag device relating to the tenth aspect, the base cloth that forms the diffuser is sewn together with the base cloth that forms the low pressure chamber, at at least a peripheral edge portion of the low pressure chamber, and is formed in the form of a tube. Therefore, even if a diffuser is provided, the increase in cost required for sewing the side airbag can be suppressed.

In an eleventh aspect of the present invention, in the side airbag device relating to any one aspect of the fifth or seventh through ninth aspects, an end edge, that runs along a length direction of the diffuser, at a base cloth that forms the intermediate chamber is sewn to a side portion of the diffuser, such that an overlapping region of the base cloth and the diffuser is reduced.

In the side airbag device relating to the eleventh aspect, because an end edge, that runs along a length direction of the diffuser, at a base cloth that forms the intermediate chamber is sewn to a side portion of the diffuser such that an overlapping region of the base cloth and the diffuser is reduced, the surface area of the base cloth that forms the intermediate chamber can be reduced. Therefore, the materials cost of the side airbag is reduced, and even smaller size and lighter weight of the package formed by folding-up the side airbag can be devised.

A twelfth aspect of the present invention is a method of sewing a side airbag, the side airbag having a high pressure chamber that becomes a high pressure side at a time of inflation and expansion, and a low pressure chamber that becomes a lower pressure than the high pressure chamber, and in which the high pressure chamber and the low pressure chamber are formed by base cloths, that are respectively separate bodies, and are divided by a partitioning wall, and in which the partitioning wall is formed by a portion of a base cloth that forms the high pressure chamber, the method comprising: a step of forming, at a partial region of the partitioning wall, a check valve that permits flowing of the gas for inflation from the low pressure chamber side to the high pressure chamber side, and restricts flowing of gas in a direction opposite thereto.

In the method of sewing a side airbag relating to the twelfth aspect, because the partitioning wall is formed by a portion of the base cloth that forms the high pressure chamber, as compared with a structure in which the base cloth and the partitioning wall are made to be separate bodies, costs required for sewing the side airbag can be reduced. Further, as compared with a structure in which the check valve is provided separately, costs required for sewing the side airbag is reduced, and smaller size and lighter weight of the package formed by folding-up the side airbag can be devised.

A thirteenth aspect of the present invention further comprises, in the method of sewing a side airbag relating to the twelfth aspect, a step of folding the base cloth that forms the high pressure chamber in two convexly toward the high pressure chamber side at a region that becomes a central portion of the partitioning wall, and sewing both end portions in a bag thickness direction of a region that becomes the partitioning wall to a base cloth that forms the low pressure chamber; and a step of folding-over the base cloth that forms the high pressure chamber, respectively toward a bag outer side and the high pressure chamber side at both end portions in the bag thickness direction of the region that becomes the partitioning wall, and, at a peripheral edge portion of the high pressure chamber, sewing together end edges of the base cloth that forms the high pressure chamber, and, at a peripheral edge portion of the low pressure chamber, sewing together end edges of the base cloth that forms the low pressure chamber.

In the method of sewing a side airbag relating to the thirteenth aspect, by folding the base cloth that forms the high pressure chamber in two convexly toward the high pressure chamber side at a region that becomes a central portion of the partitioning wall, and sewing both end portions in the bag thickness direction of a region that becomes the partitioning wall to a base cloth that forms the low pressure chamber, the base cloth that forms the high pressure chamber and the base cloth that forms the low pressure chamber are joined, and the partitioning wall is formed at a portion of the base cloth that forms the high pressure chamber. Further, the high pressure chamber and the low pressure chamber can be formed by sewing of a single time by folding-over the base cloth, that forms the high pressure chamber, respectively toward a bag outer side and the high pressure chamber side at both end portions in the bag thickness direction of the region that becomes the partitioning wall, and sewing together end edges of the respective base cloths at a peripheral edge portion of the high pressure chamber and a peripheral edge portion of the low pressure chamber. Therefore, costs required for sewing the side airbag can be further reduced.

A fourteenth aspect of the present invention has, in the method of sewing a side airbag relating to the twelfth aspect, a step of folding the base cloth that forms the high pressure chamber in two at a bottom portion of the high pressure chamber, and sewing both end portions in a bag thickness direction of a region that becomes the partitioning wall, at the base cloth, to a base cloth that forms the low pressure chamber; a step of folding-over the base cloth that forms the high pressure chamber, respectively toward a bag inner side and the high pressure chamber side from a position sewn with the base cloth that forms the low pressure chamber, and sewing end edges thereof together excluding the partial region that becomes the check valve; and, at a peripheral edge portion of the high pressure chamber, sewing together end edges of the base cloth that forms the high pressure chamber, and, at a peripheral edge portion of the low pressure chamber, sewing together end edges of the base cloth that forms the low pressure chamber.

In the method of sewing a side airbag relating to the fourteenth aspect, by folding the base cloth, that forms the high pressure chamber, in two at a bottom portion of the high pressure chamber, and sewing both end portions in the bag thickness direction of a region that becomes the partitioning wall, at the base cloth, to a base cloth that forms the low pressure chamber, the base cloth that forms the high pressure chamber and the base cloth that forms the low pressure chamber are joined, and a region that becomes the partitioning wall is ensured at a portion of the base cloth that forms the high pressure chamber.

Further, the partitioning wall is formed by folding-over the base cloth that forms the high pressure chamber, respectively toward a bag inner side and the high pressure chamber side from a position sewn with the base cloth that forms the low pressure chamber, and sewing end edges thereof together excluding the partial region that becomes the check valve.

Moreover, the high pressure chamber and the low pressure chamber can be formed by sewing of a single time by, at a peripheral edge portion of the high pressure chamber, sewing together end edges of the base cloth that forms the high pressure chamber, and, at a peripheral edge portion of the low pressure chamber, sewing together end edges of the base cloth that forms the low pressure chamber. Therefore, costs required for sewing the side airbag can be further reduced.

A fifteenth aspect of the present invention has: a side airbag that inflates and expands at a time of a side collision and is formed by sewing peripheral edge portions of a facing base cloth, and that has an initially inflated portion to which gas for inflation is supplied at an initial stage of inflation and expansion, a lower chamber that becomes a high pressure side at a time of inflation and expansion and corresponds to a waist portion of a passenger seated in a vehicle seat, an upper chamber that becomes a high pressure side at a time of inflation and expansion and corresponds to a shoulder portion of the passenger, and an intermediate chamber that becomes a lower pressure than the lower chamber and the upper chamber at a time of inflation and expansion and corresponds to a chest portion of the passenger; an inflator that supplies gas for inflation to the initially inflated portion of the side airbag; a lower partitioning wall that is provided within the side airbag, and that divides the lower chamber and the intermediate chamber, and divides the lower chamber and the initially inflated portion; a lower check valve that is provided at a partial region of the lower partitioning wall, and that is provided convexly toward the lower chamber side when the side airbag is not inflated, and that permits flowing of the gas for inflation from the initially inflated portion side to the lower chamber side, and restricts flowing of gas in a direction opposite thereto; an upper partitioning wall that is provided within the side airbag, and that divides the upper chamber and the intermediate chamber, and divides the upper chamber and the initially inflated portion; an upper check valve that is provided at a partial region of the upper partitioning wall, and that is provided convexly toward the upper chamber side when the side airbag is not inflated, and that permits flowing of the gas for inflation from the initially inflated portion side to the upper chamber side, and restricts flowing of gas in a direction opposite thereto; and an intermediate partitioning wall that is provided within the side airbag so as to divide the initially inflated portion and the intermediate chamber, and in which is provided an air hole that permits inflow of gas from the initially inflated portion to the intermediate chamber.

In the side airbag device relating to the fifteenth aspect, because the lower check valve is provided at a partial region of the lower partitioning wall and the upper check valve is provided at a partial region of the upper partitioning wall, as compared with a structure in which the respective check valves are provided separately from the respective partitioning walls, costs required for sewing the side airbag is reduced, and smaller size and lighter weight of the package formed by folding-up the side airbag can be devised.

Further, at the time of a side collision, the inflator operates, and gas for inflation that is jetted-out from the inflator is first supplied to the initially inflated portion. This gas is further supplied from the initially inflated portion through the lower check valve to the lower chamber, and is supplied through the upper check valve to the upper chamber, and is supplied through the air hole of the intermediate partitioning wall to the intermediate chamber. When the jetting-out of gas from the inflator ends, gas attempts to flow backward from the lower chamber and the upper chamber to the initially inflated portion, but because the lower check valve and the upper check valve restrict this flow of gas, the internal pressure of the lower chamber and the internal pressure of the upper chamber can respectively be maintained in high pressure states.

On the other hand, because the backward flow of gas from the intermediate chamber to the initially inflated portion is permitted, the internal pressure of the intermediate chamber can be made to be relatively low pressure. Therefore, the chest portion of the passenger can be restrained appropriately by the intermediate chamber.

Advantageous Effects of Invention

As described above, in accordance with the side airbag device relating to the first aspect of the present invention, the excellent effects are obtained that costs required for sewing the side airbag is reduced, and smaller size and lighter weight of the package formed by folding-up the side airbag can be devised.

In accordance with the side airbag device relating to the second aspect, the excellent effect is obtained that costs required for sewing the side airbag can be reduced as compared with a structure in which the base cloth and the partitioning wall are made to be separate bodies.

In accordance with the side airbag device relating to the third aspect, sewing of the side airbag can be lessened. Therefore, the excellent effect that the mass-productivity of the side airbag can be improved is obtained.

In accordance with the side airbag device relating to the fourth aspect, the excellent effect that the mass-productivity of the side airbag can be improved is obtained.

In accordance with the side airbag device relating to the fifth aspect, the excellent effects are obtained that the waist portion of the passenger seated in the vehicle seat can be restrained by the lower chamber that is relatively high pressure, and further, at least one of the chest portion and the shoulder portion of the passenger can be restrained by the upper chamber that is relatively low pressure.

In accordance with the side airbag device relating to the sixth aspect, the excellent effects are obtained that the waist portion of the passenger seated in the vehicle seat can be restrained by the lower chamber that is relatively high pressure, and the shoulder portion of the passenger can be restrained by the upper chamber that similarly is relatively high pressure, and moreover, the chest portion of the passenger can be restrained by the intermediate chamber that is relatively low pressure.

In accordance with the side airbag device relating to the seventh aspect, the excellent effects are obtained that, by the simple structure of adding the diffuser, the lower chamber is inflated and expanded rapidly and stably, and the upper chamber can be inflated and expanded stably.

In accordance with the side airbag device relating to the eighth aspect, the excellent effects are obtained that, by the simple structure of adding the diffuser, the lower chamber and the upper chamber are respectively inflated and expanded rapidly and stably, and the intermediate chamber can be inflated and expanded stably.

In accordance with the side airbag device relating to the ninth aspect, the excellent effect is obtained that both or one of the lower chamber and the upper chamber can respectively be inflated and expanded more rapidly and stably.

In accordance with the side airbag device relating to the tenth aspect, the excellent effect is obtained that the respective portions of the upper body of the passenger can respectively be restrained at appropriate timings and by appropriate restraining forces.

In accordance with the side airbag device relating to the eleventh aspect, the excellent effect is obtained that, even if a diffuser is provided, the increase in costs required for sewing the side airbag can be suppressed.

In accordance with the method of sewing a side airbag relating to the twelfth aspect, the excellent effects are obtained that costs required for sewing the side airbag is reduced, and smaller size and lighter weight of the package formed by folding-up the side airbag can be devised.

In accordance with the method of sewing a side airbag relating to the thirteenth aspect, the excellent effect is obtained that costs required for sewing the side airbag can be further reduced.

In accordance with the method of sewing a side airbag relating to the fourteenth aspect, the excellent effect is obtained that costs required for sewing the side airbag can be further reduced.

In accordance with the side airbag device relating to the fifteenth aspect, the excellent effects are obtained that costs required for sewing the side airbag is reduced, and smaller size and lighter weight of the package formed by folding-up the side airbag can be devised.

BRIEF DESCRIPTION OF DRAWINGS

FIG. 1 is a side view showing a state in which a side airbag is inflated and expanded at the side of a passenger seated in a vehicle seat.

FIG. 2 is a side view showing a side airbag device.

FIG. 3 is a partial sectional perspective view showing the way of folding a lower base cloth.

FIG. 4 is a partial sectional perspective view showing a state in which a sewn portion is provided at an adjacent region of a region that becomes a check valve, of a folded-in end edge of a partitioning wall.

FIG. 5 is a partial sectional perspective view showing the side airbag device in a completed state.

FIG. 6 is an enlarged sectional view seen in the direction of arrows F6-F6 in FIG. 2, showing an example of the state of the partitioning wall when the side airbag is not inflated.

FIG. 7 is an enlarged sectional view seen in the direction of arrows F7-F7 in FIG. 2, showing an example of the state of the partitioning wall when the side airbag is inflated.

FIG. 8 is an enlarged sectional view seen in the direction of arrows F8-F8 in FIG. 2, showing an example of the state of a vicinity of a sewn portion of the partitioning wall, when the side airbag is inflated and expanded.

FIG. 9 is an enlarged sectional view seen in the direction of arrows F9-F9 in FIG. 2, showing an example of the state of the partitioning wall and a diffuser at a time when gas, that is jetted-out from gas jetting-out portions of an inflator, flows into a lower chamber.

FIG. 10 is an enlarged sectional view seen in the direction of arrows F10-F10 in FIG. 2, showing a state in which jetting-out of gas from the inflator has ended and the check valve has closed.

FIG. 11 is an enlarged sectional schematic view of main portions seen in the direction of arrows F11-F11 in FIG. 2, showing an example of inflated thicknesses of respective portions of the side airbag.

FIG. 12 is an enlarged sectional schematic view of main portions seen in the direction of arrows F12-F12 in FIG. 2, showing another example of inflated thicknesses of respective portions of the side airbag.

FIG. 13 is a side view showing a side airbag device.

FIG. 14 is an exploded perspective view of main portions showing the side airbag device.

FIG. 15 is an enlarged sectional view seen in the direction of arrows F15-F15 in FIG. 13, showing an example of the state of the partitioning wall when the side airbag is inflated and expanded.

FIG. 16 is an enlarged sectional schematic view of main portions seen in the direction of arrows F16-F16 in FIG. 13, showing an example of the state of the partitioning wall in a vicinity of the check valve, when the side airbag is inflated and expanded.

FIG. 17 is an enlarged sectional view seen in the direction of arrows F17-F17 in FIG. 13, showing an example of the state of the partitioning wall and the diffuser at a time when gas, that is jetted-out from the gas jetting-out portions of the inflator, flows into the lower chamber.

FIG. 18 is an enlarged sectional view seen in the direction of arrows F18-F18 in FIG. 13, showing a state in which jetting-out of gas from the inflator has ended and the check valve has closed.

FIG. 19 is a side view showing a state in which the side airbag is inflated and expanded at the side of a passenger seated in the vehicle seat.

FIG. 20 is a side view showing a side airbag device.

FIG. 21 is an exploded perspective view of main portions showing the side airbag device.

FIG. 22 is a side view showing a side airbag device.

FIG. 23 is an enlarged perspective view of main portions seen in the direction of arrows F23-O-F23 in FIG. 22, showing an example of the states of a lower partitioning wall, an upper partitioning wall, and the diffuser at a time when gas, that is jetted-out from the gas jetting-out portions of the inflator, flows into a lower chamber and an upper chamber.

FIG. 24 is a drawing showing a state in which jetting-out of gas from the inflator has ended, and a lower opening portion and an upper opening portion of the diffuser, and a lower check valve and an upper check valve, have closed.

FIG. 25 is a side view showing a side airbag device.

FIG. 26 is an exploded perspective view showing the side airbag device.

FIG. 27 is a sectional view seen in the direction of arrows F27-F27 in FIG. 26, showing the internal structure of the side airbag device.

FIG. 28 is a sectional view seen in the direction of arrows F28-F28 in FIG. 26, showing the internal structure of the side airbag device.

FIG. 29 is a side view showing a state in which the side airbag is inflated and expanded at the side of a passenger seated in the vehicle seat.

FIG. 30 is a side view of a side airbag device.

FIG. 31 is an enlarged sectional view seen in the direction of arrows F31-F31 in FIG. 30, showing an upper partitioning wall.

FIG. 32 is an enlarged sectional view showing a state in which an upper check valve has opened, and gas is flowing into an upper chamber from an initially inflated portion.

FIG. 33 is an enlarged sectional view showing a state in which the upper check valve has closed.

FIG. 34 is an enlarged sectional view seen in the direction of arrows F34-F34 in FIG. 30, showing a state in which the upper check valve has opened, and gas is flowing into the upper chamber from the initially inflated portion.

FIG. 35 is an enlarged sectional view seen in the direction of arrows F35-F35 in FIG. 30, showing a state in which the upper check valve has closed.

DESCRIPTION OF EMBODIMENTS

[First Embodiment]

Figure 1:
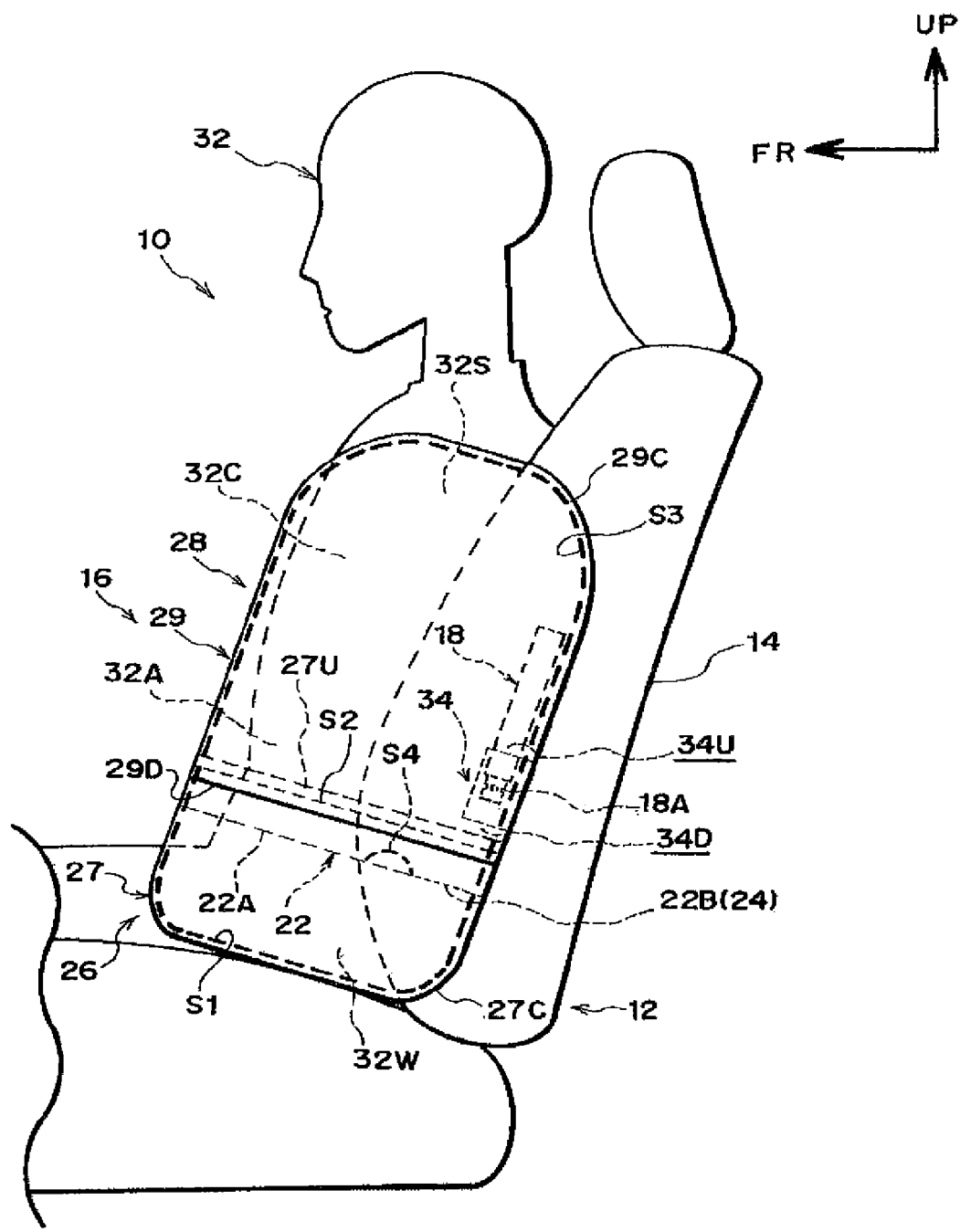
FIG. 1 through FIG. 12 relate to a first embodiment.

In FIG. 1, a side airbag device 10 relating to the present embodiment relates to, for example, a side airbag device that is installed in the side portion of a seat back 14 at a vehicle seat 12, and has a side airbag 16, an inflator 18, a partitioning wall 22, and a check valve 24.

Figure 2:
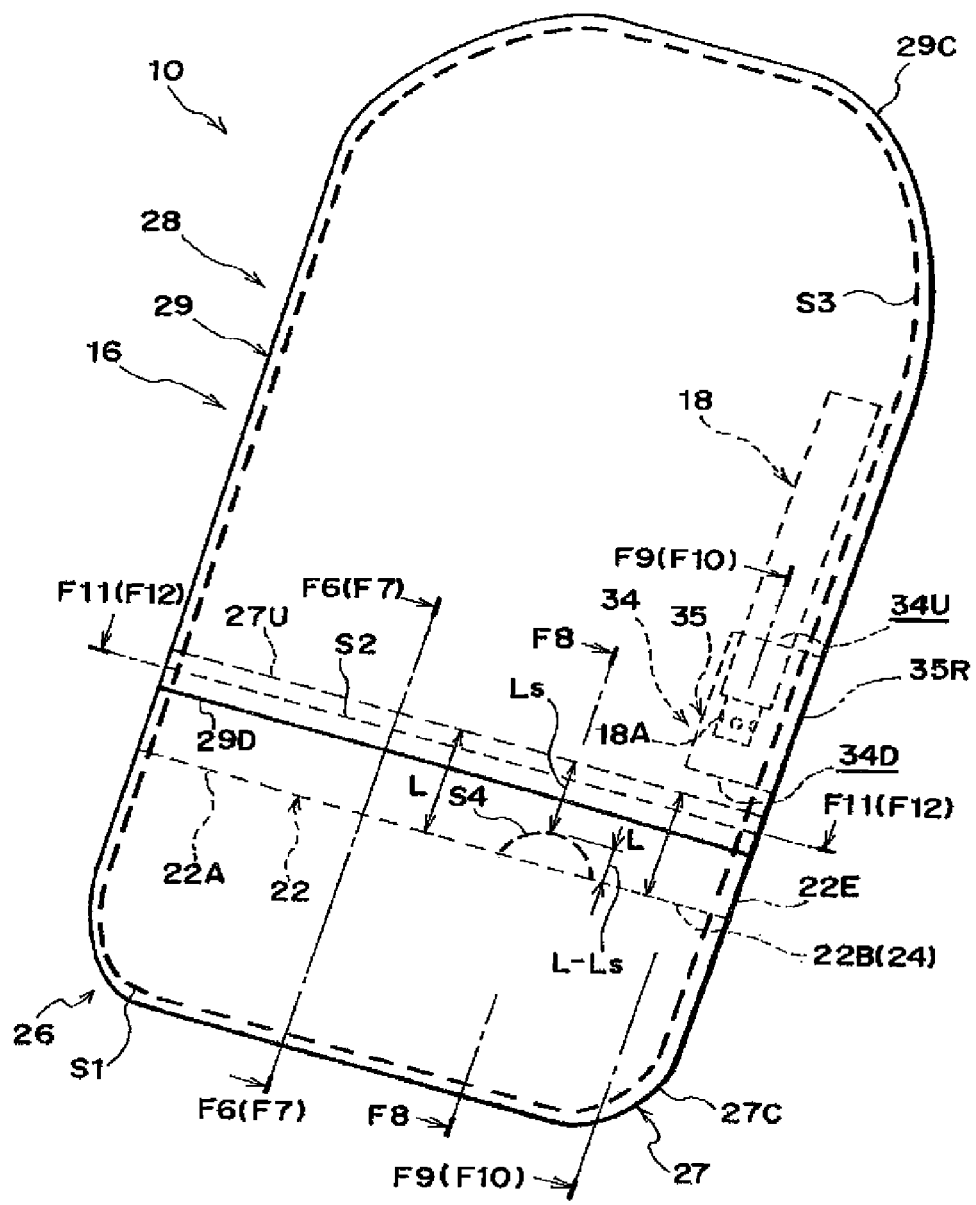

In FIG. 1, FIG. 2, the side airbag 16 has a lower chamber 26 that is an example of a high pressure chamber that becomes the high pressure side at the time of inflation and expansion, and an upper chamber 28 that is an example of a low pressure chamber that becomes a lower pressure than the lower chamber 26, and the lower chamber 26 and the upper chamber 28 are formed by base cloths that are respectively separate bodies. The lower chamber 26 and the upper chamber 28 are formed so as to, at the time of a side collision, receive a supply of gas for inflation, and respectively inflate and expand at the side of a passenger 32 seated in the vehicle seat 12.

Figure 3:
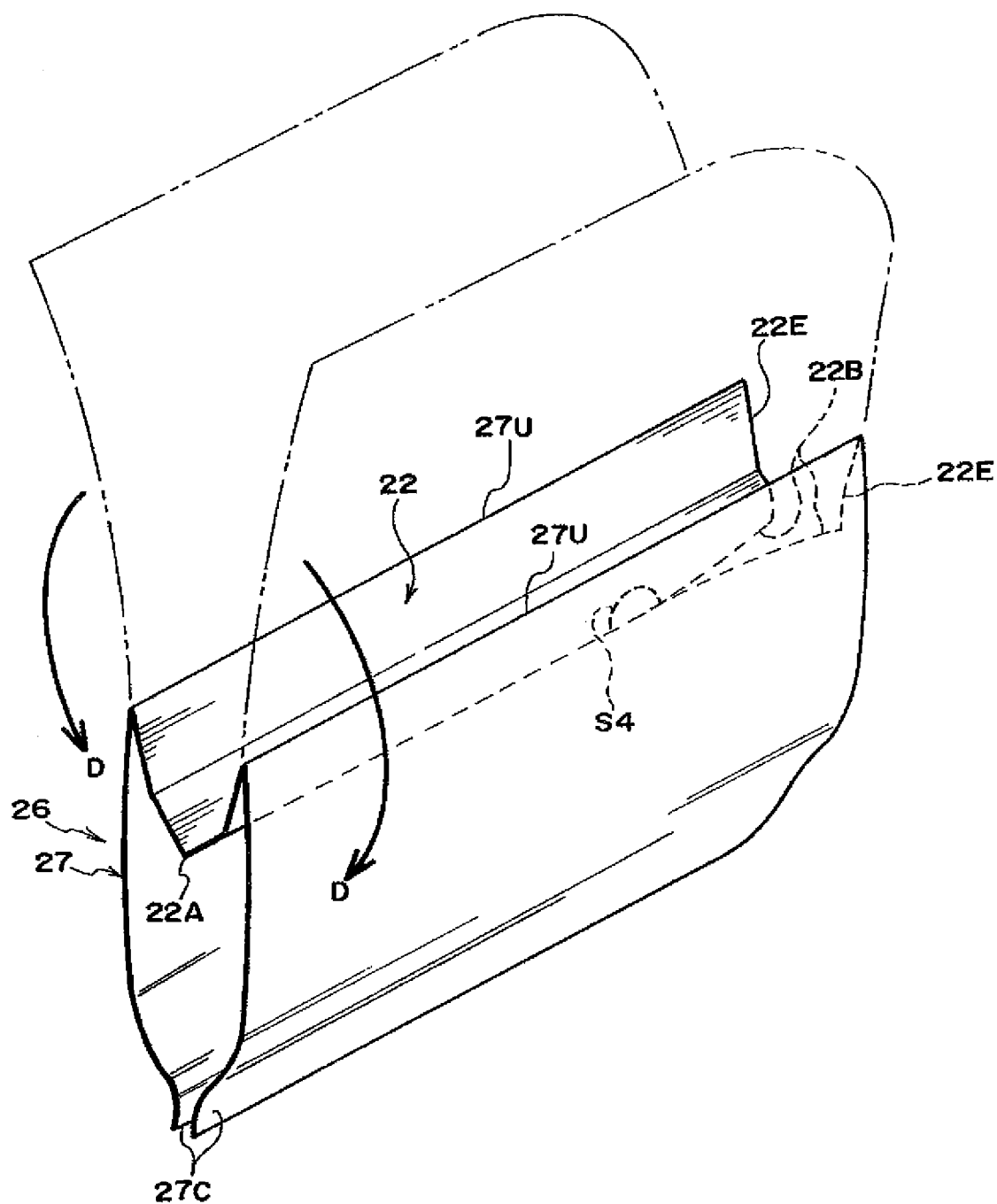
Figure 5:
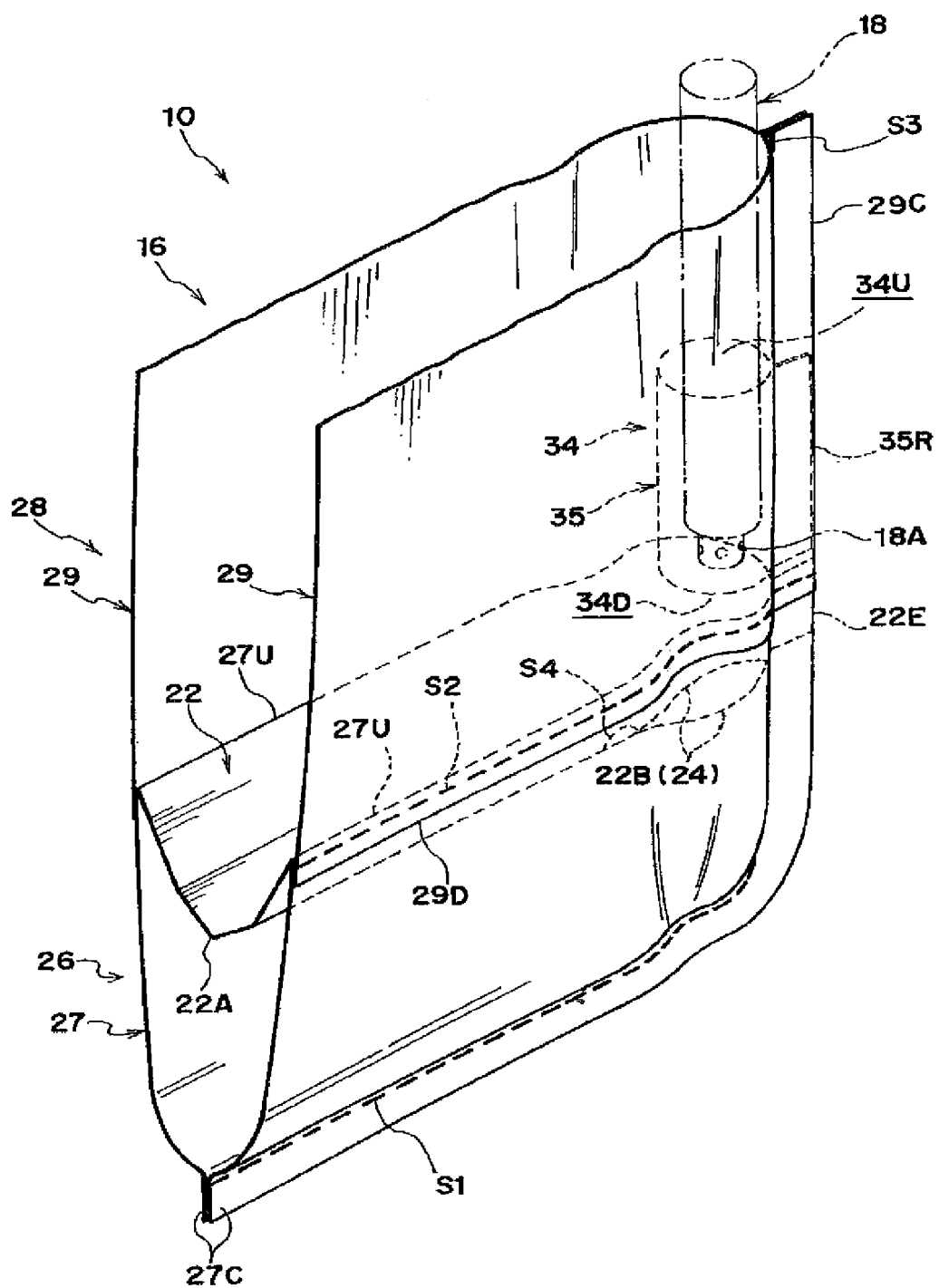

The lower chamber 26 is formed from a lower base cloth 27 that is a separate body from the upper chamber 28, and, at the side airbag 16 in the inflated and expanded state, is the inflated portion that is positioned at the vehicle lower side, and corresponds to a waist portion 32W of the passenger 32 seated in the vehicle seat 12. As shown in FIG. 3, the lower base cloth 27 that forms this lower chamber 26 is formed by, at a region that becomes the central portion of the partitioning wall 22, being folded in two convexly toward the lower chamber 26 side, i.e., the vehicle lower side, and further, at both end portions in the bag thickness direction of the region that becomes the partitioning wall 22, i.e., at upper end portions 27U, being folded over respectively toward the outer sides (arrow D directions), and, as shown in FIG. 5, end edges 27C that become the peripheral edge portion of the lower chamber 26 being sewn together (sewn portion S1). Of the lower base cloth 27, the region between the upper end portions 27U at the both sides forms the partitioning wall 22. Note that, in order to improve the air-tightness of the lower chamber 26 that serves as the high pressure chamber, coating may be carried out on the inner surface of the lower base cloth 27.

Figure 6:
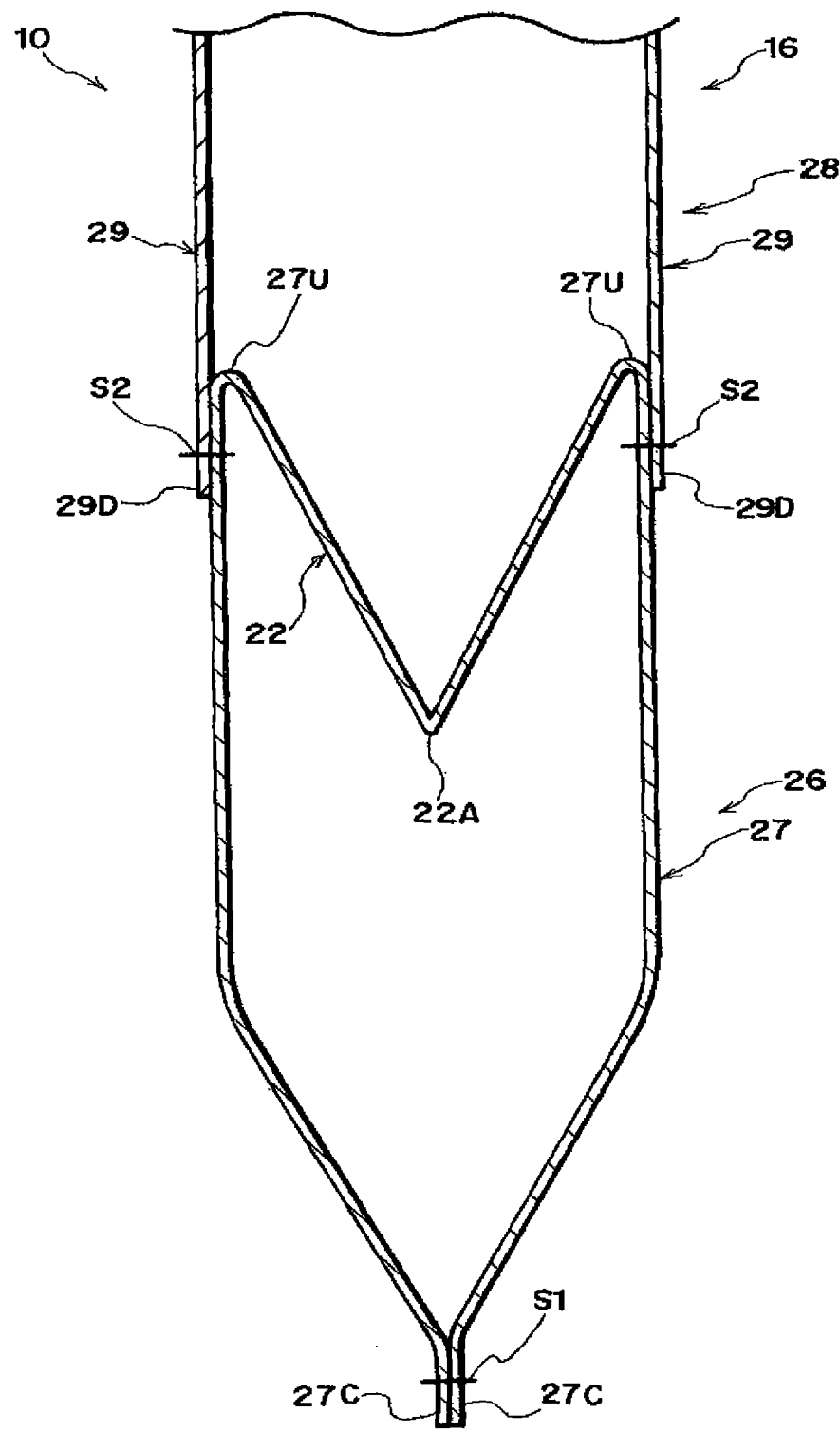

The upper chamber 28 is formed by upper base cloths 29 that are separate bodies from the lower chamber 26, and, at the side airbag 16 in the inflated and expanded state, is the inflated portion that is positioned at the vehicle upper side, and corresponds to at least one of a chest portion 32C or a shoulder portion 32S of the passenger 32 seated in the vehicle seat 12. In the present embodiment, the upper chamber 28 corresponds to both the chest portion 32C and the shoulder portion 32S of the passenger 32, and also corresponds to an upper arm portion (not illustrated) and an abdomen portion 32A. As shown in FIG. 5, FIG. 6, this upper chamber 28 is formed by, for example, lower end portions 29D of the pair of upper base cloths 29, that are positioned at the bag thickness direction both sides, being sewn (sewn portions S2) to the upper end portions 27U of the lower base cloth 27 that forms the lower chamber 26, and end edges 29C being sewn together at the peripheral edge portion of the upper chamber 28 (sewn portion S3).

Note that the sewing of the sewn portions S1, S3 can be carried out at one time by continuously sewing-together the peripheral edge portion of the side airbag 16, but are not limited to this, and may be carried out separately. Further, in the illustrated example, the upper chamber 28 is formed by sewing the end edges 29C of the pair of upper base cloths 29, but is not limited to this, and the single upper base cloth 29 may be, for example, folded in two toward the seat rear side (vehicle rear side) with the seat front side as the center, and the end edges 29C may be sewn together at the peripheral edge portion. Moreover, the upper chamber 28 is not limited to being formed by sewing the end edges 29C of the upper base cloths 29, and, for example, may be formed by bag-weaving.

As shown in FIG. 1, FIG. 2, the inflator 18 is a gas generating source for supplying gas for inflation into the side airbag 16, and, for example, is formed in the form of a tube, and is disposed, for example, at the seat rear end portion within the upper chamber 28 in a state in which gas jetting-out portions 18A are directed toward a lower chamber 26 side (check valve 24 side).

A diffuser 34 that guides the flow of gas for inflation, that is jetted-out from the gas jetting-out portions 18A, mainly to the lower chamber 26 side and also guides the flow of gas to the upper chamber 28 side, is disposed within the upper chamber 28. The gas jetting-out portions 18A of the inflator 18 are disposed within the diffuser 34. This diffuser 34 is structured by forming a diffuser base cloth 35 in the form of a tube so as to surround at least the gas jetting-out portions 18A from the entire periphery of the peripheral direction thereof, and has a lower opening portion 34D, that is an example of a main opening portion that opens to the vehicle lower side toward the lower chamber 26 side, and an upper opening portion 34U, that is an example of an auxiliary opening portion that opens to the vehicle upper side toward the upper chamber 28 side.

This diffuser 34 is fixed to the upper base cloths 29 by, for example, the single diffuser base cloth 35 being folded in two or rounded in the form of a tube, and rear end edges 35R thereof being sewn together with the end edges 29C of the upper base cloths 29 at the sewn portion S3. Further, within the upper chamber 28, the diffuser 34 is disposed so as to be adjacent to the check valve 24 for example. This is in order to preferentially supply, to the lower chamber 26 that is the high pressure chamber, the gas for inflation from the inflator 18 at the time of a side collision. Note that, in the illustrated example, the vehicle upper end portion of the inflator 18 is exposed from the diffuser 34, but the length of the diffuser 34 is arbitrary, and the entire inflator 18 may be structured so as to be contained within the diffuser 34.

Although not illustrated, for example, two stud bolts that extend toward the seat transverse direction inner side are provided to stand at the inflator 18. Due to these stud bolts being passed through a seat back frame (not illustrated) within the seat back 14 and nuts (not illustrated) being fastened to these stud bolts, the inflator 18 is fixed to the seat back frame together with the side airbag 16. Further, the inflator 18 is connected to an airbag ECU via a wire harness, and is structured to operate by operation current from the airbag ECU and supply gas for inflation to the side airbag 16. The airbag ECU is structured so as to cause operation current to flow to the inflator 18 when the airbag ECU judges a side collision due to a signal from a collision sensor (not illustrated).

In FIG. 1 through FIG. 8, the partitioning wall 22 is formed by a portion of the lower base cloth 27 that forms the lower chamber 26, and is provided so as to divide the lower chamber 26 and the upper chamber 28, and has a folded-in end edge 22A that is folded-in convexly toward the lower chamber 26 side when the side airbag 16 is not inflated. In FIG. 3, the folded-in end edge 22A is the region that is first folded in two when the lower base cloth 27 is folded and the lower chamber 26 is formed. A seat rear end portion 22B of this folded-in end edge 22A is cut so as to structure the check valve 24.

Figure 4:
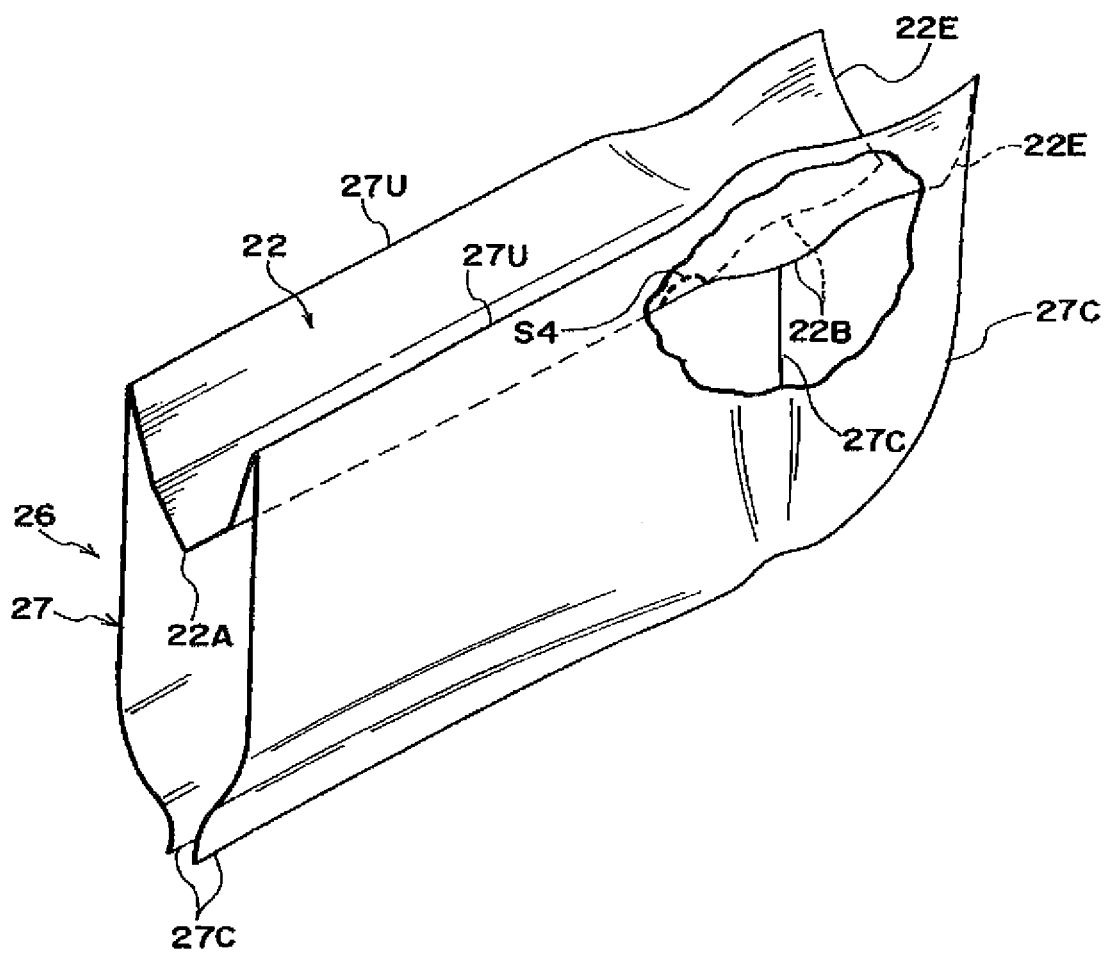

Further, as shown in FIG. 2 through FIG. 4, a sewn portion S4 that is semicircular for example is provided at the folded-in end edge 22A, at the seat front side (vehicle front side) of the seat rear end portions 22B, that is adjacent to a partial region, that becomes the check valve 24, of the partitioning wall 22. This sewn portion S4 is formed in an arcuate shape for example. Due thereto, as shown in FIG. 2, a length Ls from the upper end portions 27U of the lower base cloth 27 (the border portion between the base cloth of the side airbag 16 and the partitioning wall 22) to the sewn portion S4 is set to be shorter than a length L from the upper end portions 27U of the lower base cloth 27, further toward the seat rear side than the sewn portion S4, to the folded-in end edge 22A (the seat rear end portions 22B). Due thereto, a range L-Ls at the vehicle upper side from the folded-in end edge 22A can be made to function as the check valve 24. In other words, the partial region, of the partitioning wall 22, that is further toward the seat rear side than the sewn portion S4 can be made to function as the check valve 24.

Note that the shape of the sewn portion S4 is not limited to an arcuate shape, and it suffices for the relationship of the lengths Ls, L to be Ls<L. Further, as shown in FIG. 2, in a case in which the partitioning wall 22 is set to a constant width, the length from the upper end portions 27U of the lower base cloth 27 at the seat front side of the sewn portion S4 to the folded-in end edge 22A also is L.

In FIG. 1, FIG. 2, FIG. 5, FIG. 9, FIG. 10, the check valve 24 is provided at a partial region, e.g., the seat rear side, of the partitioning wall 22, and is provided convexly toward the lower chamber 26 side when the side airbag 16 is not inflated, and is structured so as to permit flowing of the gas for inflation from the upper chamber 28 side to the lower chamber 26 side, and restrict flowing of gas in the direction opposite thereto. This check valve 24 is formed integrally with the partitioning wall 22 by cutting the seat rear end portions 22B of the folded-in end edge 22A at the partitioning wall 22, and further, providing the sewn portion S4.

Figure 9:
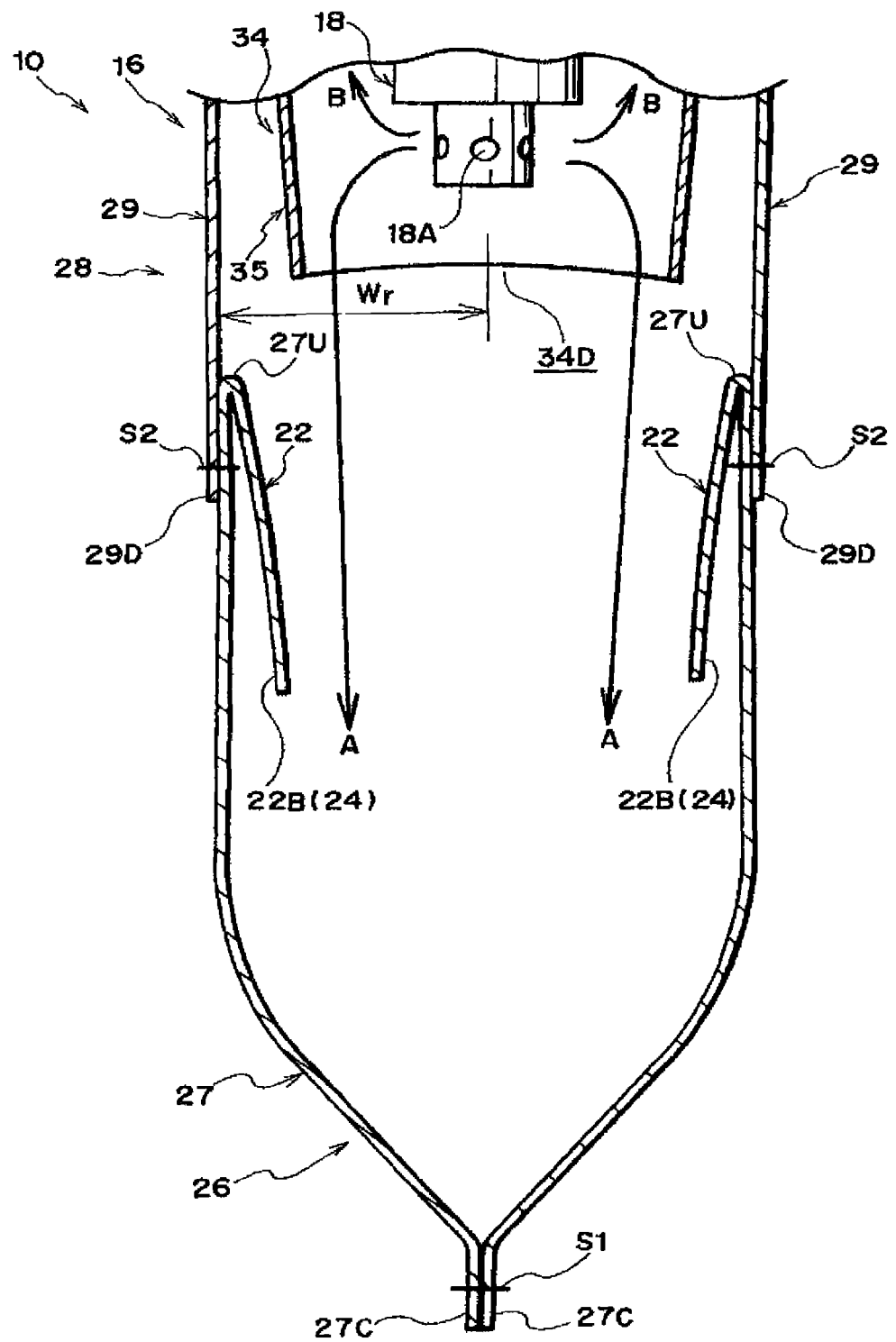
Figure 10:
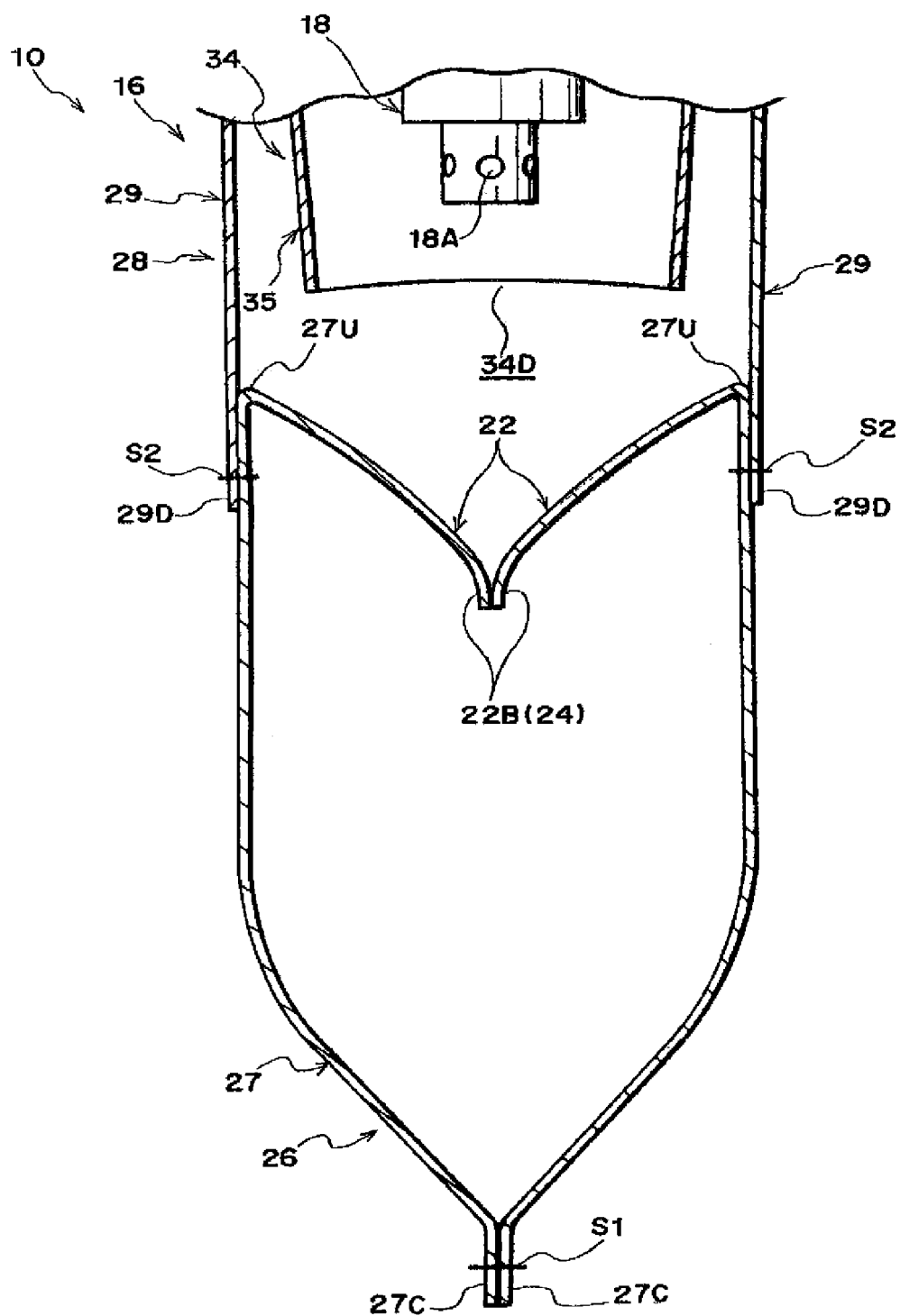

As shown in FIG. 9, when the inflator 18 operates, at the time when the gas that is jetted-out from the gas jetting-out portions 18A of the inflator 18 is jetted-out from the lower opening portion 34D of the diffuser 34 toward the lower chamber 26, due to the pressure thereof, the check valve 24 opens in the form of a tube for example. On the other hand, as shown in FIG. 10, after the jetting-out of gas from the inflator 18 ends, even if gas attempts to flow backward from the lower chamber 26 side that is the high pressure chamber to the upper chamber 28 side that is the low pressure chamber, such backward flow of gas is suppressed due to the check valve 24 closing.

In addition, end edges 22E at the seat rear side of the partitioning wall 22, that become the rear ends of the check valve 24, are sewn to the end edges 27C of the lower base cloth 27 at the sewn portion SI. By fixing the rear end of the check valve 24 in this way, when gas attempts to flow backward from the lower chamber 26 to the upper chamber 28, inverting of the check valve 24 toward the upper chamber 28 side can be suppressed even more.

(Operation)

The present embodiment is structured as described above, and the operation thereof is described hereinafter. In FIG. 1, at the side airbag device 10 relating to the present embodiment, the side airbag 16 has the lower chamber 26 that becomes the high pressure side at the time of inflation and expansion, and upper chamber 28 that becomes lower pressure than the lower chamber 26, and the lower chamber 26 and the upper chamber 28 are divided by the partitioning wall 22. The lower chamber 26 and the upper chamber 28 are formed by base cloths that are respectively separate bodies (the lower base cloth 27, the upper base cloths 29), and the partitioning wall 22 is formed by a portion of the lower base cloth 27 that forms the lower chamber 26. Therefore, costs required for sewing the side airbag 16 can be reduced as compared with a structure in which the lower base cloth 27 and the partitioning wall 22 are made to be separate bodies.

Further, the internal pressure of the lower chamber 26 is maintained by the check valve 24, and this check valve 24 is provided at a partial region of the partitioning wall 22. Therefore, as compared with a structure in which the check valve 24 is provided separately, costs required for sewing the side airbag 16 is reduced, and smaller size and lighter weight of the package formed by folding-up the side airbag 16 can be devised.

Moreover, because the lower base cloth 27 that forms the lower chamber 26 is folded in two convexly toward the lower chamber 26 side at the region that becomes the central portion of the partitioning wall 22, it is easy to make a partial region of the partitioning wall 22 be the check valve 24. Further, sewing of the side airbag 16 can be lessened because the lower base cloth 27 that forms the lower chamber 26 is folded-over respectively toward the bag outer sides and the lower chamber 26 side at both end portions in the bag thickness direction of the region that becomes the partitioning wall 22, and the end edges are sewn together at the peripheral edge portion of the lower chamber 26. Therefore, the mass-productivity of the side airbag 16 can be improved.

Operation of the side airbag device 10 at the time of a side collision is described next. When the airbag ECU judges the occurrence of the side collision on the basis of a signal from an unillustrated collision sensor, operation current is made to flow from the airbag ECU to the inflator 18. The inflator 18 receives the operation current and operates, and jets a large amount of gas out from the gas jetting-out portions 18A.

As shown in FIG. 9, due to this gas for inflation being distributed through the diffuser 34 to the lower chamber 26 and the upper chamber 28 of the side airbag 16, the side airbag 16 inflates from the side portion of the seat back 14, and inflates and expands between a vehicle side portion (not illustrated) and the passenger 32.

Concretely, the gas that is supplied from the inflator 18 into the diffuser 34 is jetted-out through the lower opening portion 34D of the diffuser 34 to the lower chamber 26 side. Here, within the upper chamber 28, the diffuser 34 is disposed adjacent to the check valve 24 for example, and further, the folded-in end edge 22A of the partitioning wall 22 that forms the check valve 24 is folded-in from the upper end portions 27U of the lower base cloth 27 convexly toward the lower chamber 26 side. Therefore, the check valve 24 can be opened easily by the pressure of the gas that is jetted-out from the lower opening portion 34D of the diffuser 34. Due thereto, because flowing of gas from the upper chamber 28 side to the lower chamber 26 side at the check valve 24 is permitted, gas from the inflator 18 is supplied in the arrow A direction into the lower chamber 26 through the check valve 24.

Further, the gas that is jetted-out from the inflator 18 is guided also in the arrow B direction through the gap between the inflator 18 and the diffuser 34, and is supplied into the upper chamber 28 through the upper opening portion 34U of the diffuser 34 (see FIG. 2 as well). Because the gas jetting-out portions 18A of the inflator 18 are disposed so as to be directed toward the lower chamber 26 side, the gas that is jetted-out from the gas jetting-out portions 18A is preferentially supplied to the lower chamber 26. Accordingly, the lower chamber 26 can be inflated and expanded before the upper chamber 28.

Here, the folded-in end edge 22A of the partitioning wall 22 is folded-in from the upper end portions 27U of the lower base cloth 27 convexly toward the lower chamber 26 side.

Accordingly, even if the seat rear end portions 22B (the check valve 24) of the folded-in end edge 22A and the outer surface of the diffuser 34 are contacting, when the gas of the upper chamber 28 side attempts to flow to the lower chamber 26 side, a gap arises between the partitioning wall 22 and the diffuser 34. Therefore, flowing of gas from the upper chamber 28 side to the lower chamber 26 side at the check valve 24 is permitted.

Figure 7:
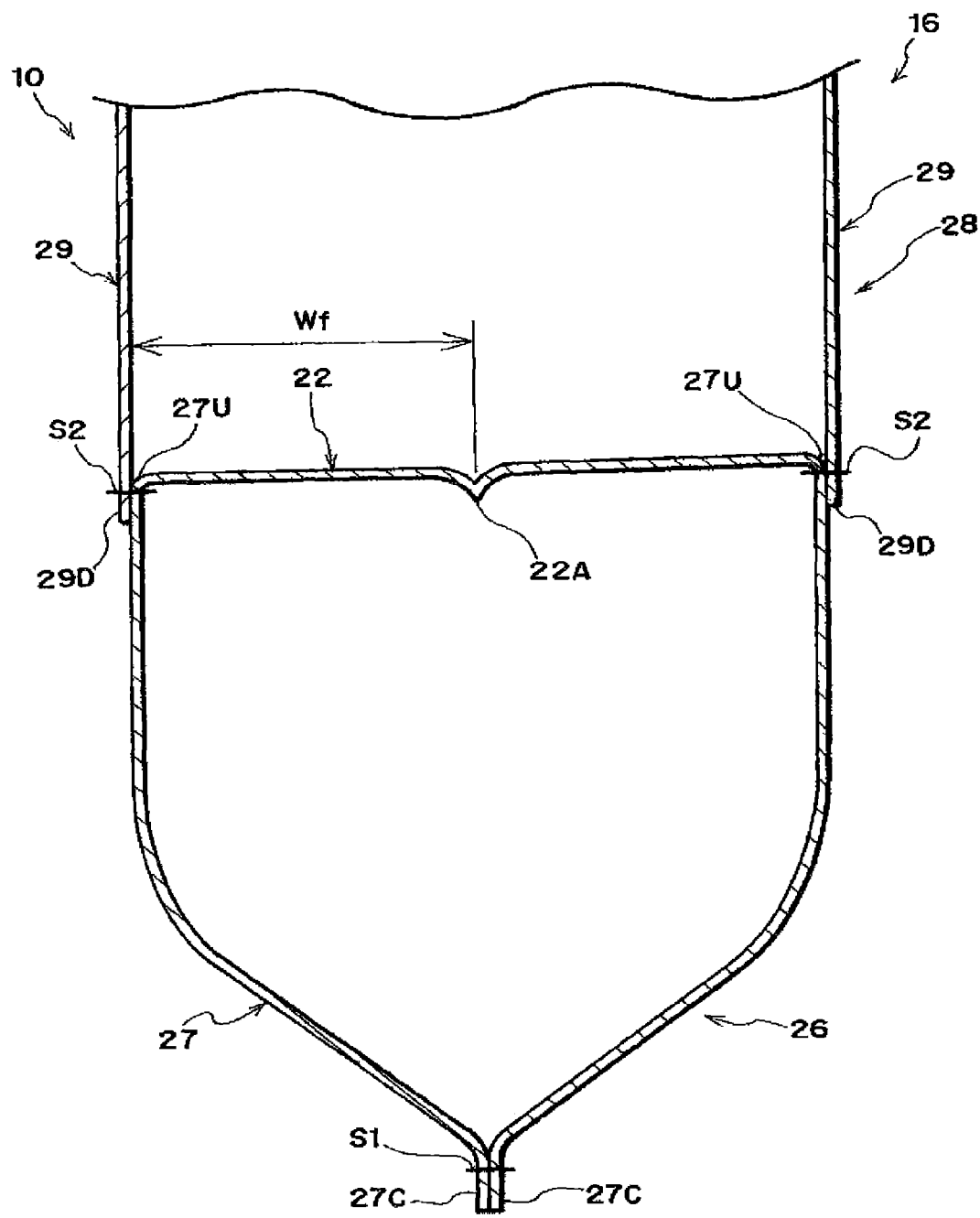

Here, FIG. 6 is an enlarged sectional view seen in the direction of arrows F6-F6 in FIG. 2, showing an example of the state of the partitioning wall 22 when the side airbag 16 is not inflated. Further, FIG. 7 is an enlarged sectional view seen in the direction of arrows F7-F7 in FIG. 2, showing the state of the partitioning wall 22 when the side airbag is inflated and expanded. Accompanying the enlarging of the bag thickness when the side airbag 16 inflates and expands, from the state of FIG. 6 to the state of FIG. 7, the partitioning wall 22 becomes a state of being spread-out in the vehicle transverse direction (the thickness direction of the side airbag 16). The one-side bag thickness of the side airbag 16 at this cross-sectional position is Wf. Here, the one-side bag thickness means half of the bag thickness.

Figure 8:
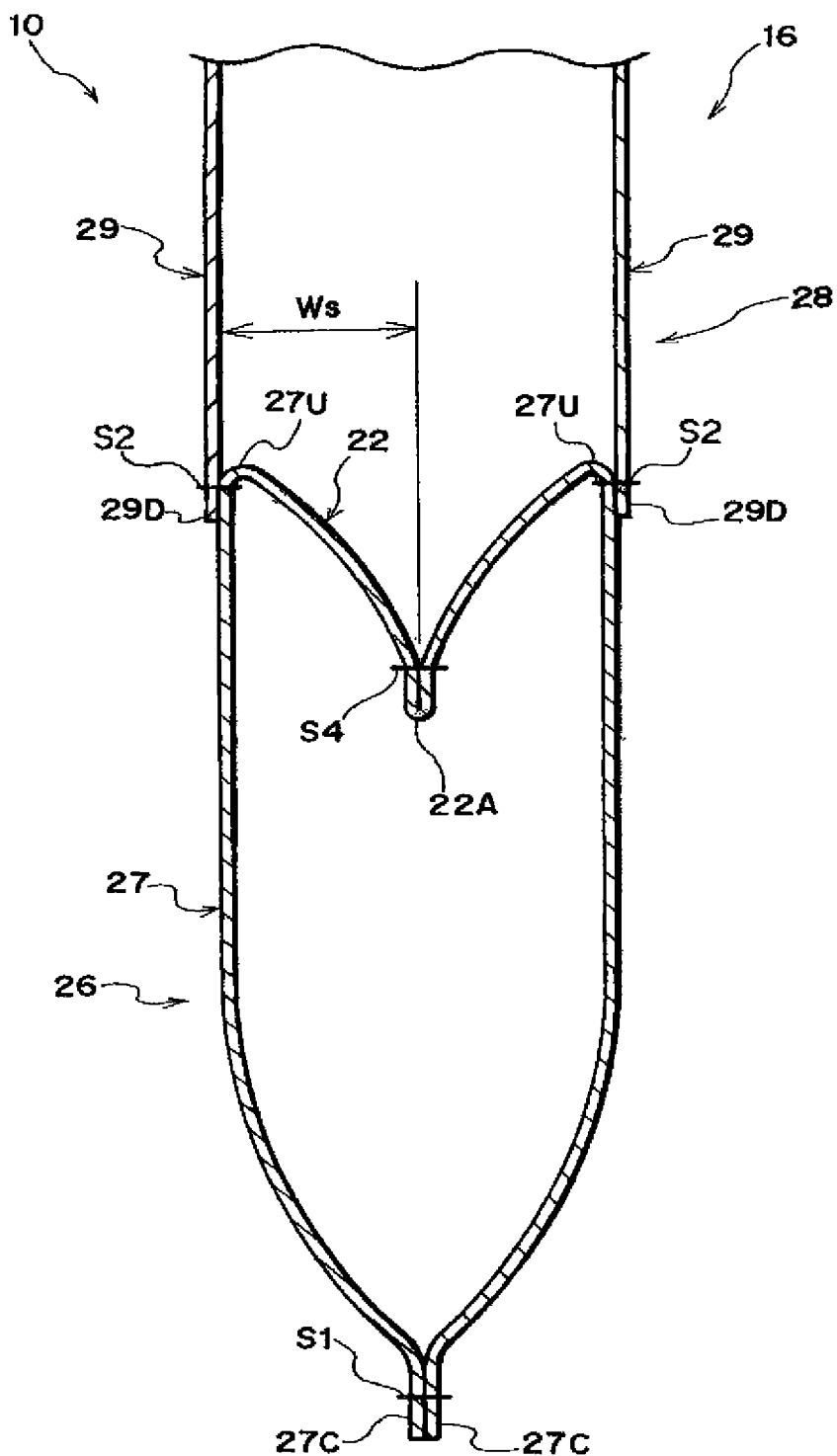

FIG. 8 is an enlarged sectional view seen in the direction of arrows F8-F8 in FIG. 2, showing an example of the state the partitioning wall 22 at the position of the sewn portion S4, when the side airbag 16 is inflated and expanded. As shown in FIG. 2, at the position of the sewn portion S4, the length Ls from the upper end portions 27U of the lower base cloth 27 to the sewn portion S4 is set to be shorter than the length L from the upper end portions 27U of the lower base cloth 27, further toward the seat rear side than the sewn portion S4, to the folded-in end edge 22A (the seat rear end portions 22B) (Ls<L). Accordingly, the width of the partitioning wall 22 when the side airbag 16 inflates and expands becomes narrower than the width of the partitioning wall 22 at the seat front side of the sewn portion S4. The one-side bag width of the side airbag 16 at this cross-sectional position is Ws.

FIG. 9 is an enlarged sectional view seen in the direction of arrows F9-F9 in FIG. 2, showing an example of the partitioning wall 22 (the check valve 24) at a time when gas, that is jetted-out from the gas jetting-out portions 18A of the inflator 18, flows into the lower chamber 26. The sewn portion S4 that is semi-circular is provided at the folded-in end edge 22A, at the seat front side of the seat rear end portions 22B, that is adjacent to the partial region, of the partitioning wall 22, that becomes the check valve 24. Further, the end edges 22E at the seat rear side where the check valve 24 is positioned, of the partitioning wall 22, are sewn to the end edges 27C of the lower base cloth 27 at the sewn portion S1. Therefore, when the side airbag 16 inflates and expands, the spreading-out of the partitioning wall 22 at the position of the check valve 24 is limited. The one-side bag thickness of the side airbag 16 at this cross-sectional position is Wr.

Figure 11:
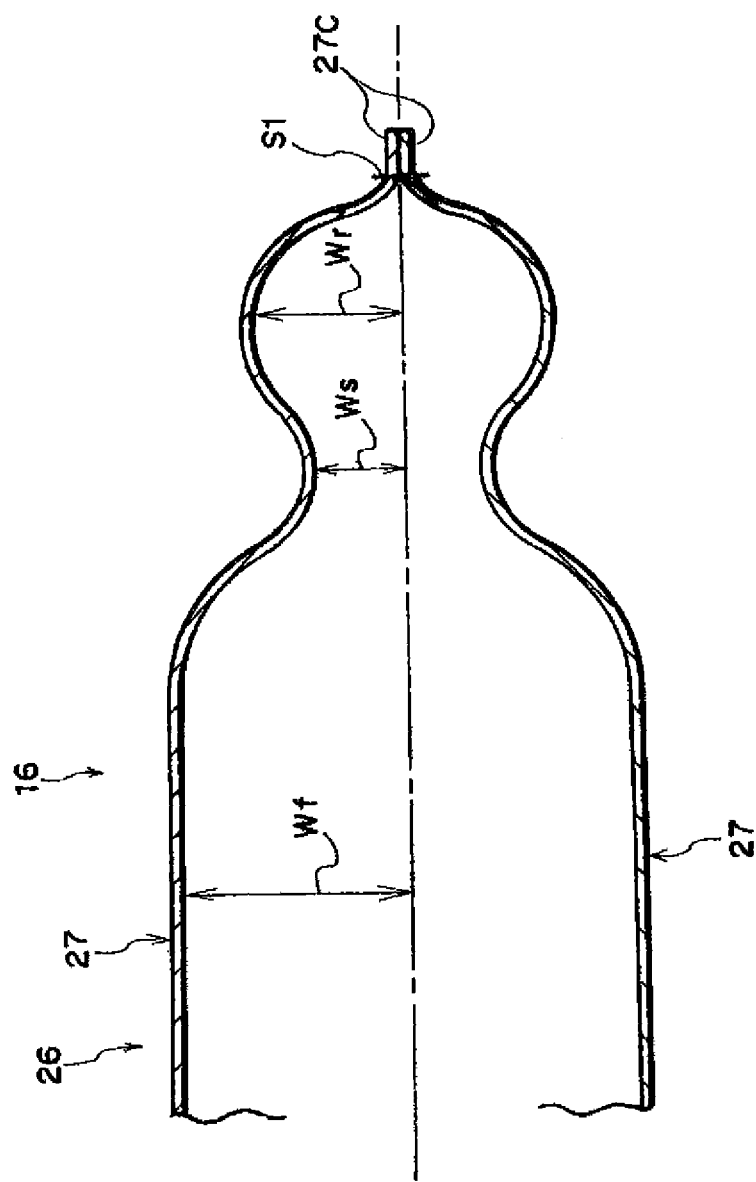
Figure 12:
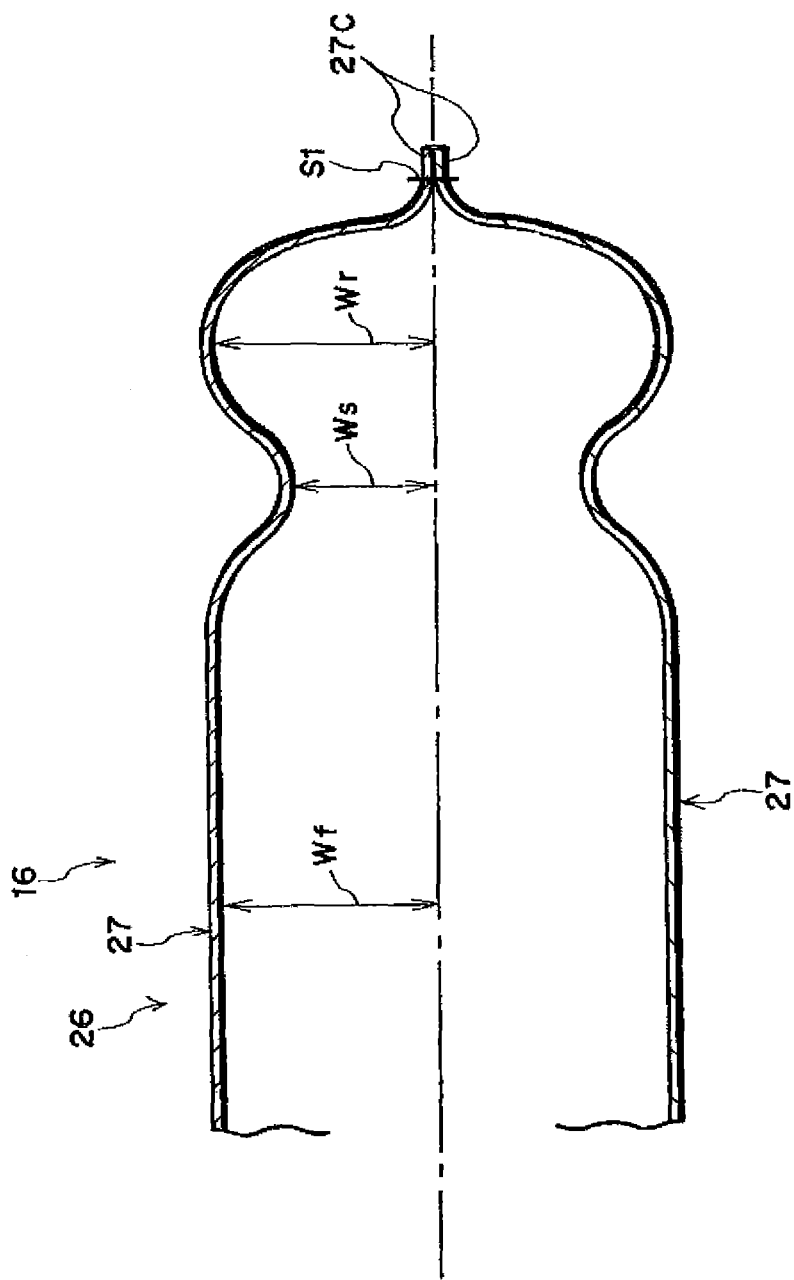

FIG. 11 is an enlarged sectional schematic view of main portions seen in the direction of arrows F11-F11 in FIG. 2, showing examples of inflated thicknesses of respective portions of the side airbag 16. As shown in this FIG. 11, the relationship between Wf, Ws, Wr is, for example, Wf>Wr>Ws. Note that the relationship between the inflated thicknesses of the respective portions is not limited to this, and, as shown in FIG. 12, may be Wr≈Wf>Ws. Note that, as shown in FIG. 1, when the side airbag 16 inflates and expands, the portion that is the sewn portion S4 is positioned at the side portion of the seat back 14, and does not contribute very much to the restraining of the passenger 32. Accordingly, by suppressing the inflated thickness of such a region, the bag volume of the side airbag 16 is cut-down, and the side airbag 16 can be inflated and expanded more rapidly into the space between the passenger 32 and the vehicle side portion (not illustrated).

Next, as shown in FIG. 10, when jetting-out of gas from the inflator 18 ends, gas attempts to flow backward from the lower chamber 26 side that is the high pressure chamber to the upper chamber 28 side that is the low pressure chamber, but, due to the check valve 24 closing at this time, such backward flow of gas is restricted.

Concretely, in FIG. 2, the sewn portion S4 is provided such that Ls<L. Therefore, of the seat rear end portions 22B of the folded-in end edge 22A, the range of L-Ls at the vehicle upper side from the folded-in end edge 22A can be made to function as the check valve 24. Due thereto, as shown in FIG. 10, even in a state in which the partitioning wall 22 is spread-out in the vehicle transverse direction due to the inflation and expansion of the side airbag 16, a region at which the seat rear end portions 22B of the folded-in end edge 22A fit snugly together can be ensured. Further, of the partitioning wall 22, the end edges 22E at the seat rear side at which the check valve 24 is positioned are fixed by being sewn to the end edges 27C of the lower base cloth 27 at the sewn portion S1. Therefore, inverting of the check valve 24 toward the upper chamber 28 side can be suppressed even more.

In this way, when gas attempts to flow backward from the lower chamber 26 to the upper chamber 28, because the check valve 24 is closed by the internal pressure of the lower chamber 26, such backward flow of gas can be restricted, and the internal pressure of the lower chamber 26 can be maintained over a longer time. Accordingly, as shown in FIG. 1, the waist portion 32W of the passenger 32 seated in the vehicle seat 12 can be restrained at an early stage and in a high pressure state by the lower chamber 26. Further, because the internal pressure of the lower chamber 26 can be maintained by the check valve 24 for a longer time, the passenger restraining performance at the time of a side collision can be improved more.

On the other hand, gas is preferentially supplied to the lower chamber 26, and, due to the backward flow of gas from the lower chamber 26 side to the upper chamber 28 being restricted, the upper chamber 28 is in a relatively low pressure state. As shown in FIG. 1, the chest portion 32C, the shoulder portion 32S, the upper arm portion (not illustrated), and the abdomen portion 32A of the passenger 32 can be restrained at an appropriate restraining force by the upper chamber 28.

Further, due to the lower chamber 26 and the upper chamber 28 at the side airbag 16 being divided by the partitioning wall 22 that has a predetermined width, as compared with a structure in which a bag portion for the chest portion and a bag portion for the waist portion are divided due to sewing together at the border portion thereof, the bag thickness of the side airbag 16 at the border portion can be ensured to be large, and the inflation and expansion of the side airbag 16 can be stabilized more.

(Method of Sewing Side Airbag)

The method of sewing the side airbag 16 relating to the present embodiment is a method of sewing a side airbag that has the lower chamber 26 that becomes the high pressure side at the time of inflation and expansion, and the upper chamber 28 that becomes lower pressure than the lower chamber 26, and in which the lower chamber 26 and the upper chamber 28 are formed by base cloths (the lower base cloth 27, the upper base cloths 29) that are respectively separate bodies and are divided by the partitioning wall 22, and the partitioning wall 22 is formed by a portion of the lower base cloth 27 that forms the lower chamber 26, the method having a step of forming, at a partial region of the partitioning wall 22, the check valve 24 that permits flowing of gas for inflation from the upper chamber 28 side to the lower chamber 26 side, and restricts flowing of gas in the direction opposite thereto.

Further, the method of sewing the side airbag 16 relating to the present embodiment has a step of folding the lower base cloth 27, that forms the lower chamber 26, in two convexly toward the lower chamber 26 side at the region that becomes the central portion of the partitioning wall 22, and sewing both end portions in the bag thickness direction (the upper end portions 27U of the lower base cloth 27) of the region that becomes the partitioning wall 22 to the upper base cloths 29 that form the upper chamber 28, and a step of folding-over the lower base cloth 27 that forms the lower chamber 26, respectively toward the bag outer sides and the lower chamber 26 side at both end portions in the bag thickness direction (the upper end portions 27U of the lower base cloth 27) of the region that becomes the partitioning wall 22, and, at the peripheral edge portion of the lower chamber 26, sewing together the end edges 27C of the lower base cloth 27 that forms the lower chamber 26, and, at the peripheral edge portion of the upper chamber 28, sewing together the end edges 29C of the upper base cloths 29 that form the upper chamber 28.

In accordance with this method of sewing, the partitioning wall 22 is formed by a portion of the lower base cloth 27 that forms the lower chamber 26. Therefore, as compared with a structure in which the lower base cloth 27 and the partitioning wall 22 are made to be separate bodies, costs required for sewing the side airbag 16 can be reduced.

Further, the check valve 24 for maintaining the internal pressure of the lower chamber 26 is formed by a partial region of the partitioning wall 22 being cut and being folded-in convexly toward the lower chamber 26 side. Therefore, as compared with a structure in which the check valve 24 is provided separately, costs required for sewing the side airbag 16 is reduced, and smaller size and lighter weight of the package formed by folding-up the side airbag 16 can be devised.

Moreover, by sewing together the end edges of the respective base cloths (the respective end edges 27C of the lower base cloth 27, the respective end edges 29C of the upper base cloths 29) at the peripheral edge portion of the lower chamber 26 and the peripheral edge portion of the upper chamber 28, the lower chamber 26 and the upper chamber 28 can be formed by sewing of a single time.

[Second Embodiment]

Figure 13:
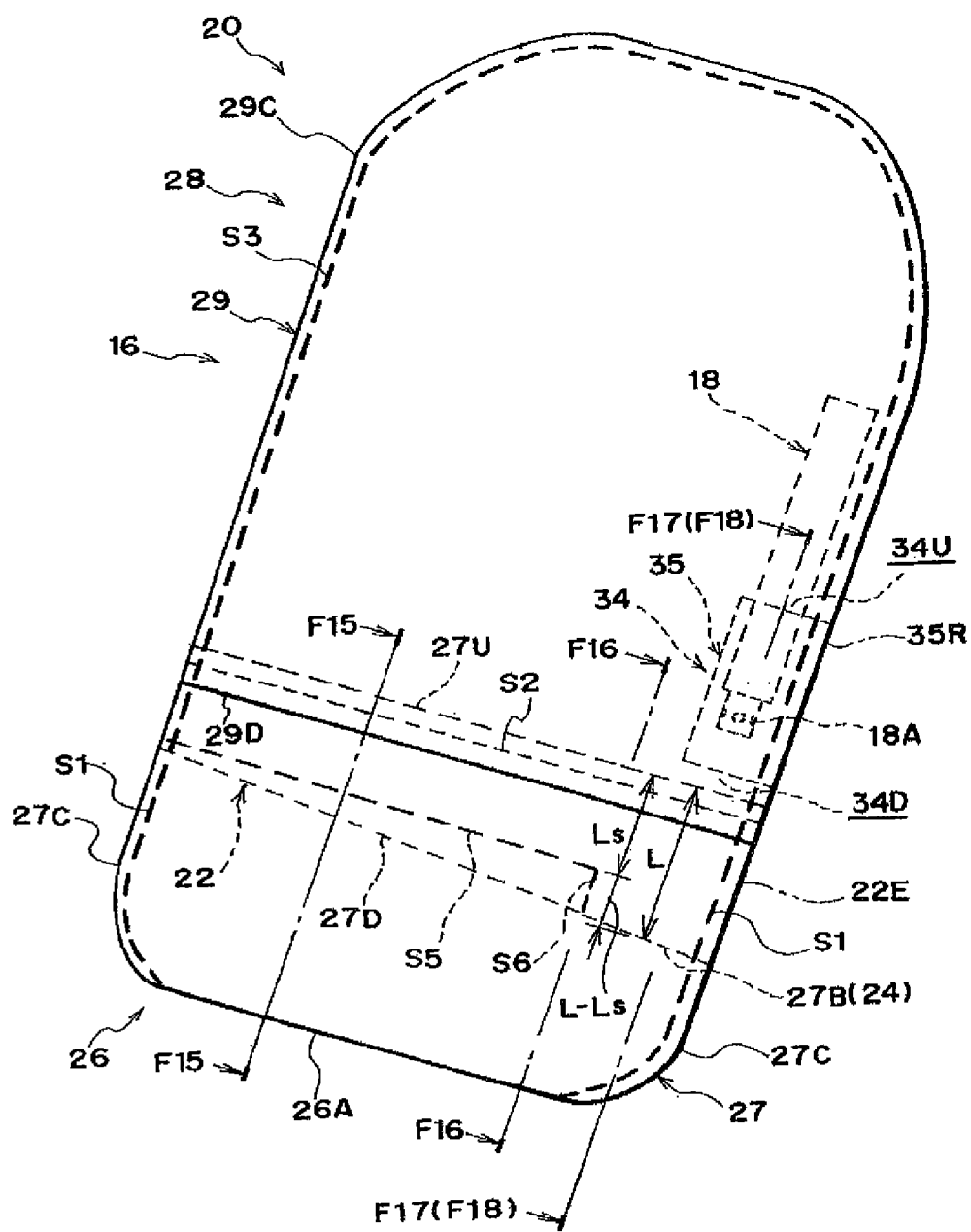
FIG. 13 through FIG. 18 relate to a second embodiment.
Figure 14:
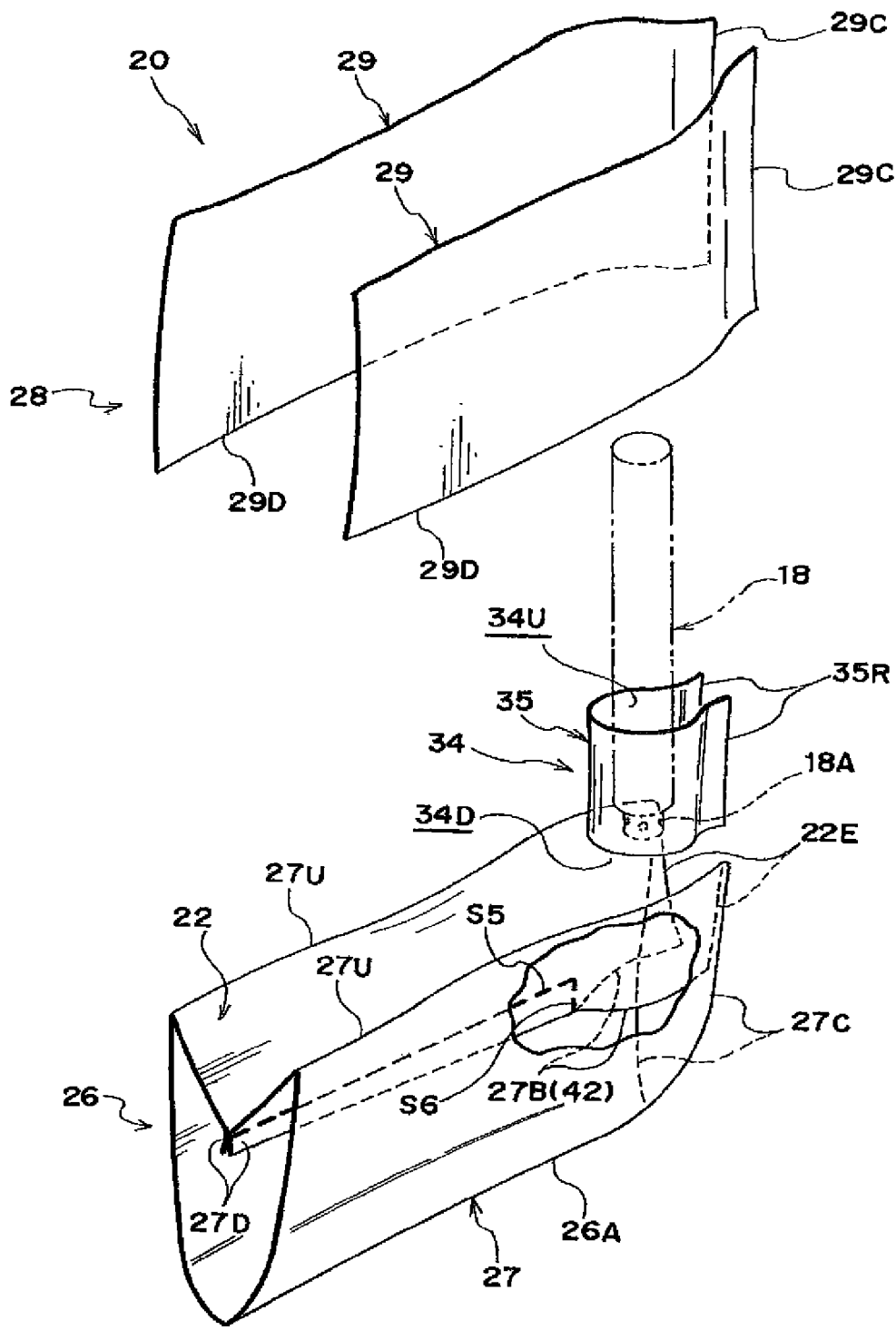

In FIG. 13, FIG. 14, at a side airbag device 20 relating to the present embodiment, the method of sewing the lower chamber 26 that is the high pressure chamber differs from the first embodiment. Concretely, the lower base cloth 27 that forms the lower chamber 26 is folded in two at a bottom portion 26A of the lower chamber 26, and is folded-over respectively toward the bag inner side and the lower chamber 26 side at both end portions in the bag thickness direction (the upper end portions 27U of the lower base cloth 27) of the region that becomes the partitioning wall 22, and end edges 27D are sewn together (sewn portions S5, S6) at the region that becomes the central portion of the partitioning wall 22, and the end edges 27C that are positioned at the peripheral edge portion of the lower chamber 26 are sewn together (sewn portion S1).

As shown in FIG. 13, the length from the upper end portions 27U to the end edges 27D at the lower base cloth 27 increases rectilinearly from the seat front side toward the seat rear side for example, and becomes a maximum (length L) at seat rear end portions 27B of the end edges 27D that become the check valve 24. On the other hand, the length Ls from the upper end portions 27U to the sewn portion S5 is shorter than the length L, and is constant for example, and the ridge lines of the upper end portions 27U and the sewn portion S5 are substantially parallel. The sewn portion S6 extends in a direction intersecting the sewn portion S5, from the seat rear end portion of the sewn portion S5 to the end edges 27D. The sewn portions S5, S6 can be sewn at one time by rotating the lower base cloth 27 at the intersection point of the sewn portions S5, S6.

By providing the sewn portion S6 in this way, the range of L-Ls at the vehicle upper side from the end edges 27D, of the seat rear end portions 27B of the end edges 27D, can be made to function as the check valve 24. In other words, a partial region, that is further toward the seat rear side than the sewn portion S6, at the partitioning wall 22 can be made to function as the check valve 24.

Because the other portions are similar to the first embodiment, the same portions are denoted by the same reference numerals in the drawings, and description thereof is omitted.

(Operation)

The present embodiment is structured as described above, and the operation thereof is described hereafter. In FIG. 13, at the side airbag device 20 relating to the present embodiment, the lower base cloth 27 that forms the lower chamber 26 is folded in two at the bottom portion 26A of the lower chamber 26, and, at both end portions in the bag thickness direction (the upper end portions 27U) of the region that becomes the partitioning wall 22, is folded-over respectively toward the bag inner side and the lower chamber 26 side, and, at the region that becomes the central portion of the partitioning wall 22, the end edges 27D are sewn together. Therefore, it is easy to make a partial region of the partitioning wall 22 be the check valve 24. Further, sewing of the side airbag 16 can be lessened because the lower chamber 26 is formed by the end edges 27C of the lower base cloth 27, that are positioned at the peripheral edge portion of the lower chamber 26, being sewn together at the lower base cloth 27 that forms the lower chamber 26. Therefore, the mass-productivity of the side airbag 16 can be improved.

Figure 17:
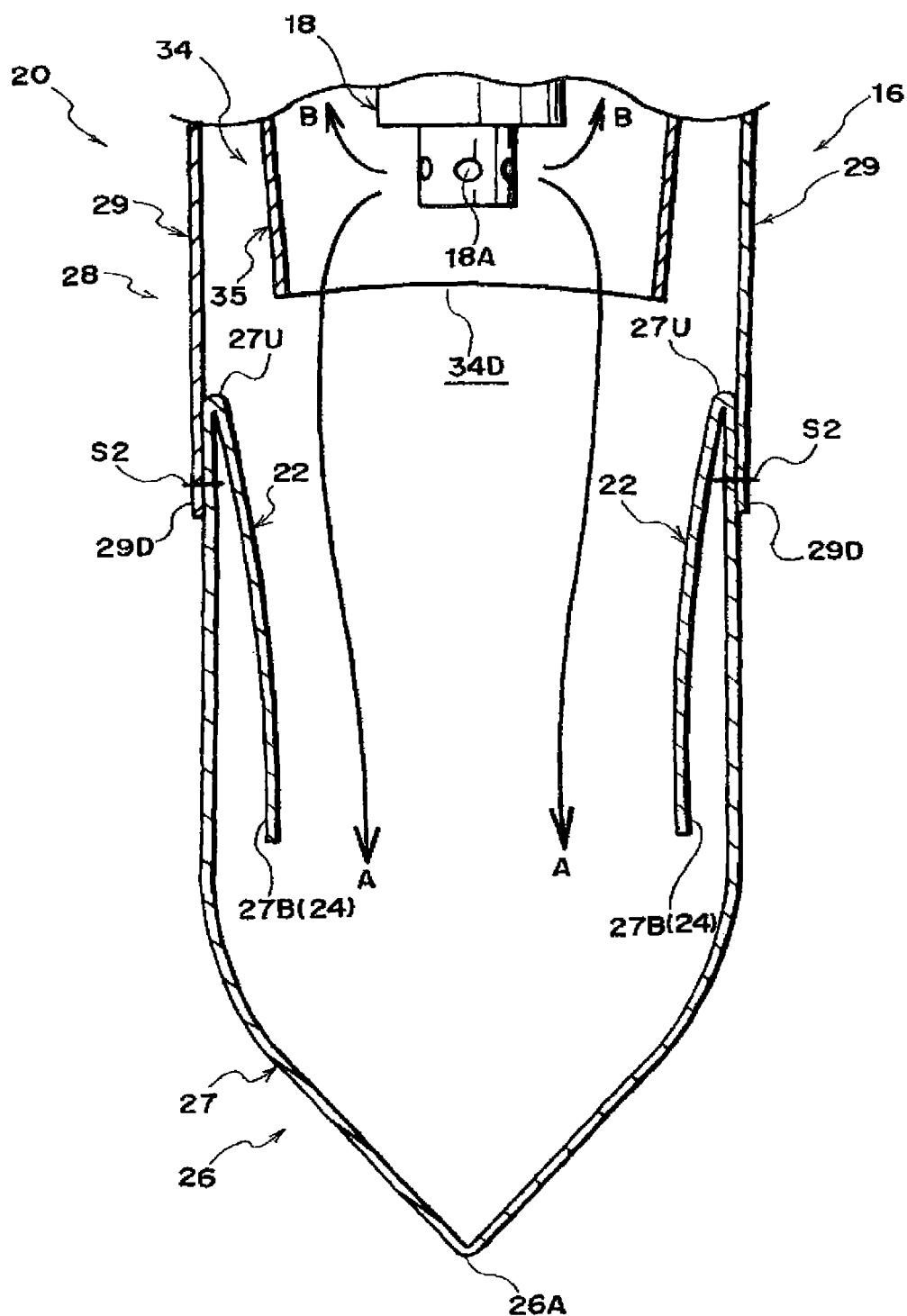

At the time of a side collision, when the inflator 18 operates and the side airbag 16 inflates and expands, as shown in FIG. 17, the check valve 24 opens due to pressure of the gas that is jetted-out from the lower opening portion 34D of the diffuser 34, and gas from the inflator 18 is supplied in the arrow A direction into the lower chamber 26 through the check valve 24. Further, at this time, gas that is jetted-out from the inflator 18 is guided also in the arrow B direction through the gap between the inflator 18 and the diffuser 34, and is supplied into the upper chamber 28 through the upper opening portion 34U of the diffuser 34 (see FIG. 13 as well).

Because the gas jetting-out portions 18A of the inflator 18 are disposed so as to be directed toward the lower chamber 26 side, gas that is jetted-out from the gas jetting-out portions 18A is preferentially supplied to the lower chamber 26. Accordingly, the lower chamber 26 can be inflated and expanded before the upper chamber 28.

Figure 15:
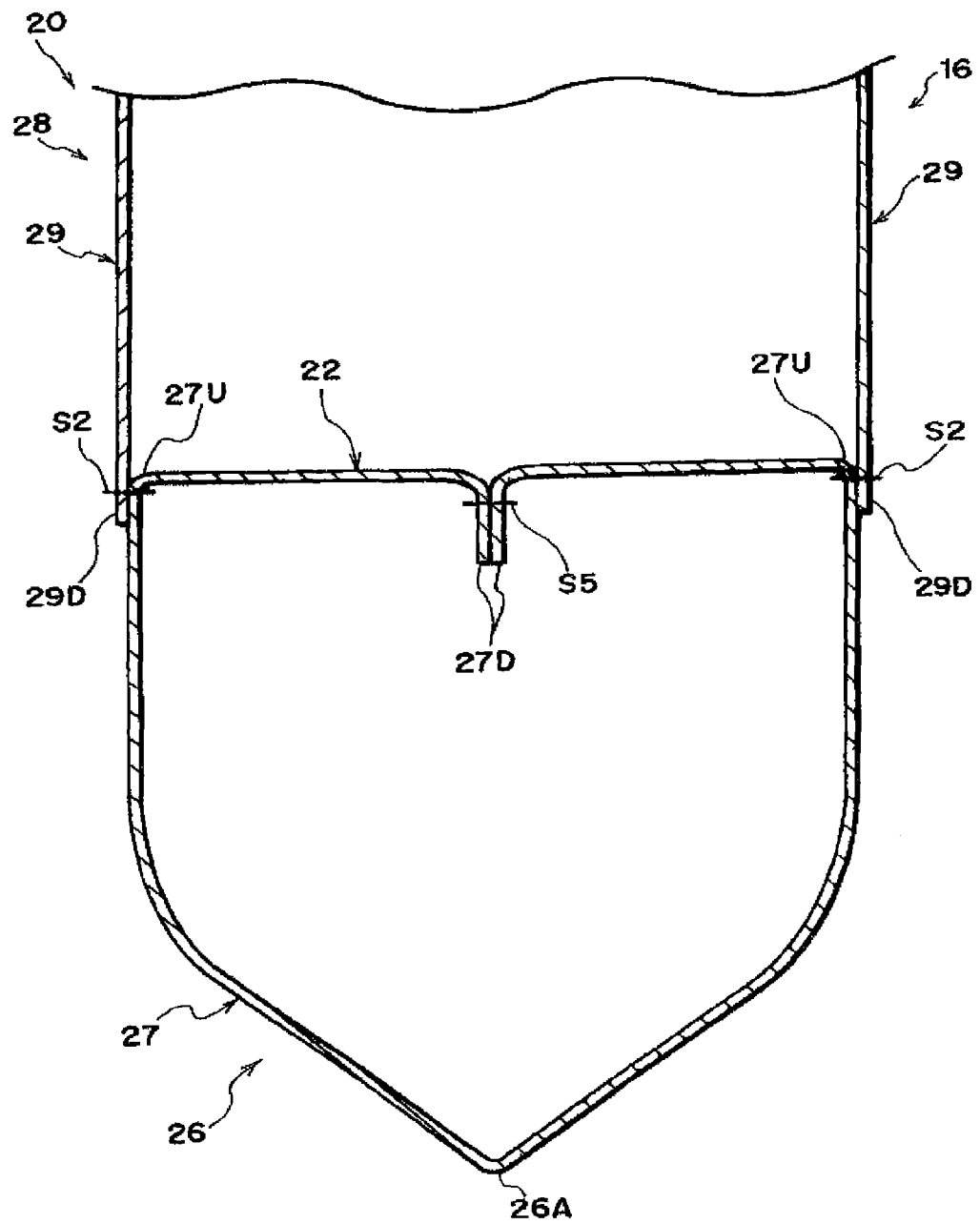

Here, FIG. 15 is an enlarged sectional view seen in the direction of arrows F15-F15 in FIG. 13, showing an example of the state of the partitioning wall 22. As shown in FIG. 13, accompanying the enlarging of the bag thickness at the time of inflation and expansion of the side airbag 16, the partitioning wall 22 becomes a state of being spread-out in the vehicle transverse direction (the thickness direction of the side airbag 16).

Figure 16:
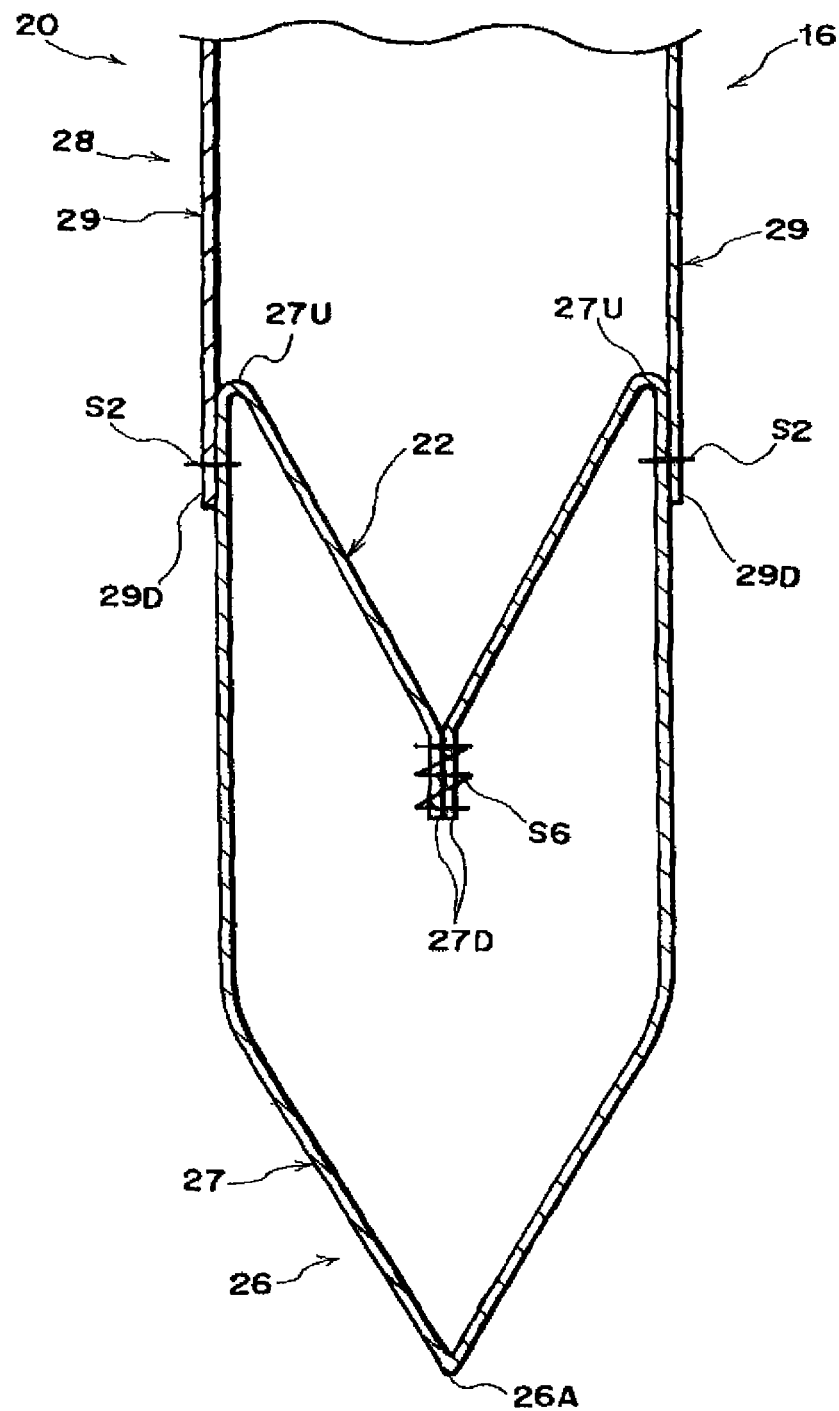

FIG. 16 is an enlarged sectional schematic view of main portions seen in the direction of arrows F16-F16 in FIG. 13, showing an example of the state of the partitioning wall 22 in the vicinity of the check valve 24 when the side airbag 16 is inflated and expanded. As shown in FIG. 13, at the position of the sewn portion S6, the length Ls from the upper end portions 27U of the lower base cloth 27 to the sewn portion S5 is set to be shorter than the length L from the upper end portions 27U further toward the seat rear side than the sewn portion S4, to the end edges 27D (the seat rear end portions 27B) of the lower base cloth 27 (Ls<L). Accordingly, as shown in FIG. 15, FIG. 16, the width of the partitioning wall 22 at the position of the sewn portion S6 when the side airbag 16 is inflated and expanded, is narrower than the width of the partitioning wall at the seat front side of the sewn portion S5.

Figure 18:
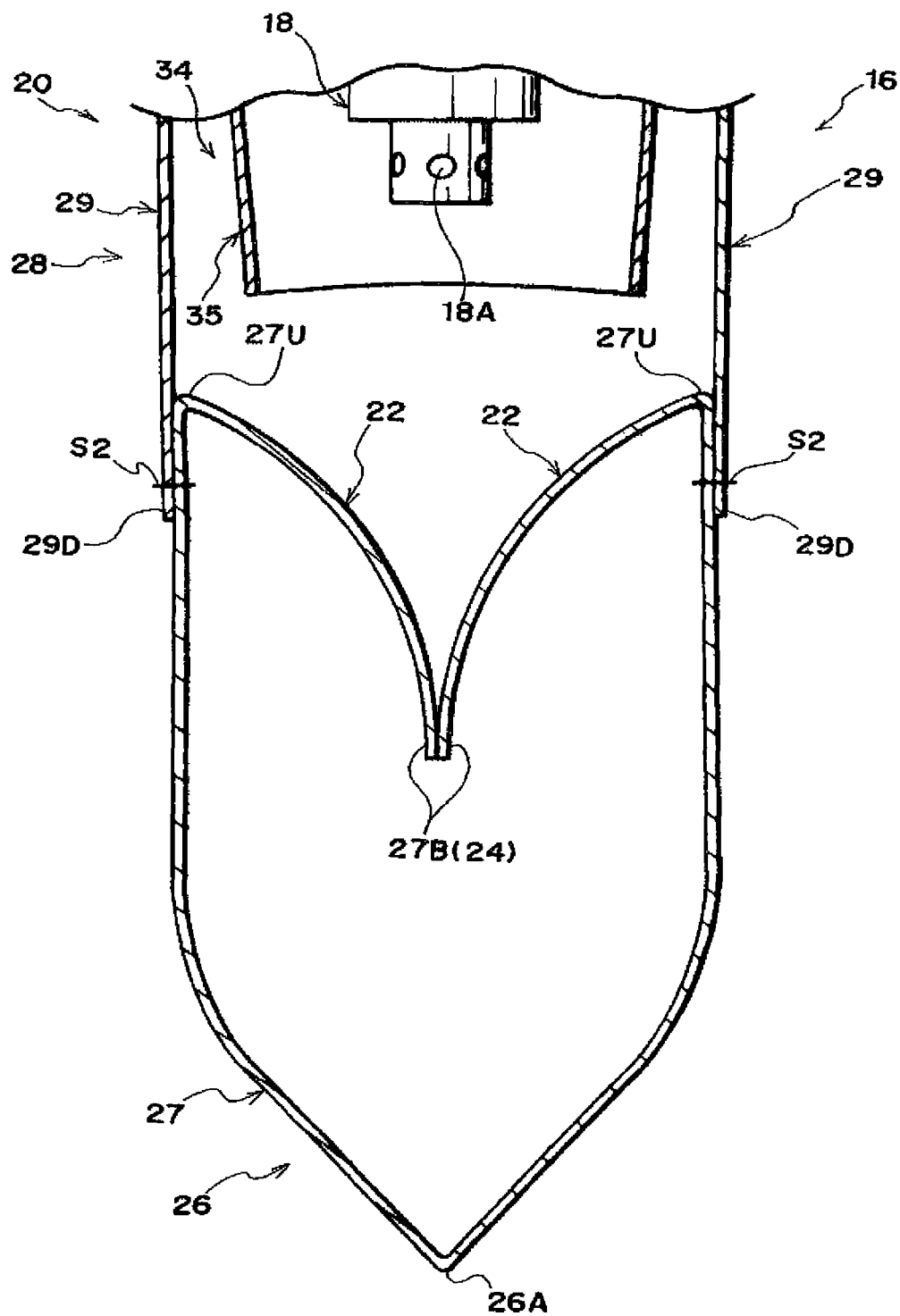

Next, as shown in FIG. 18, when the jetting-out of gas from the inflator 18 ends, gas attempts to flow backward from the lower chamber 26 side that is the high pressure chamber to the upper chamber 28 side that is the low pressure chamber, but such backward flow of the gas is restricted due to the check valve 24 closing at this time.

Concretely, in FIG. 13, the sewn portion S6 is provided such that Ls<L. Therefore, of the seat rear end portions 27B of the end edges 27D, the range of L-Ls at the vehicle upper side from the end edges 27D can be made to function as the check valve 24. Due thereto, as shown in FIG. 18, even in the state in which the partitioning wall 22 has spread-out in the vehicle transverse direction due to the inflation and expansion of the side airbag 16, a region at which the seat rear end portions 27B of the end edges 27D fit snugly together can be ensured.

(Method of Sewing Side Airbag)

The method of sewing the side airbag 16 relating to the present embodiment is a method of sewing a side airbag that has the lower chamber 26 that becomes the high pressure side, and the upper chamber 28 that becomes lower pressure than the lower chamber 26 at the time of inflation and expansion, and in which the lower chamber 26 and the upper chamber 28 are formed by base cloths (the lower base cloth 27, the upper base cloths 29) that are respectively separate bodies and are divided by the partitioning wall 22, and the partitioning wall 22 is formed by a portion of the lower base cloth 27 that forms the lower chamber 26, the method having a step of forming, at a partial region of the partitioning wall 22, the check valve 24 that permits flowing of gas for inflation from the upper chamber 28 side to the lower chamber 26 side, and restricts flowing of gas in the direction opposite thereto.

Further, the method of sewing the side airbag 16 relating to the present embodiment has a step of folding the lower base cloth 27, that forms the lower chamber 26 that is the high pressure chamber, in two at the bottom portion 26A of the lower chamber 26, and sewing both end portions in the bag thickness direction (the upper end portions 27U of the lower base cloth 27) of the region that becomes the partitioning wall 22, of the lower base cloth 27, to the upper base cloths 29 that form the upper chamber 28 that is the low pressure chamber, and a step of folding-over the lower base cloth 27 that forms the lower chamber 26, respectively toward the bag inner side and the lower chamber 26 side from the position sewn with the upper base cloths 29 that form the upper chamber 28, and sewing the end edges 27D thereof together excluding the partial region that becomes the check valve 24, and a step of, at the peripheral edge portion of the lower chamber 26, sewing together the end edges 27C of the lower base cloth 27 that forms the lower chamber 26, and, at the peripheral edge portion of the upper chamber 28, sewing together the end edges 29C of the upper base cloths 29 that form the upper chamber 28.

In accordance with this method of sewing, the partitioning wall 22 is formed by a portion of the lower base cloth 27 that forms the lower chamber 26. Therefore, as compared with a structure in which the lower base cloth 27 and the partitioning wall 22 are made to be separate bodies, costs required for sewing the side airbag 16 can be reduced.

Further, the check valve 24 for maintaining the internal pressure of the lower chamber 26 is formed by the end edges 27D of the lower base cloth 27 being sewn together, excluding the partial region that becomes the check valve 24. Therefore, as compared with a structure in which the check valve 24 is provided separately, costs required for sewing the side airbag 16 is reduced, and smaller size and lighter weight of the package formed by folding-up the side airbag 16 can be devised.

Moreover, at the peripheral edge portion of the lower chamber 26, the end edges 27C of the lower base cloth 27 that forms the lower chamber 26 are sewn together, and, at the peripheral edge portion of the upper chamber 28, the end edges 29C of the upper base cloths 29 that form the upper chamber 28 are sewn together, and the lower chamber 26 and the upper chamber 28 can thereby be formed by sewing of a single time. Therefore, costs required for sewing the side airbag 16 can be further reduced.

[Third Embodiment]

Figure 19:
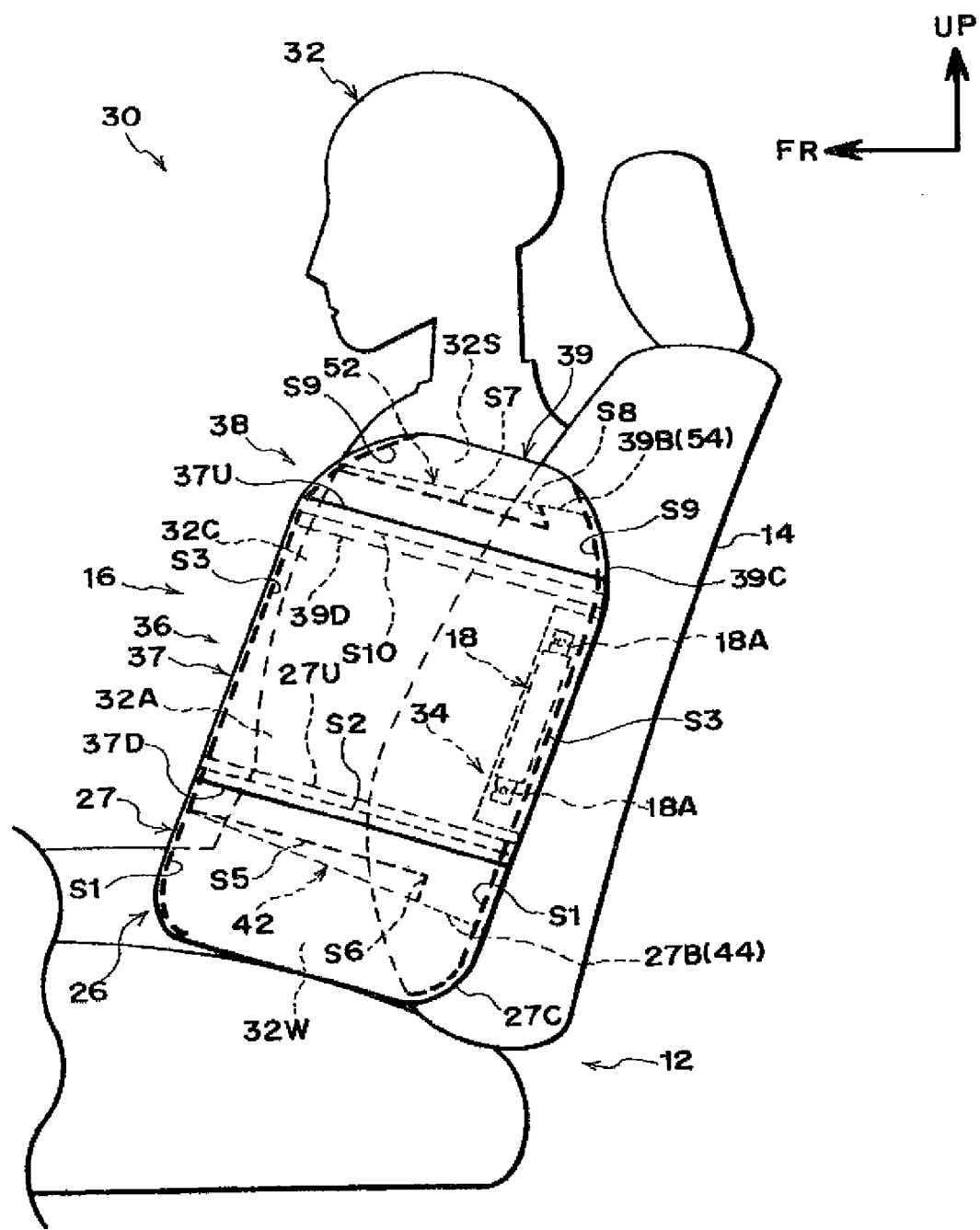
FIG. 19 through FIG. 21 relate to a third embodiment.
Figure 20:
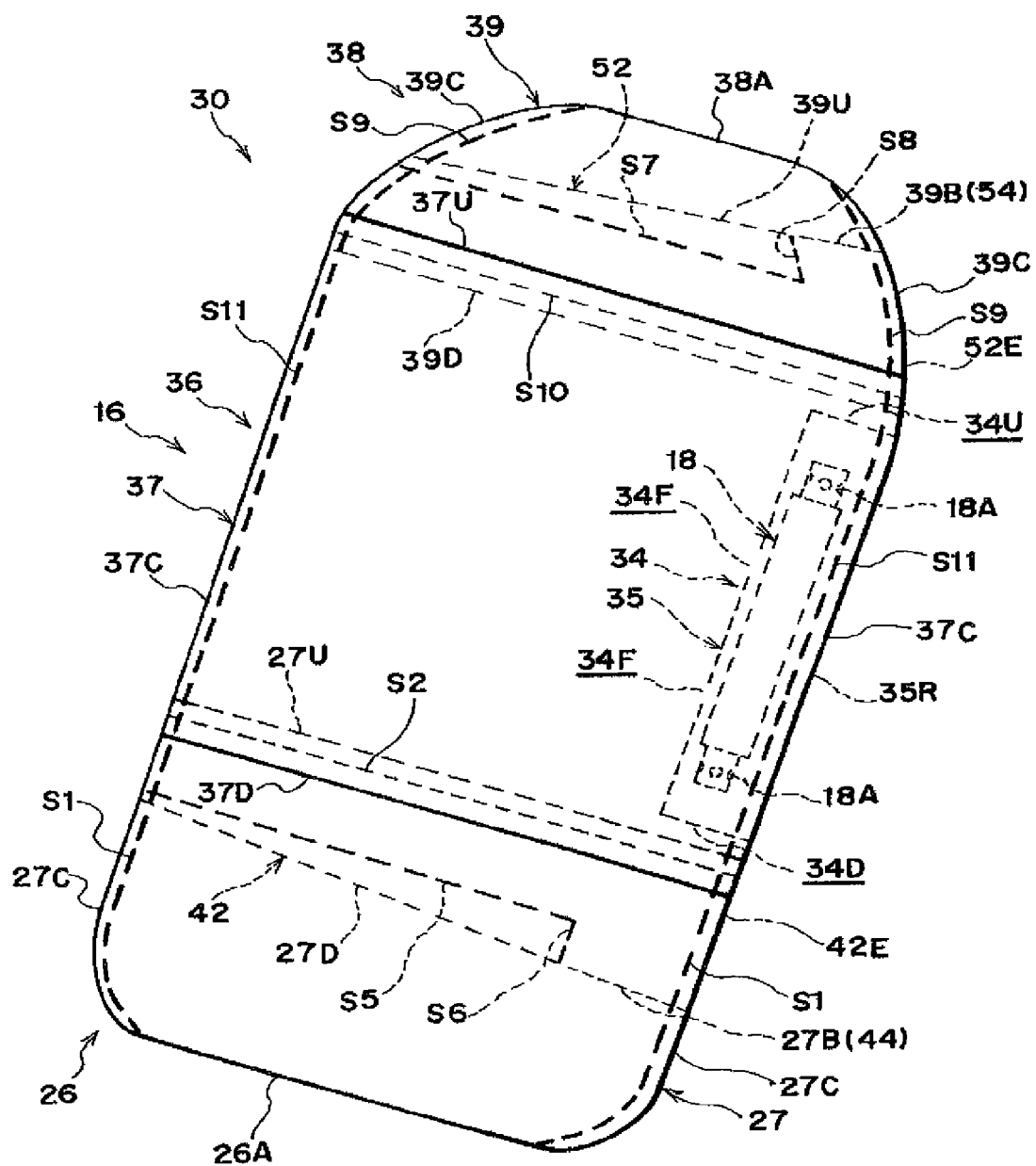
Figure 21:
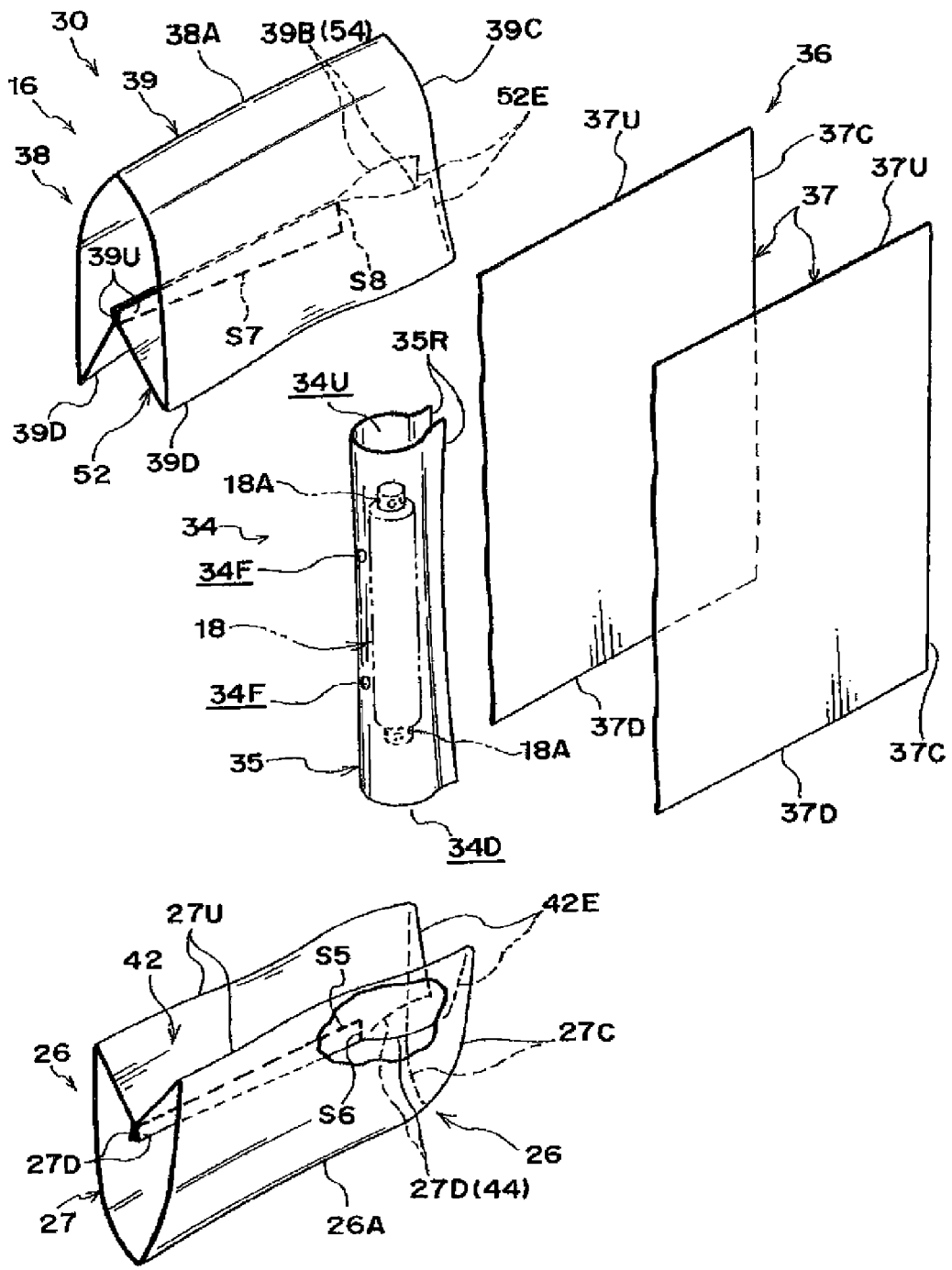

From FIG. 19 to FIG. 21, a side airbag device 30 relating to the present embodiment has, as high pressure chambers of the side airbag 16, the lower chamber 26 that corresponds to the waist portion 32W of the passenger 32 seated in the vehicle seat 12 and an upper chamber 38 that corresponds to the shoulder portion 32S of the passenger 32, and, as a low pressure chamber of the side airbag 16, an intermediate chamber 36 that is positioned between the upper chamber 38 and the lower chamber 26 and that corresponds to the chest portion 32C of the passenger 32. The lower chamber 26 and the intermediate chamber 36 are divided by a lower partitioning wall 42, and the lower partitioning wall 42 is a region corresponding to the partitioning wall 22 of the second embodiment. Further, the upper chamber 38 and the intermediate chamber 36 are divided by an upper partitioning wall 52. The structure and the method of sewing the lower chamber 26 are similar to the structure of the first embodiment or the second embodiment. The illustrated structure is the structure of the second embodiment. Although not illustrated, the bag thickness of the lower chamber 26 is set to be thicker than the bag thickness of the upper chamber 38.

Further, the upper chamber 38 is structured similarly to the lower chamber 26, and is disposed with the upper side and the lower side thereof being the reverse of those of the lower chamber 26. Concretely, an upper base cloth 39 that forms the upper chamber 38 is folded in two at a bottom portion 38A of the upper chamber 38, and, at both end portions in the bag thickness direction (lower end portions 39D of the upper base cloth 39) of the region that becomes the upper partitioning wall 52, is folded-over respectively toward the bag inner side and the upper chamber 38 side, and, at the region that becomes the central portion of the upper partitioning wall 52, end edges 39U are sewn together (sewn portions S7, S8), and end edges 39C that are positioned at the peripheral edge portion of the upper chamber 38 are sewn together (sewn portion S9).

The length from the lower end portions 39D to the end edges 39U at the upper base cloth 39 increases rectilinearly from the seat front side toward the seat rear side for example, and becomes a maximum at the seat rear end portions 39B of the end edges 39U that become an upper check valve 54. On the other hand, the length from the lower end portions 39D to the sewn portion S7 is constant for example, and the ridge lines of the lower end portions 39D and the sewn portion S7 are substantially parallel. The sewn portion S8 extends in a direction intersecting the sewn portion S7, from the seat rear end portion of the sewn portion S7 to the end edges 39U. The sewn portions S8, S9 can be sewn at one time by rotating the upper base cloth 39 at the intersection point of the sewn portions S8, S9.

Of the lower partitioning wall 42, end edges 42E at the seat rear side where a lower check valve 44 is positioned are sewn to the end edges 27C of the lower base cloth 27 at the sewn portion S1. Further, of the upper partitioning wall 52, end edges 52E at the seat rear side where the upper check valve 54 is positioned are sewn to the end edges 39C of the upper base cloth 39 at the sewn portion S9.

The intermediate chamber 36 is formed by sewing lower end portions 37D of a pair of central base cloths 37 for example, that are positioned at the bag thickness direction both sides, to the upper end portions 27U of the lower base cloth 27 that forms the lower chamber 26 (sewn portions S2), and sewing upper end portions 37U to the lower end portions 39D of the upper base cloth 39 that forms the upper chamber 38 (sewn portions S10), and further, sewing end edges 37C together at the peripheral edge portion of the intermediate chamber 36 (sewn portion S11).

Note that the sewing at the sewn portions S1, S11, S9 can be carried out at one time by continuously sewing the peripheral edge portion of the side airbag 16, but are not limited to this, and may be carried out separately. Further, in the illustrated example, the intermediate chamber 36 is formed by sewing the end edges 37C of the pair of central base cloths 37, but is not limited to this, and the single central base cloth 37 may be folded in two toward the seat rear side (vehicle rear side) with the seat front side as the center for example, and the end edges 37C may be sewn together at the peripheral edge portion. Moreover, the intermediate chamber 36 is not limited to being formed by the end edges 37C of the central base cloths 37 being sewn, and, for example, may be formed by bag-weaving.

The diffuser 34 is structured to guide the gas for inflation mainly to the lower chamber 26 side and the upper chamber 38 side, and to guide the gas also to the intermediate chamber 36 side, and has the lower opening portion 34D that is an example of a main opening portion that opens to the lower chamber 26 side, and the upper opening portion 34U that is an example of a main opening portion that opens respectively to the upper chamber 38 side, and front opening portions 34F that are examples of auxiliary opening portions that open to the intermediate chamber 36 side.

This diffuser 34 is fixed to the central base cloths 37 by, for example, the single diffuser base cloth 35 being folded in two or rounded in the form of a tube, and the rear end edges 35R thereof being sewn together with the end edges 37C of the central base cloths 37 at the sewn portion S11. The lower opening portion 34D is disposed adjacent to the lower check valve 44 that is provided at the lower partitioning wall 42, and the upper opening portion 34U is disposed adjacent to the upper check valve 54 that is provided at the upper partitioning wall 52.

Note that, in the same way as the first embodiment, the inflator 18 may have the gas jetting-out portions 18A only at the lower chamber 26 side that corresponds to the waist portion 32W of the passenger 32. This is because, when the passenger 32 is restrained by the side airbag 16, it is preferable to restrain the waist portion 32W at an earlier stage than the shoulder portion 32S.

As shown in FIG. 21, the front opening portions 34F of the diffuser 34 are plural through-holes whose opening surface area is small as compared with the lower opening portion 34D and the upper opening portion 34U for example.

The inflator 18 that is disposed within the diffuser 34 has the gas jetting-out portions 18A at both ends for example, and can supply gas for inflation preferentially to the lower chamber 26 and the upper chamber 38.

Because the other portions are similar to the first embodiment or the second embodiment, the same portions are denoted by the same reference numerals in the drawings, and description thereof is omitted.

(Operation)

The present embodiment is structured as described above, and the operation thereof is described hereafter. In FIG. 19, at the side airbag device 30 relating to the present embodiment, at the side airbag 16 in the inflated and expanded state, the high pressure chambers are the lower chamber 26 that corresponds to the waist portion 32W of the passenger 32 seated in the vehicle seat 12 and the upper chamber 38 that corresponds to the shoulder portion 32S of the passenger 32, and the low pressure chamber is the intermediate chamber 36 that is positioned between the upper chamber 38 and the lower chamber 26 and that corresponds to the chest portion 32C of the passenger 32. Therefore, when the side airbag 16 inflates and expands, the lower chamber 26 and the upper chamber 38 become higher pressure than the intermediate chamber 36.

Concretely, the gas, that is jetted-out from the gas jetting-out portions 18A at the upper and lower ends when the inflator 18 operates, is supplied mainly to the lower chamber 26 and the upper chamber 38 through the diffuser 34, and further, is also supplied to the intermediate chamber 36. To describe in more detail, the gas that is supplied into the diffuser 34 from the inflator 18 is jetted-out to the lower chamber 26 side through the lower opening portion 34D of the diffuser 34, and is jetted-out to the upper chamber 38 side through the upper opening portion 34U.

The lower check valve 44 opens due to the pressure of the gas jetted-out from the lower opening portion 34D of the diffuser 34, and the upper check valve 54 opens due to the pressure of the gas jetted-out from the upper opening portion 34U of the diffuser 34. Due thereto, flowing of gas to the lower chamber 26 and the upper chamber 38 is permitted, and therefore, the gas from the inflator 18 is supplied into the lower chamber 26 through the lower check valve 44, and is supplied into the upper chamber 38 through the upper check valve 54. Gas is supplied through the front opening portions 34F of the diffuser 34 to the intermediate chamber 36.

Even when the jetting-out of gas from the inflator 18 ends and gas attempts to flow backward from the lower chamber 26 side and the upper chamber 38 side that are the high pressure chambers, the lower check valve 44 and the upper check valve 54 respectively close, and therefore, such backward flow of the gas is restricted. Therefore, the internal pressures of the lower chamber 26 and the upper chamber 38 can be maintained over a longer time.

Further, the waist portion 32W of the passenger 32 seated in the vehicle seat 12 can be restrained by the lower chamber 26 that is relatively high pressure, and the shoulder portion 32S of the passenger 32 can be restrained by the upper chamber 38 that similarly is relatively high pressure. Further, because the bag thickness of the lower chamber 26, that corresponds to the waist portion 32W of the passenger 32, is set to be thicker than the bag thickness of the upper chamber 38 that corresponds to the shoulder portion 32S of the passenger 32, when the passenger 32 is restrained by the side airbag 16, the restraining force with respect to the waist portion 32W can be generated at a timing that is earlier than the shoulder portion 32S. Moreover, the chest portion 32C of the passenger 32 can be restrained by the intermediate chamber 36 that is relatively low pressure. In the present embodiment, the intermediate chamber 26 corresponds not only to the chest portion 32C of the passenger 32, but also to the abdomen portion 32A.

In this way, in accordance with the side airbag device 30, the respective portions of the upper body of the passenger 32 can respectively be restrained at appropriate timings and by appropriate restraining forces by the side airbag 16 that inflates and expands between a vehicle side portion (not illustrated) and the passenger 32 at the time of a side collision.

[Fourth Embodiment]

Figure 22:
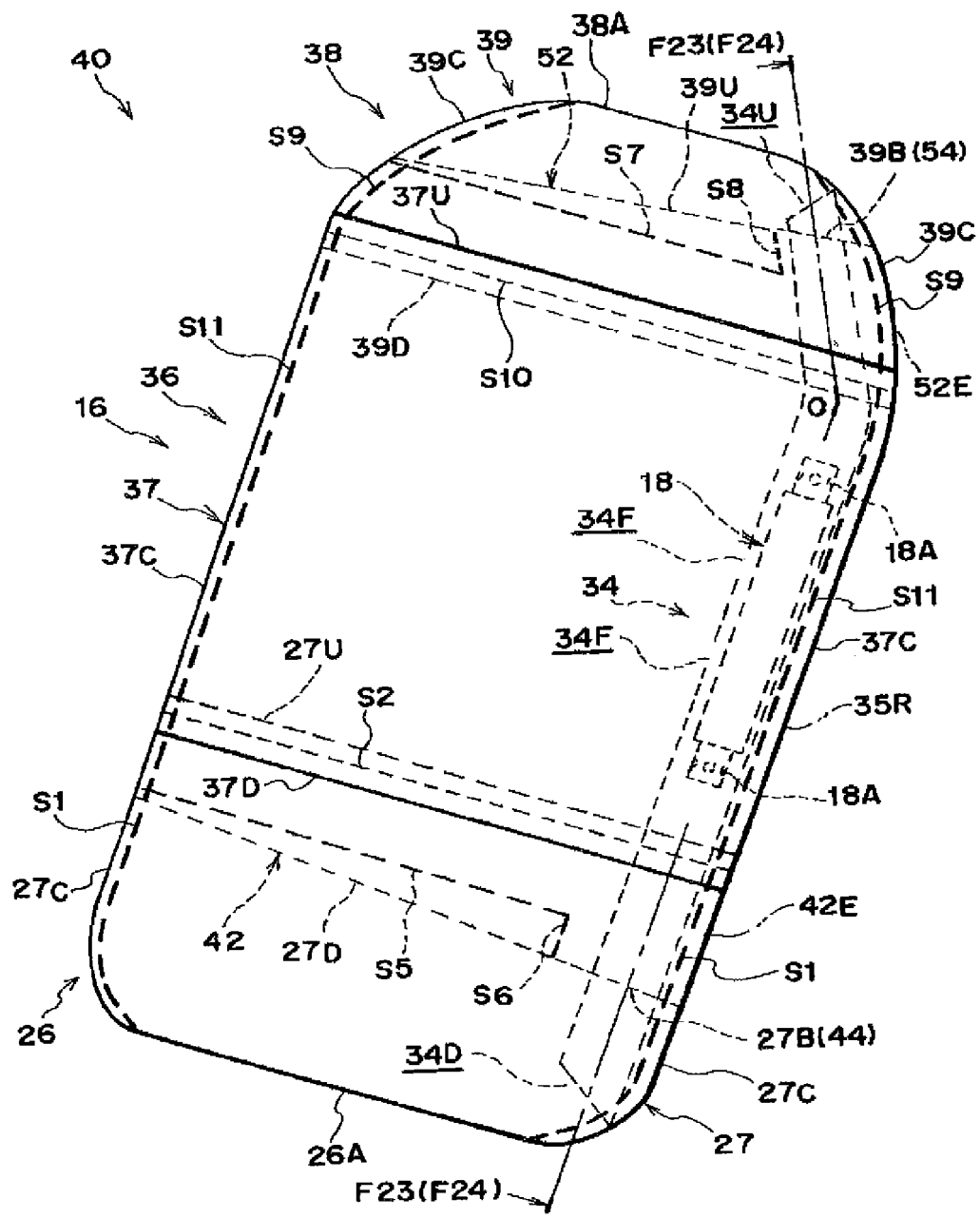
FIG. 22 through FIG. 24 relate to a fourth embodiment.
Figure 23:
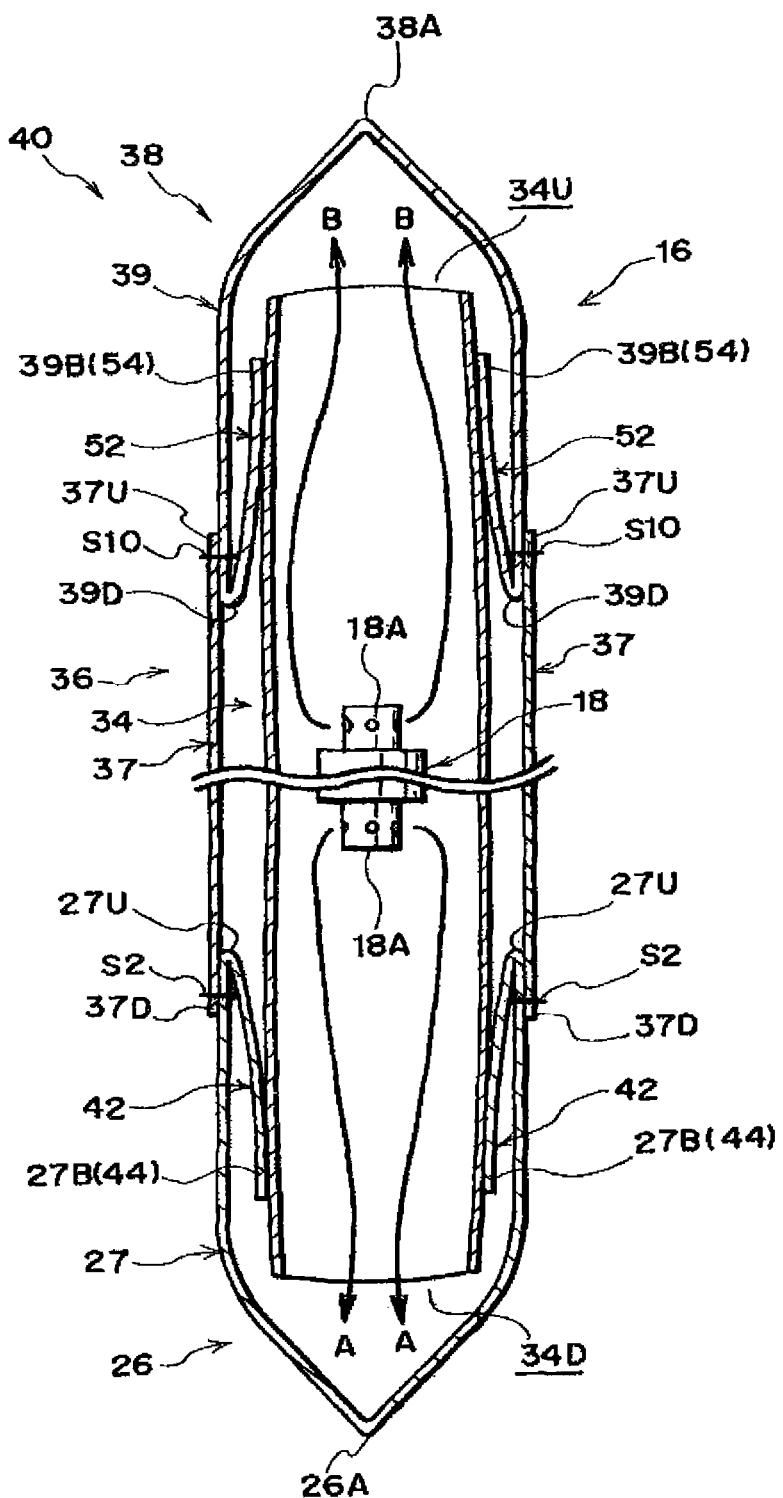
Figure 24:
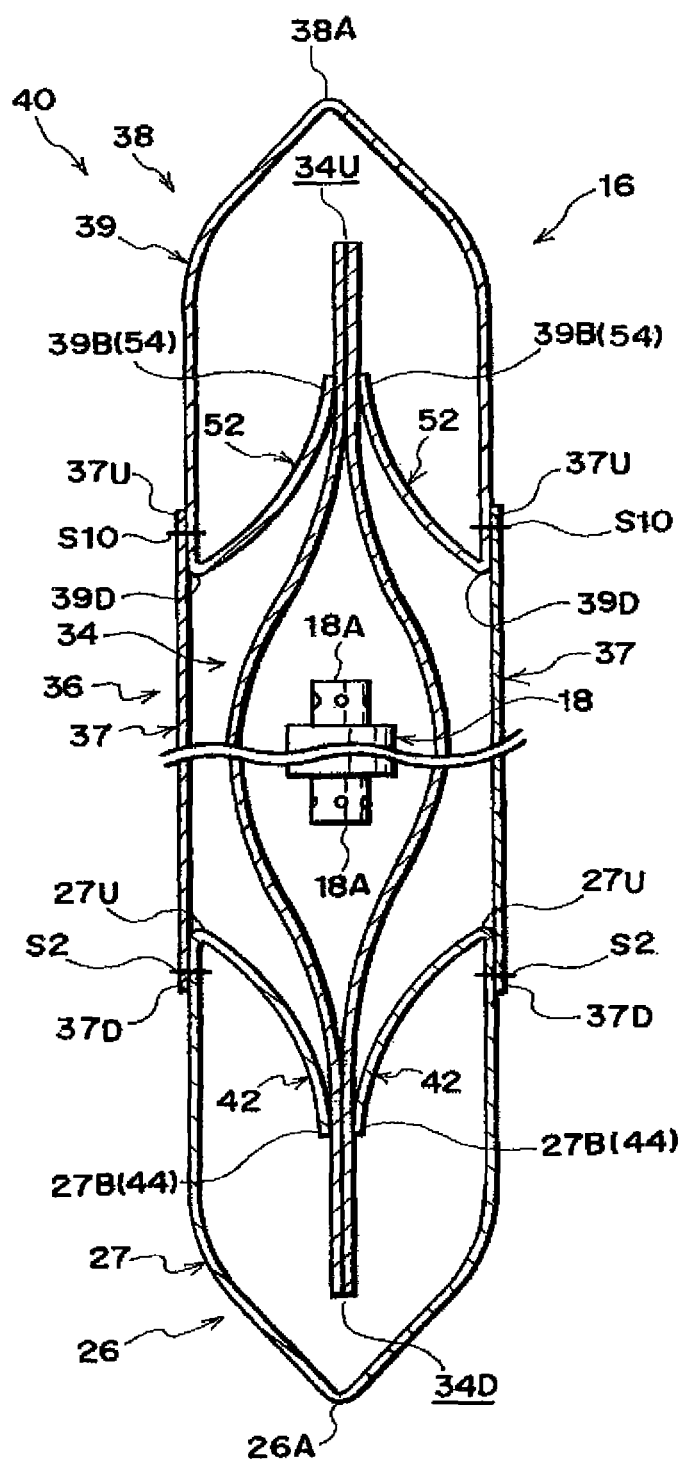
Figure 25:
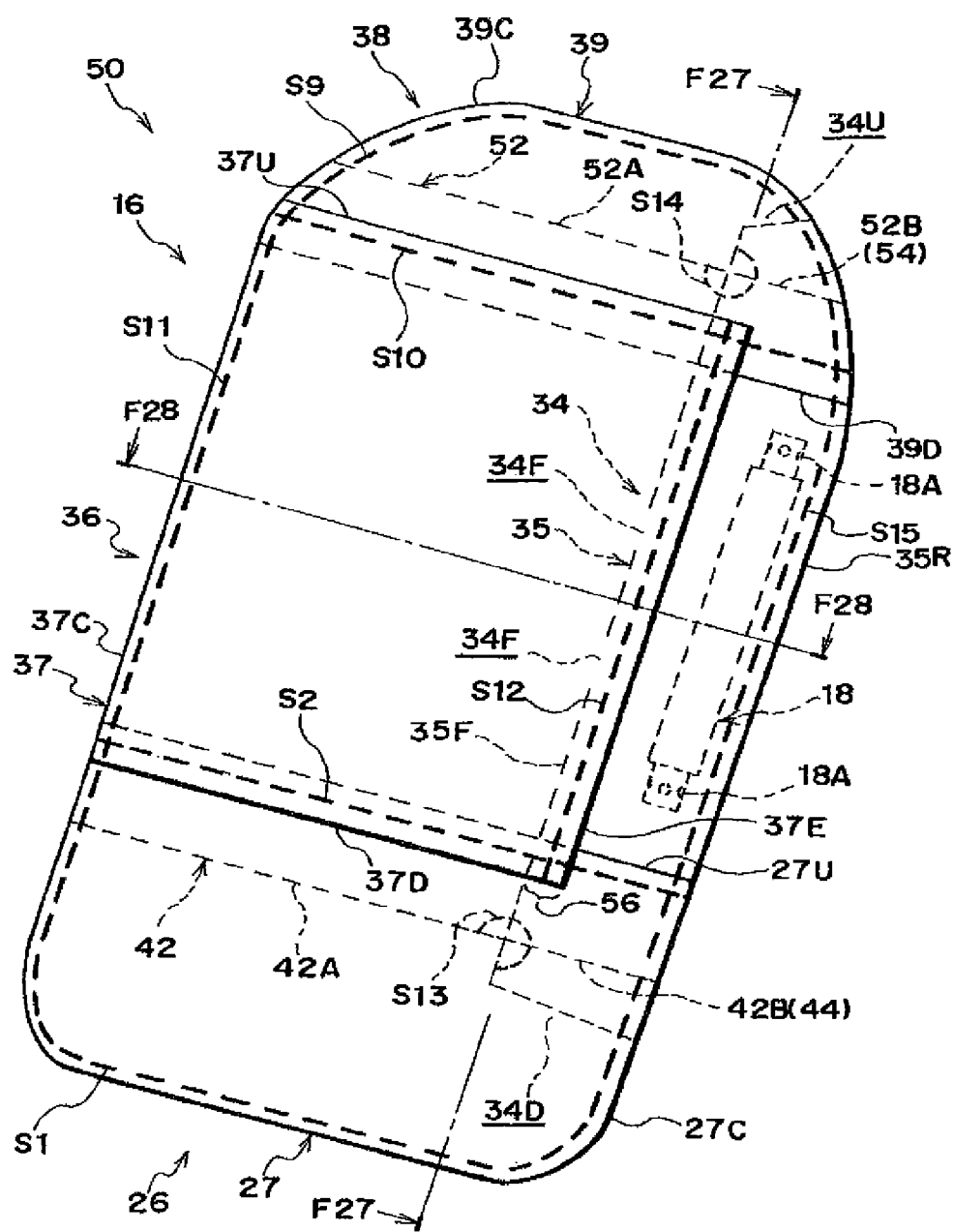
FIG. 25 through FIG. 28 relate to a fifth embodiment.
Figure 26:
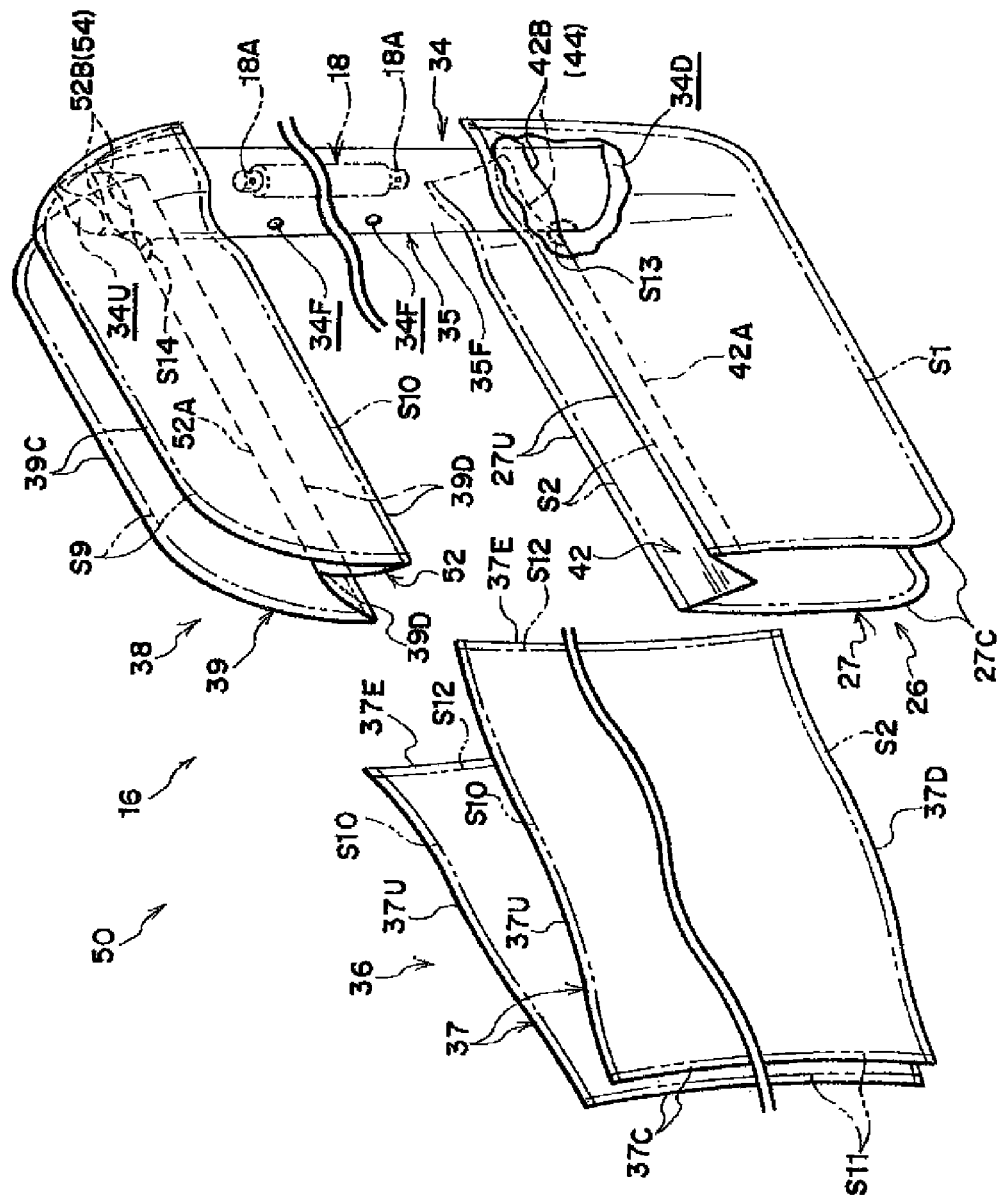
Figure 27:
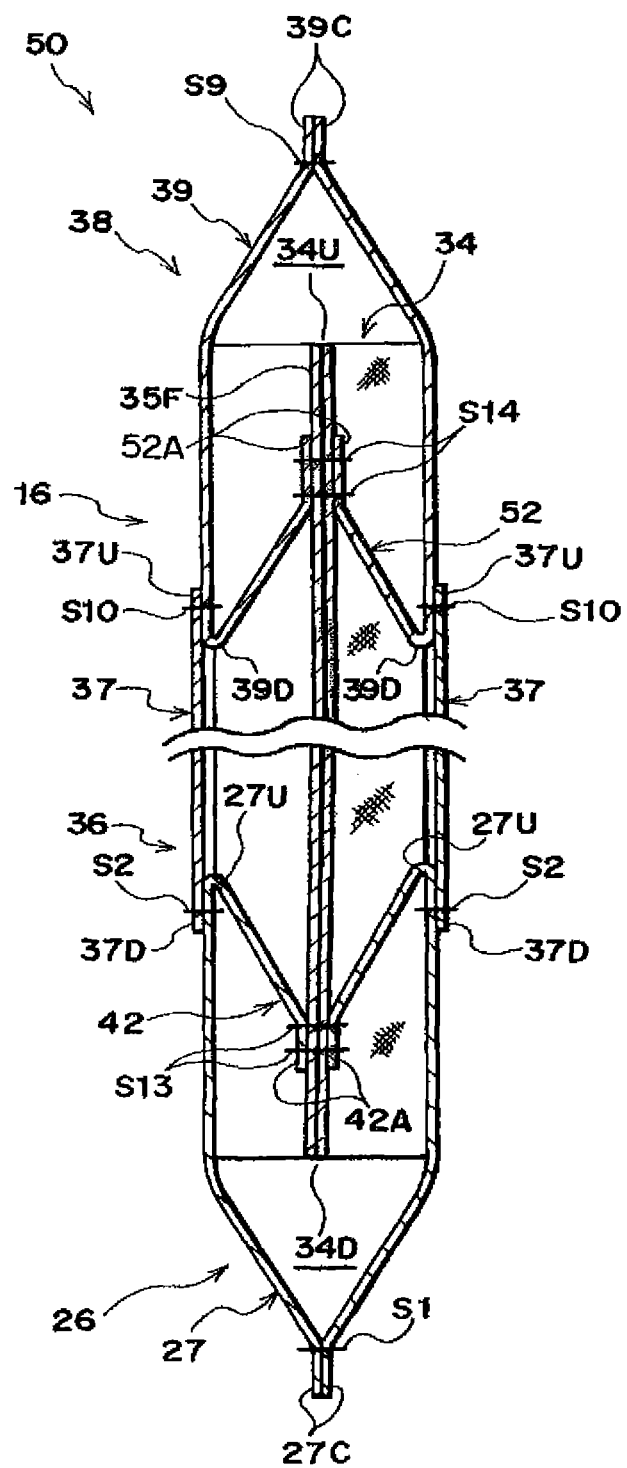
Figure 28:
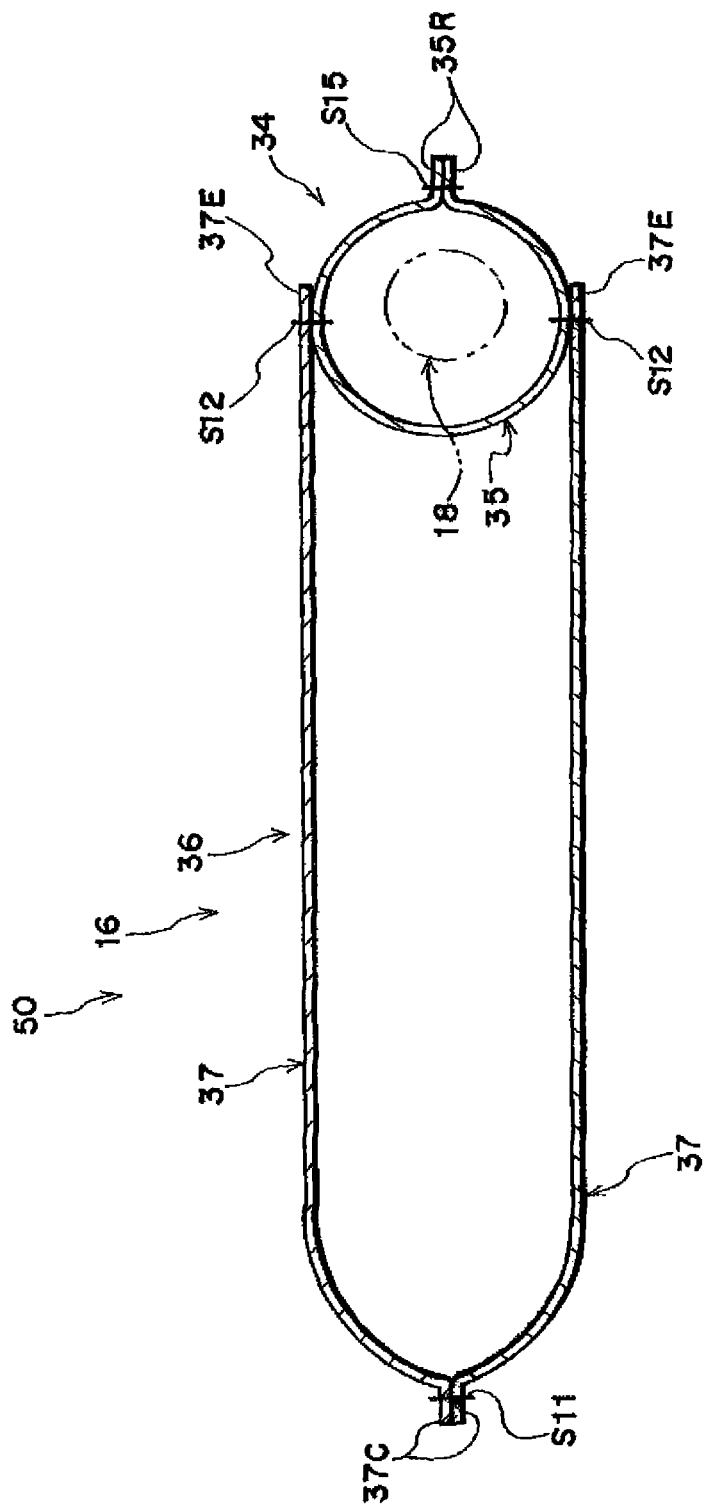

In FIG. 22 to FIG. 24, in a side airbag device 40 relating to the present embodiment, the diffuser 34 is extended up and down, and the lower opening portion 34D that is a main opening portion of the diffuser 34 is disposed so as to pass through the lower check valve 44 at the lower chamber 26 side, and the upper opening portion 34U that is a main opening portion of the diffuser 34 is disposed so as to pass through the upper check valve 54 at the upper chamber 38 side.

The rear end edges 35R of the diffuser base cloth 35, that are positioned at the lower opening portion 34D of the diffuser 34, are sewn together with the end edges 27C of the lower base cloth 27 at the sewn portion S1. Further, the rear end edges 35R of the diffuser base cloth 35, that are positioned at the upper opening portion 34U of the diffuser 34, are sewn together with the end edges 39C of the upper base cloth 39 at the sewn portion S9. Due thereto, the positions of the lower opening portion 34D and the upper opening portion 34U of the diffuser 34 can be made to be more stable.

Note that the main opening portions of the diffuser 34 may be structured so as to pass through at least one of the lower check valve 44 of the lower chamber 26 side and the upper check valve 54 of the upper chamber 38 side. Namely, there may be a structure in which the lower opening portion 34D that is a main opening portion passes through the lower check valve 44 of the lower chamber 26 side, and the upper opening portion 34U does not pass through the upper check valve 54 of the upper chamber 38 side. Or, there may be a structure in which the lower opening portion 34D does not pass through the lower check valve 44 of the lower chamber 26 side, and the upper opening portion 34U passes through the upper check valve 54 of the upper chamber 38 side. In this way, by setting the positions of the main opening portions of the diffuser 34, control of the distribution of the gas can be carried out easily.

Because the other portions are similar to the third embodiment, the same portions are denoted by the same reference numerals in the drawings, and description thereof is omitted.

(Operation)

The present embodiment is structured as described above, and the operation thereof is described hereafter. In FIG. 22 to FIG. 24, at the side airbag device 40 relating to the present embodiment, the diffuser 34 is extended up and down, and the lower opening portion 34D that is a main opening portion of the diffuser 34 is disposed so as to pass through the lower check valve 44 of the lower chamber 26 side, and further, the upper opening portion 34U that is a main opening portion of the diffuser 34 is disposed so as to pass through the upper check valve 54 of the upper chamber 38 side. Therefore, the gas for inflation that is supplied from the inflator 18 can be more directly guided to both the lower chamber 26 and the upper chamber 38. Concretely, the gas for inflation is guided in the arrow A direction toward the lower chamber 26 side, and is guided in the arrow B direction toward the upper chamber 38 side. In this way, by directly guiding the gas to the lower chamber 26 and the upper chamber 38, both the lower chamber 26 and the upper chamber 38 can be inflated and expanded more rapidly and stably. Note that, in FIG. 22, gas is supplied through the front opening portions 34F of the diffuser 34 to the intermediate chamber 36.

As shown in FIG. 24, after inflation of the lower chamber 26 that is a high pressure chamber is completed, even if gas attempts to flow backward from the lower opening portion 34D into the diffuser 34, the lower opening portion 34D closes due to the internal pressure of the lower chamber 26, and therefore, such backward flow of gas is restricted. Similarly, after inflation of the upper chamber 38 that is a high pressure chamber is completed, even if gas attempts to flow backward from the upper opening portion 34U into the diffuser 34, the upper opening portion 34U closes due to the internal pressure of the upper chamber 38, and therefore, such backward flow of gas is restricted. Namely, the lower opening portion 34D and the upper opening portion 34U respectively have the function of a check valve.

Moreover, even if gas attempts to flow-in from the lower chamber 26 side to the intermediate chamber 36 side through the gap between the diffuser 34 and the lower partitioning wall 42, the lower partitioning wall 42 (the lower check valve 44) fits snugly to the diffuser 34 due to the internal pressure of the lower chamber 26, and therefore, such inflow of gas is restricted. Similarly, even if gas attempts to flow-in from the upper chamber 38 side to the intermediate chamber 36 side through the gap between the diffuser 34 and the upper partitioning wall 52, the upper partitioning wall 52 (the upper check valve 54) fits snugly to the diffuser 34 due to the internal pressure of the upper chamber 38, and therefore, such inflow of gas is restricted.

Accordingly, after the inflation and expansion of the side airbag 16, the internal pressures of the lower chamber 26 and the upper chamber 38 can be maintained over a longer time.

[Fifth Embodiment]

In FIG. 25 through FIG. 28, in a side airbag device 50 relating to the present embodiment, end portions 37E, that run along the length direction of the diffuser 34, at the central base cloths 37 that form the intermediate chamber 36 are sewn to the side portions of the diffuser 34 (sewn portions S12) such that an overlapping region 56 of the central base cloths 37 and the diffuser 34 is reduced.

The structure and the method of sewing the lower chamber 26 and the upper chamber 38 are generally similar to the first embodiment. The lower partitioning wall 42 has a folded-in end edge 42A that is folded-in convexly toward the lower chamber 26 side when the side airbag 16 is not inflated and expanded. This folded-in end edge 42A is the region that is first folded in two when the lower base cloth 27 is folded and the lower chamber 26 is formed.

A seat rear end portion 42B of this folded-in end edge 42A is cut in order to form the lower check valve 44, and the diffuser 34 is passed through the lower check valve 44. Namely, the lower opening portion 34D of the diffuser 34 is disposed within the lower chamber 26 that passes through the lower check valve 44. A front edge 35F of the diffuser base cloth 35 is partially sewn (sewn portion S13) to the folded-in end edge 42A at a position intersecting the folded-in end edge 42A of the lower partitioning wall 42.

The length from the upper end portions 27U of the lower base cloth 27 to the sewn portion S13 is set to be shorter than the length from the upper end portions 27U of the lower base cloth 27 further toward the seat rear side than the sewn portion S13, to the folded-in end edge 42A (the seat rear end portions 42B). Due thereto, the seat rear end portions 42B of the folded-in end edge 42A can be made to function as the lower check valve 44.

On the other hand, the upper partitioning wall 52 has a folded-in end edge 52A that is folded-in convexly toward the upper chamber 38 side when the side airbag 16 is not inflated and expanded. This folded-in end edge 52A is the region that is first folded in two when the upper base cloth 39 is folded and the upper chamber 38 is formed.

A seat rear end portion 52B of this folded-in end edge 52A is cut in order to form the upper check valve 54, and the diffuser 34 is passed through the upper check valve 54. Namely, the upper opening portion 34U of the diffuser 34 passes through the upper check valve 54, and is disposed within the upper chamber 38. The front edge 35F of the diffuser base cloth 35 is partially sewn (sewn portion S14) to the folded-in end edge 52A at a position intersecting the folded-in end edge 52A of the upper partitioning wall 52.

The length from the lower end portions 39D of the upper base cloth 39 to the sewn portion S14 is set to be shorter than the length from the lower end portions 39D of the upper base cloth 39 further toward the seat rear side than the sewn portion S14, to the folded-in end edge 52A (the seat rear end portions 52B). Due thereto, the seat rear end portions 52B of the folded-in end edge 52A can be made to function as the upper check valve 54.

Note that the diffuser 34 is formed by, for example, the single diffuser base cloth 35 being folded in two or rounded in the form of a tube, and the rear end edges 35R thereof being sewn together (sewn portion S15). At the region overlapping the lower base cloth 27, these rear end edges 35R are sewn together with the end edges 27C thereof (sewn portion S1), and further, at the region overlapping the upper base cloth 39, are sewn together with the end edges 39C thereof (sewn portion S9).

The lower end portions 37D of the central base cloths 37 and the upper end portions 27U of the lower base cloth 27 are sewn at the sewn portions S2. At the region further toward the seat rear side than the end edges 37E of the central base cloths 37, these sewn portions S2 sew the upper end portions 27U of the lower base cloth 27 and to the diffuser base cloth 35. Further, the upper end portions 37U of the central base cloths 37 and the lower end portions 39D of the upper base cloth 39 are sewn at the sewn portions S10. At the region further toward the seat rear side than the end edges 37E of the central base cloths 37, these sewn portions S10 sew the lower end portions 39D of the upper base cloth 39 and the diffuser base cloth 35. Further, the end edges 37C at the seat front side of the central base cloths 37 are sewn together at the sewn portion S11. The intermediate chamber 36 is formed by carrying out such sewing.

The sewing at the sewn portions S1, S11, S9, S15 can be carried out at one time by continuously sewing-together the peripheral edge portion of the side airbag 16, but are not limited to this, and may be carried out separately. Further, in the illustrated example, the intermediate chamber 36 is formed by sewing the pair of central base cloths 37, but is not limited to this, and the single central base cloth 37 may be, for example, folded in two toward the seat rear side (vehicle rear side) with the seat front side as the center, and the end edges 37E may be sewn to the side portions of the diffuser base cloth 35, and the upper end portions 37U may be sewn to the lower end portions 39D of the upper base cloth 39, and the lower end portions 37D may be sewn to the upper end portions 27U of the lower base cloth 27.

In FIG. 25 through FIG. 28, in the side airbag device 50 relating to the present embodiment, the end portions 37E, that run along the length direction of the diffuser 34, at the central base cloths 37 that form the intermediate chamber 36 are sewn to the side portions of the diffuser 34 such that the overlapping region 56 of the central base cloths 37 and the diffuser 34 is reduced. In other words, the seat front-back direction length of the central base cloths 37 is set to be short so as to not cover as far as the rear end edges 35R of the diffuser base cloth 35, and the diffuser 34 is exposed. Further, the diffuser 34 also functions as one of inflated portions when the side airbag 16 inflates and expands.

Accordingly, at the side airbag 50, the surface area of the central base cloths 37 that form the intermediate chamber 36 can be made to be small. Therefore, the materials cost of the side airbag 16 is reduced, and even smaller size and lighter weight of the package formed by folding-up the side airbag 16 can be devised.

Note that, because the structures of the other portions of the side airbag device 50 are similar to the fourth embodiment, the same portions are denoted by the same reference numerals in the drawings, and description thereof is omitted. Further, because the operation when the side airbag 16 inflates and expands also is similar to the fourth embodiment, description thereof is omitted.

[Sixth Embodiment]

Figure 29:
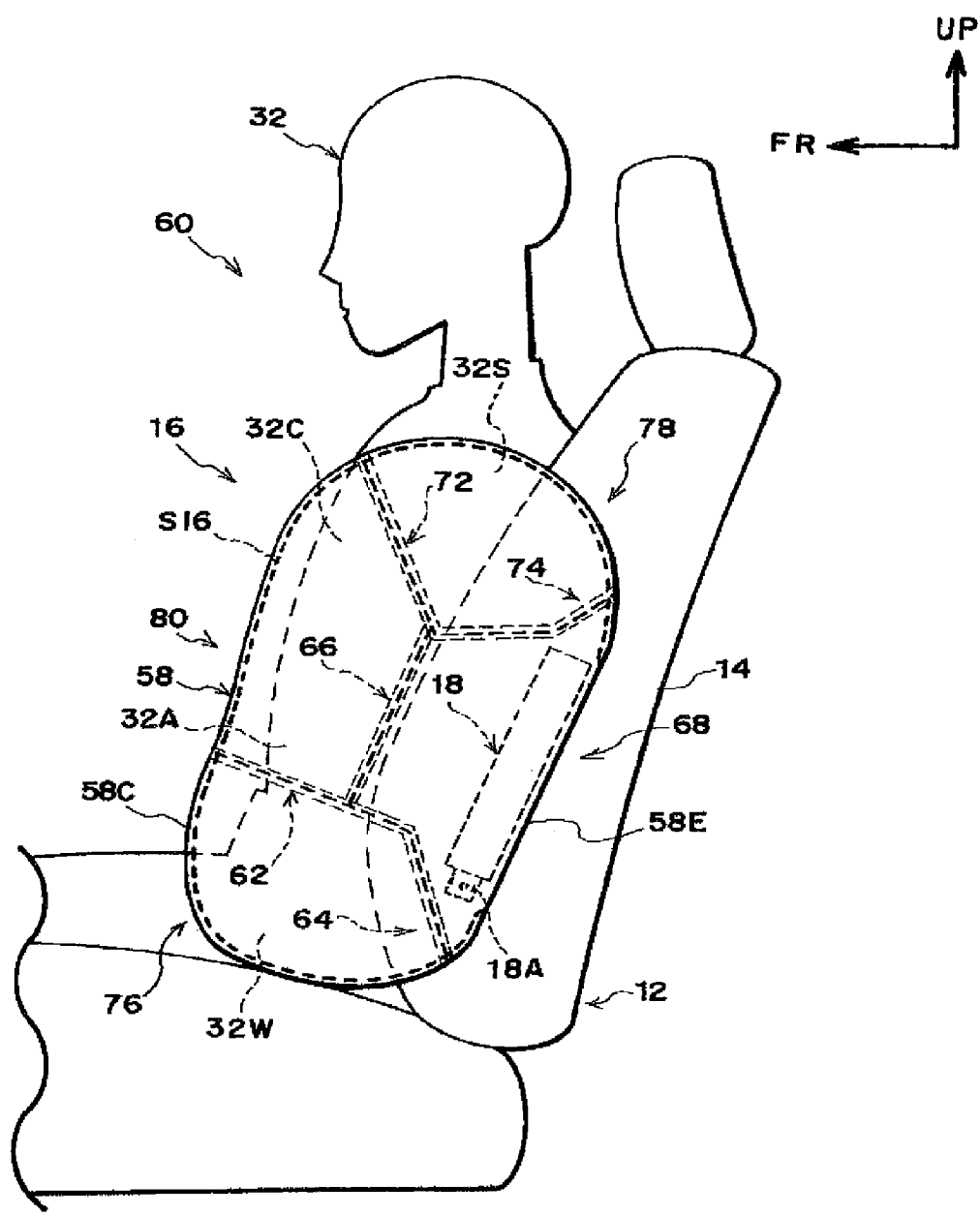
FIG. 29 through FIG. 35 relate to a sixth embodiment.
Figure 30:
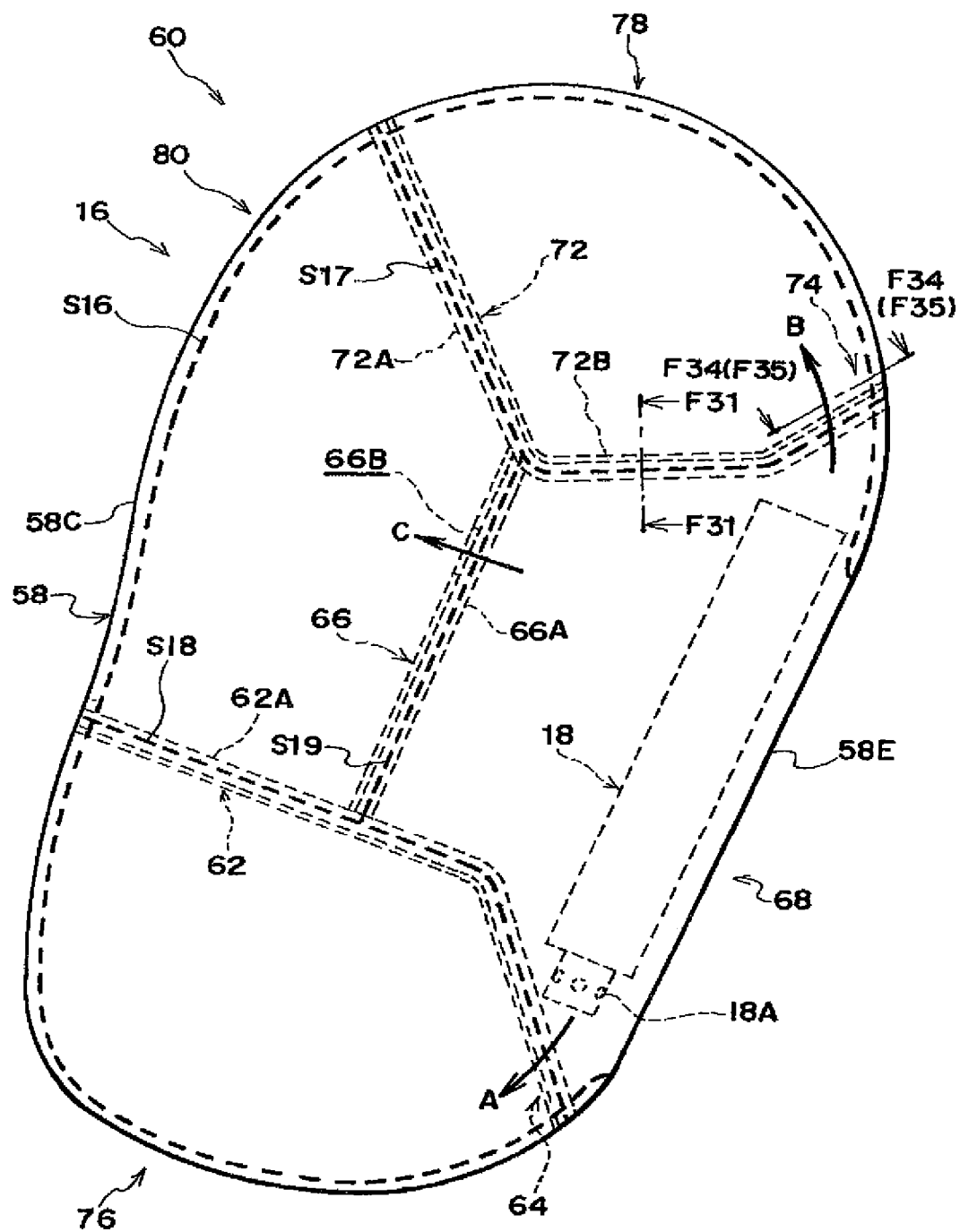

In FIG. 29, FIG. 30, a side airbag device 60 relating to the present embodiment relates to, for example, a side airbag device that is installed at the side portion of the seat back 14 of the vehicle seat 12, and has the side airbag 16, the inflator 18, a lower partitioning wall 62, a lower check valve 64, an upper partitioning wall 72, an upper check valve 74, and an intermediate partitioning wall 66.

The side airbag 16 is formed by sewing (sewn portion S16) peripheral edge portions 58C of a base cloth 58 that faces in the bag thickness direction, and is structured to, at the time of a side collision, swell-out from the side portion of the seat back 14 and inflate and expand between a vehicle side portion (not illustrated) and the passenger 32. The base cloth 58 is folded in two toward the seat front side with an end edge 58E at the seat rear side being the center for example, and the peripheral edge portions 58C are sewn at the sewn portion S16.

Further, the side airbag 16 has an initially inflated portion 68 to which gas for inflation is supplied at the initial stage of inflation and expansion, a lower chamber 76 that becomes a high pressure side at the time of inflation and expansion and corresponds to the waist portion 32W of the passenger 32 seated in the vehicle seat 12, an upper chamber 78 that becomes a high pressure side at the time of inflation and expansion and corresponds to the shoulder portion 32S of the passenger 32, and an intermediate chamber 80 that becomes lower pressure than the lower chamber 76 and the upper chamber 78 at the time of inflation and expansion and corresponds to the chest portion 32C of the passenger 32.

The inflator 18 is a gas generating source for supplying gas for inflation into the initially inflated portion 68 of the side airbag 16, and is formed in the form of a tube for example, and is disposed, for example, at the seat rear end portion within the initially inflated portion 68 in a state in which the gas jetting-out portions 18A are directed toward the lower chamber 76 side.

Figure 31:
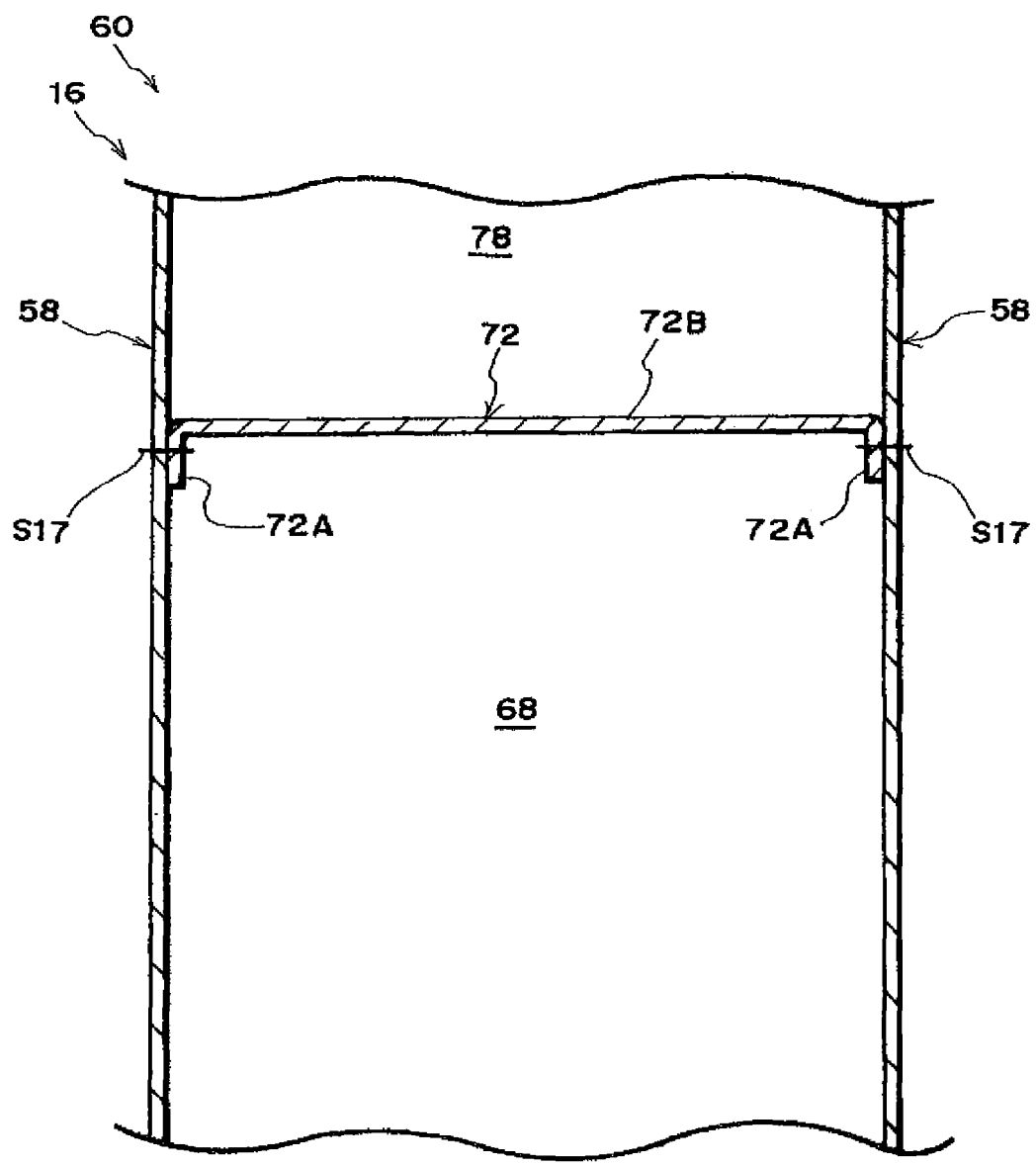

The upper partitioning wall 72 is provided within the side airbag 16, and divides the upper chamber 78 and the intermediate chamber 80, and divides the upper chamber 78 and the initially inflated portion 68. As shown in FIG. 31, this upper partitioning wall 72 is provided within the side airbag 16 by end edges 72A at bag thickness direction both sides respectively being sewn to the base cloth 58 that faces in the bag thickness direction (sewn portions S17).

The upper check valve 74 is provided at a partial region of the upper partitioning wall 72, and is provided convexly toward the upper chamber 78 side when the side airbag 16 is not inflated and expanded, and is structured so as to permit flowing of gas for inflation from the initially inflated portion 68 side to the upper chamber 78 side and restrict gas flowing in the direction opposite thereto.

Figure 32:
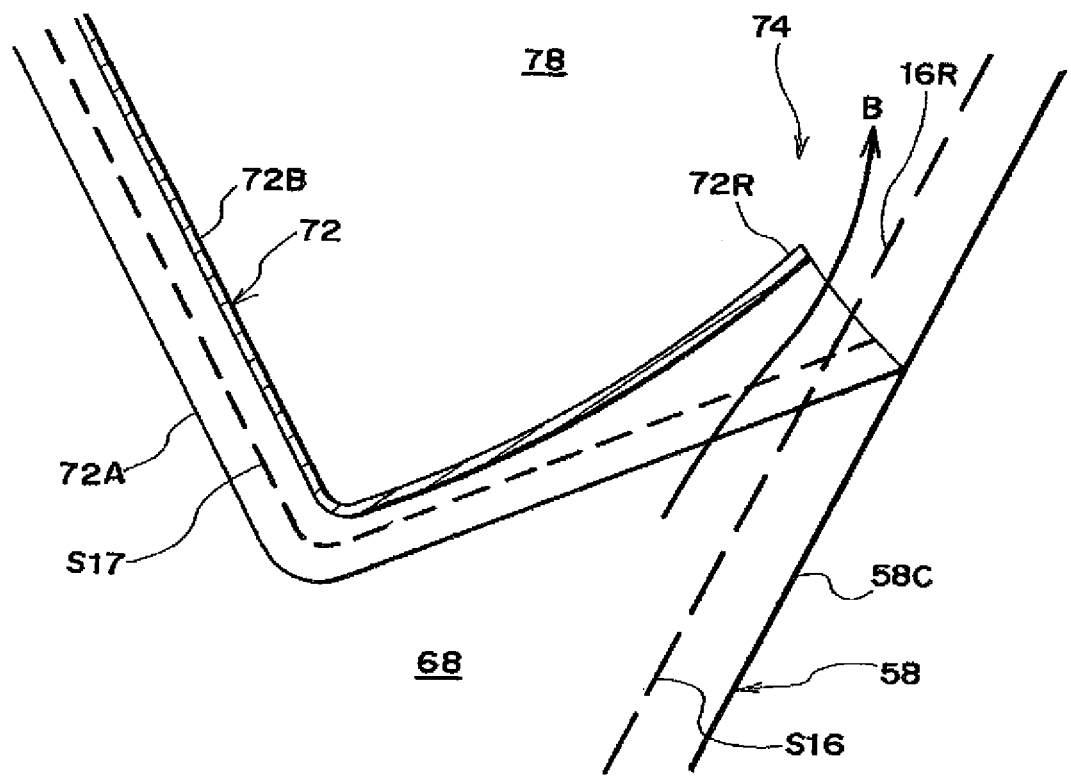
Figure 34:
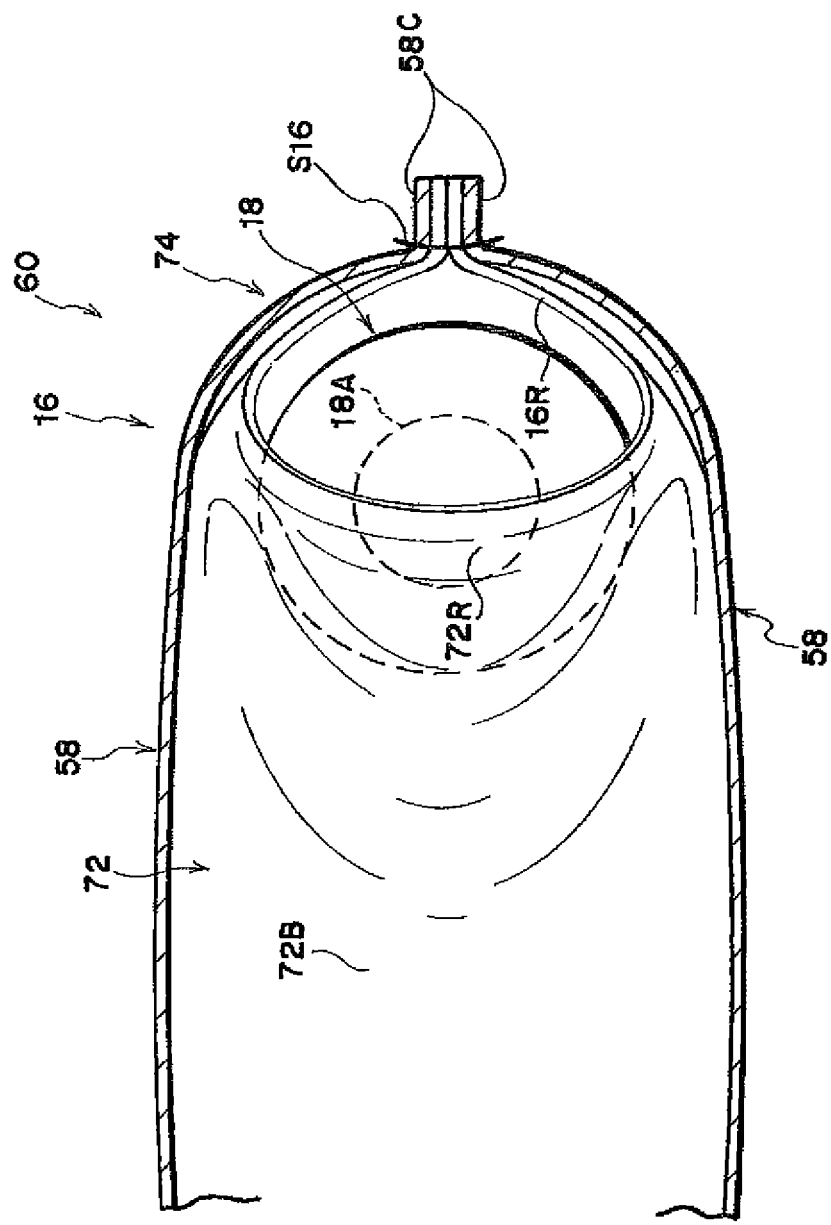

Concretely, as shown in FIG. 32, FIG. 34, the upper check valve 74 is formed by a rear end portion 72R of the upper partitioning wall 72 and a rear side inner surface 16R of the side airbag 16, and is structured such that the flow path of gas opens due to the rear end portion 72R of the upper partitioning wall 72 moving apart from the rear side inner surface 16R, and the gas flow path closes due to the rear end portion 72R abutting the rear side inner surface 16R. In the illustrated example, the position of the sewn portion S16 seen from the bag inner side is the rear side inner surface 16R of the side airbag 16.

At the upper partitioning wall 72, the slack of the rear end portion 72R is set to be greater than a general portion 72B. Accordingly, due to the pressure of the gas that is supplied from the inflator 18 to the initially inflated portion 68, the rear end portion 72R becomes convex toward the upper chamber 78 side, and the rear end portion 72R of the upper partitioning wall 72 moves away from the rear side inner surface 16R of the side airbag 16. Due thereto, due to the upper check valve 74 opening, flowing of gas in the arrow B direction from the initially inflated portion 68 side to the upper chamber 78 side is permitted.

Figure 33:
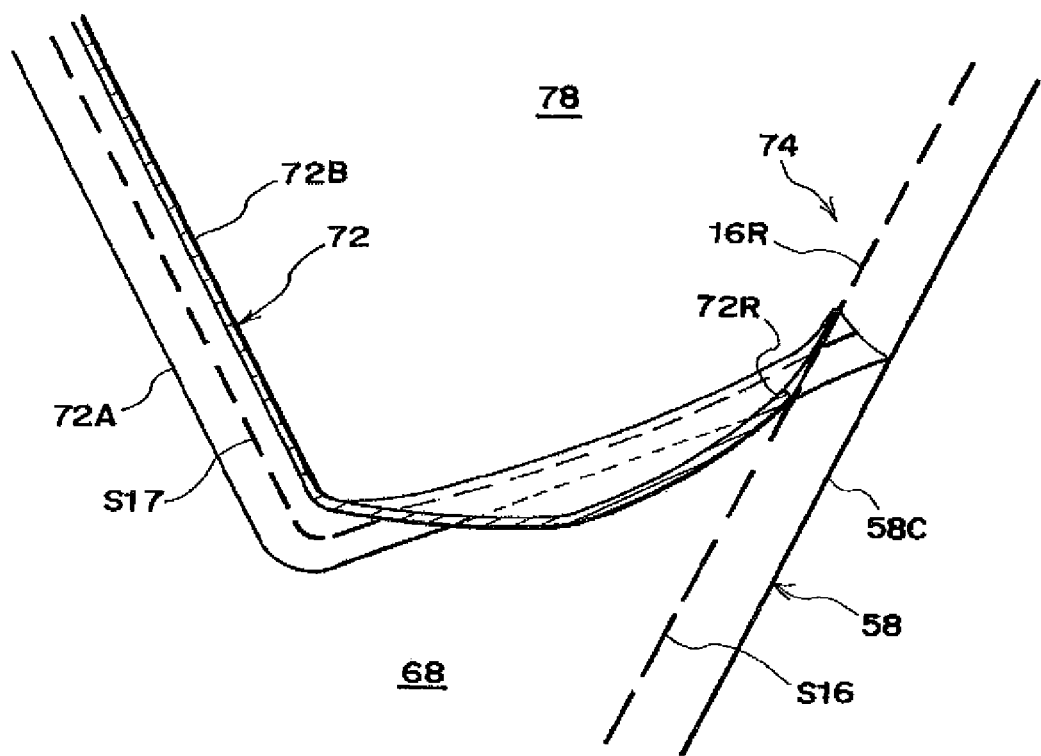
Figure 35:
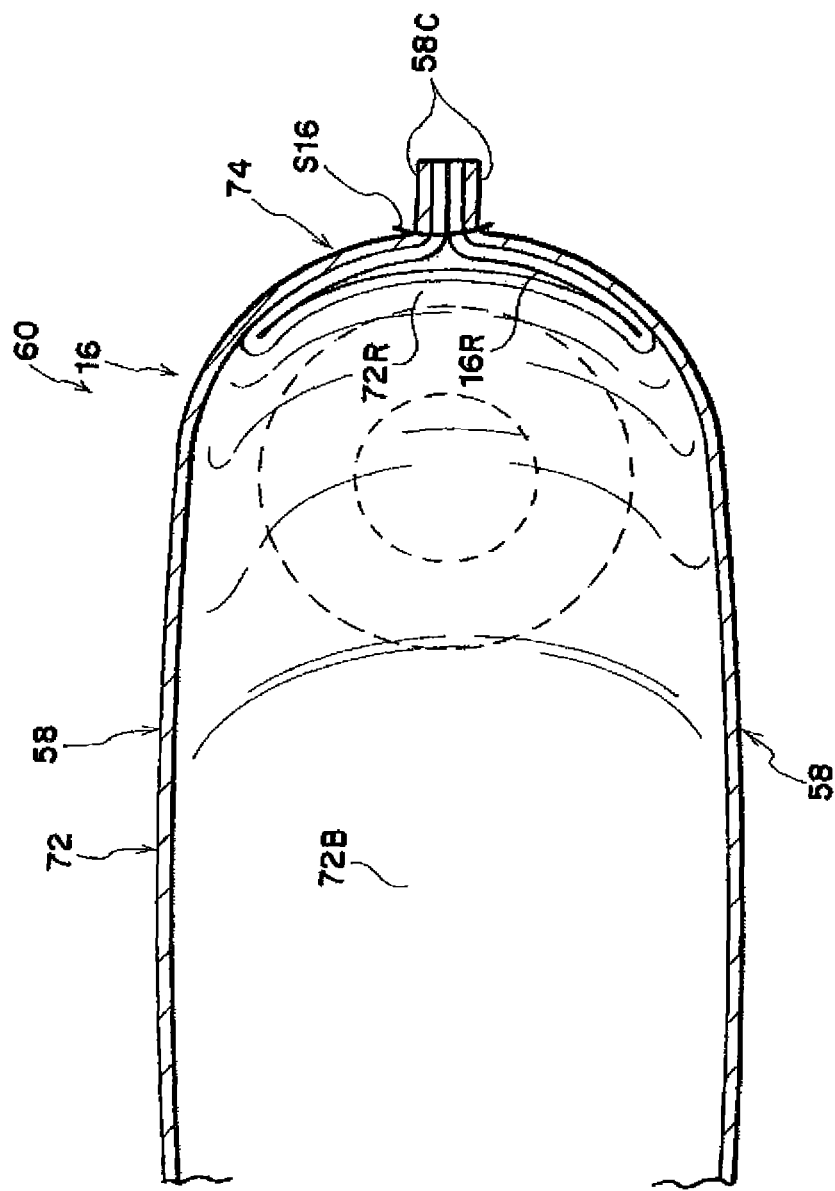

On the other hand, as shown in FIG. 33, FIG. 35, when the jetting-out of gas from the inflator 18 ends and gas attempts to flow backward from the upper chamber 78 side to the initially inflated portion 68 side, the upper check valve 74 attempts to invert toward the initially inflated portion 68 side. Due to the rear end portion 72R of the upper partitioning wall 72 fitting snugly to the rear side inner surface 16R of the side airbag 16 at this time, the upper check valve 74 closes, and the backward flow of gas can be restricted.

Next, the lower partitioning wall 62 is provided within the side airbag 16, and divides the lower chamber 76 and the intermediate chamber 80, and divides the lower chamber 76 and the initially inflated portion 68. This lower partitioning wall 62 is provided within the side airbag 16 by end edges 62A at bag thickness direction both sides respectively being sewn to the base cloth 58 that faces in the bag thickness direction (sewn portions S18).

The lower check valve 64 is provided at a partial region of the lower partitioning wall 62, and, for example, is provided at the seat rear end portion where the inflator 18 is positioned. The lower check valve 64 is provided convexly toward the lower chamber 76 side when the side airbag 16 is not inflated and expanded, and is structured so as to permit flowing of gas for inflation from the initially inflated portion 68 side to the lower chamber 76 side and restrict gas flowing in the direction opposite thereto. The structure and the operational principles of the lower check valve 64 are similar to the upper check valve 74.

The intermediate partitioning wall 66 is provided within the side airbag 16 so as to divide the initially inflated portion 68 and the intermediate chamber 80, and an air hole 66B, that permits the inflow of gas from the initially inflated portion 68 to the intermediate chamber 80, is provided therein. This intermediate partitioning wall 66 is provided within the side airbag 16 due to end edges 66A at the bag thickness direction both sides respectively being sewn to the base cloth 58 that faces in the bag thickness direction (sewn portions S19). The opening surface area of the air hole 66B provided in the intermediate partitioning wall 66 is set to be lower than the opening surface area of the upper check valve 74 and the opening surface area of the lower check valve 64. This is so that gas is preferentially supplied to the lower chamber 76 and the upper chamber 78 when the side airbag 16 inflates and expands.

Note that, as shown in FIG. 29, FIG. 30, the upper partitioning wall 72 and the lower partitioning wall 62 are formed so as to be bent appropriately as seen in a side view of the seat, in order to make the positions and the volumes of the lower chamber 76, the upper chamber 78, the intermediate chamber 80, and the initially inflated portion 68 appropriate. The bent shapes of the upper partitioning wall 72 and the lower partitioning wall 62 are not limited to the illustrated shapes.

(Operation)

The present embodiment is structured as described above, and the operation thereof is described hereinafter. In FIG. 29, at the side airbag device 60 relating to the present embodiment, the lower check valve 64 is provided at a partial region of the lower partitioning wall 62, and the upper check valve 74 is provided at a partial region of the upper partitioning wall 72. Therefore, as compared with a structure in which the respective check valves are provided separately from the respective partitioning walls, costs required for sewing the side airbag 16 is reduced, and smaller size and lighter weight of the package formed by folding-up the side airbag 16 can be devised.

Further, in FIG. 30, at the time of a side collision, the inflator 18 operates, and the gas for inflation that is jetted-out from the inflator 18 is first supplied to the initially inflated portion 68. This gas further is supplied from the initially inflated portion 68 to the lower chamber 76 through the lower check valve 64.

Due to the upper check valve 74 opening due to the pressure of gas within this initially inflated portion 68, gas within the initially inflated portion 68 is supplied in the arrow B direction to the upper chamber 78 through the upper check valve 74. Further, due to the lower check valve 64 opening due to the pressure of gas within the initially inflated portion 68, gas within the initially inflated portion 68 is supplied in the arrow A direction to the lower chamber 76 through the lower check valve 64. Moreover, gas within the initially inflated portion 68 is supplied to the intermediate chamber 80 through the air hole 66B of the intermediate partitioning wall 66.

When jetting-out of gas from the inflator 18 ends, gas attempts to flow backward from the lower chamber 76 and the upper chamber 78 to the initially inflated portion 68. However, because the lower check valve 64 and the upper check valve 74 restrict this flow of gas, the internal pressure of the lower chamber 76 and the internal pressure of the upper chamber 78 can respectively be maintained in high pressure states.

On the other hand, because the backward flow of gas from the intermediate chamber 80 to the initially inflated portion 68 is permitted, the internal pressure of the intermediate chamber 80 can be made to be relatively low pressure. Therefore, the chest portion 32C of the passenger 32 can be restrained appropriately by this intermediate chamber 80.

Note that, in the above-described respective embodiments, the diffuser 34 is formed by using the diffuser base cloth 35, but the diffuser 34 is not limited to a diffuser made of cloth, and, for example, may be a diffuser made of metal. Further, a vent hole, for further reducing the internal pressure at the time of restraining the passenger, may be provided in the low pressure chamber at the side airbag 16.

DESCRIPTION OF THE REFERENCE NUMERALS

10 side airbag device
12 vehicle seat 16 side airbag
18 inflator
20 side airbag device
22 partitioning wall
24 check valve
26 lower chamber (high pressure chamber)
26A bottom portion
27 lower base cloth (base cloth that forms high pressure chamber)
27C end edge positioned at peripheral edge portion of high pressure chamber
27D end edge positioned at central portion of partitioning wall
28 upper chamber (low pressure chamber)
29 upper base cloth (base cloth that forms low pressure chamber)
29C end edge of base cloth that forms low pressure chamber
30 side airbag device
32 passenger
32C chest portion
32S shoulder portion
32W waist portion
34 diffuser
34D lower opening portion (main opening portion)
34U upper opening portion (auxiliary opening portion)
34F front opening portion
35 diffuser base cloth (base cloth that forms diffuser)
36 intermediate chamber (low pressure chamber)
37 central base cloth (base cloth that forms intermediate chamber)
37E end edge that runs along length direction of diffuser
38 upper chamber (high pressure chamber)
38A bottom portion
39 upper base cloth (base cloth that forms high pressure chamber)
39C end edge positioned at peripheral edge portion of high pressure chamber
39U end edge positioned at central portion of partitioning wall
40 side airbag device
42 lower partitioning wall
44 lower check valve
50 side airbag device
52 upper partitioning wall
54 upper check valve
56 overlapping region
58 base cloth
58C peripheral edge portion
60 side airbag device
62 lower partitioning wall
64 lower check valve
66 intermediate partitioning wall
66B air hole
68 initially inflated portion
72 upper partitioning wall
74 upper check valve
76 lower chamber
78 upper chamber
80 intermediate chamber

The invention claimed is:

1. A side airbag device comprising:
a side airbag that inflates and expands at a time of a side collision, and that has a high pressure chamber that becomes a high pressure side at a time of inflation and expansion, and a low pressure chamber that becomes a lower pressure than the high pressure chamber, the high pressure chamber and the low pressure chamber being formed by base cloths that are respectively separate bodies;
an inflator that supplies gas for inflation into the side airbag;
a partitioning wall that is formed by a portion of a base cloth that forms the high pressure chamber, and that divides the high pressure chamber and the low pressure chamber; and
a check valve that is provided at a partial region of the partitioning wall, and that is provided convexly toward the high pressure chamber side when the side airbag is not inflated, and that permits flowing of the gas for inflation from the low pressure chamber side to the high pressure chamber side, and restricts flowing of gas in a direction opposite thereto,
wherein the base cloth that forms the high pressure chamber is folded in two at a bottom portion of the high pressure chamber, and is folded-over respectively toward a bag inner side and the high pressure chamber side at both end portions in a bag thickness direction of a region that becomes the partitioning wall, and end edges that are positioned at a central portion of the partitioning wall are sewn together, and end edges that are positioned at a peripheral edge portion of the high pressure chamber are sewn together.

2. The side airbag device of claim 1, wherein,
at the side airbag in an inflated and expanded state,
the high pressure chamber is a lower chamber that corresponds to a waist portion of a passenger seated in a vehicle seat and an upper chamber that corresponds to a shoulder portion of the passenger, and
the low pressure chamber is an intermediate chamber that is positioned between the upper chamber and the lower chamber and corresponds to a chest portion of the passenger.

3. The side airbag device of claim 2, comprising:
a diffuser that guides the gas for inflation mainly to the lower chamber side and the upper chamber side, and also guides the gas for inflation to the intermediate chamber side,
wherein the diffuser has main opening portions that open to the lower chamber side and the upper chamber side, respectively, and an auxiliary opening portion that opens to the intermediate chamber side.

4. The side airbag device of claim 3, wherein the main opening portions of the diffuser are disposed so as to pass through at least one of the check valve of the lower chamber side or the check valve of the upper chamber side.

5. The side airbag device of claim 2, wherein a bag thickness of the lower chamber is set to be thicker than a bag thickness of the upper chamber, in an inflated and expanded state of the side airbag.

6. The side airbag device of claim 2, wherein an end edge, that runs along a length direction of the diffuser, at a base cloth that forms the intermediate chamber is sewn to a side portion of the diffuser, such that an overlapping region of the base cloth and the diffuser is reduced.

7. A method of sewing a side airbag, the side airbag having a high pressure chamber that becomes a high pressure side at a time of inflation and expansion, and a low pressure chamber that becomes a lower pressure than the high pressure chamber, and in which the high pressure chamber and the low pressure chamber are formed by base cloths, that are respectively separate bodies, and are divided by a partitioning wall, and in which the partitioning wall is formed by a portion of a base cloth that forms the high pressure chamber, the method comprising:

a step of forming, at a partial region of the partitioning wall, a check valve that permits flowing of gas for inflation from the low pressure chamber side to the high pressure chamber side, and restricts flowing of the gas in a direction opposite thereto;

a step of folding the base cloth that forms the high pressure chamber in two at a bottom portion of the high pressure chamber, and sewing both end portions in a bag thickness direction of a region that becomes the partitioning wall, at the base cloth, to a base cloth that forms the low pressure chamber;

a step of folding-over the base cloth that forms the high pressure chamber, respectively toward a bag inner side and the high pressure chamber side from a position sewn with the base cloth that forms the low pressure chamber, and sewing end edges thereof together excluding the partial region that becomes the check valve; and at a peripheral edge portion of the high pressure chamber, sewing together end edges of the base cloth that forms the high pressure chamber, and, at a peripheral edge portion of the low pressure chamber, sewing together end edges of the base cloth that forms the low pressure chamber.

8. A side airbag device comprising:

a side airbag that inflates and expands at a time of a side collision, and that has a high pressure chamber that becomes a high pressure side at a time of inflation and expansion, and a low pressure chamber that becomes a lower pressure than the high pressure chamber, the high pressure chamber and the low pressure chamber being formed by base cloths that are respectively separate bodies;

an inflator that supplies gas for inflation into the side airbag;

a partitioning wall that is formed by a portion of a base cloth that forms the high pressure chamber, and that divides the high pressure chamber and the low pressure chamber; and a check valve that is provided at a partial region of the partitioning wall, and that is provided convexly toward the high pressure chamber side when the side airbag is not inflated, and that permits flowing of the gas for inflation from the low pressure chamber side to the high pressure chamber side, and restricts flowing of gas in a direction opposite thereto, wherein the base cloth that forms the high pressure chamber is folded in two at a bottom portion of the high pressure chamber, and is folded-over respectively toward a bag inner side and the high pressure chamber side at both end portions in a bag thickness direction of a region that becomes the partitioning wall, and end edges that are positioned at a central portion of the partitioning wall are sewn together, and end edges that are positioned at a peripheral edge portion of the high pressure chamber are sewn together, the side airbag device being made by the method of claim 7.

\* \* \* \* \*